United States Patent
Kumar

(10) Patent No.: US 12,132,846 B2
(45) Date of Patent: Oct. 29, 2024

(54) SYSTEM AND METHOD FOR EXTENDED ATTRIBUTES IN CERTIFICATES FOR DYNAMIC AUTHORIZATION

(71) Applicant: SYMMERA INC., Stamford, CT (US)

(72) Inventor: Srinivas Kumar, Cupertino, CA (US)

(73) Assignee: SYMMERA INC., Stamford, CT (US)

( * ) Notice: Subject to any disclaimer, the term of this patent is extended or adjusted under 35 U.S.C. 154(b) by 0 days.

(21) Appl. No.: 18/435,253

(22) Filed: Feb. 7, 2024

(65) Prior Publication Data

US 2024/0323034 A1    Sep. 26, 2024

Related U.S. Application Data

(63) Continuation-in-part of application No. 18/517,804, filed on Nov. 22, 2023, now abandoned, which is a
(Continued)

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3247* (2013.01)

(58) Field of Classification Search
None
See application file for complete search history.

(56) References Cited

U.S. PATENT DOCUMENTS 6,226,618 B1   5/2001   Downs et al.
6,574,609 B1   6/2003   Downs et al.
(Continued)

FOREIGN PATENT DOCUMENTS

WO   WO-2023022724 A1 *  2/2023
WO       2023034121 A1    3/2023

OTHER PUBLICATIONS

Eronen, Ed et al. "R.F.C. 4279: Pre-Shared Key Ciphersuites for Transport Layer Security (TSL)" [online] IETF, Dec. 2005 [ retrieved Dec. 14, 2023]. Retrieved from the Internet: URL: https://datatracker.ietf.org/doc/html/rfc4279 (Year: 2005).*

(Continued)

*Primary Examiner* — Taghi T Arani
*Assistant Examiner* — Joshua Raymond White
(74) *Attorney, Agent, or Firm* — Panitch Schwarze Belisario & Nadel LLP

(57) ABSTRACT

The method provides for dynamic retrieval of certificates, with remote, secure, and scalable lifecycle management. It enables configuring, generating, issuing, and sending client certificates by a certificate broker service to client applications, sending client certificates by client applications to server applications, and verifying of client certificates by server applications for host address, network address, network mash, network scope, and IP address pool-based authorization. It is an agentless method to achieve device protection, application security, and data protection with data authenticity and confidentiality in intra-device, inter-device, device-to-edge, and device-to-cloud secure communications. It helps Transport Layer Security and Internet Key Exchange enabled applications retrieve leaf certificates and the associated private key, and verify certificates, programmatically for certificate-based authentication during protocol handshake, with host and network address-based authorization policies.

11 Claims, 16 Drawing Sheets

Related U.S. Application Data continuation-in-part of application No. 18/377,866, filed on Oct. 9, 2023, now Pat. No. 12,015,721, which is a continuation-in-part of application No. 18/130,942, filed on Apr. 5, 2023, now Pat. No. 11,968,302.

(60) Provisional application No. 63/454,612, filed on Mar. 24, 2023.

(56) References Cited

U.S. PATENT DOCUMENTS

| | | |
|---|---|---|
| 6,587,837 B1 | 7/2003 | Spagna et al. |
| 6,859,791 B1 | 2/2005 | Spagna et al. |
| 6,983,371 B1 | 1/2006 | Hurtado et al. |
| 7,110,984 B1 | 9/2006 | Spagna et al. |
| 7,228,437 B2 | 6/2007 | Spagna et al. |
| 7,346,580 B2 | 3/2008 | Lisanke et al. |
| 7,487,128 B2 | 2/2009 | Spagna et al. |
| 8,180,708 B2 | 5/2012 | Hurtado et al. |
| 9,565,172 B2 | 2/2017 | Ståhl |
| 10,057,243 B1 | 8/2018 | Kumar et al. |
| 10,162,968 B1 | 12/2018 | Kumar et al. |
| 10,250,383 B1 | 4/2019 | Kumar et al. |
| 10,326,797 B1 | 6/2019 | Murray et al. |
| 10,341,321 B2 | 7/2019 | Kumar et al. |
| 10,469,480 B2 | 11/2019 | Kumar et al. |
| 10,505,920 B2 | 12/2019 | Kumar et al. |
| 10,587,586 B2 | 3/2020 | Kumar et al. |
| 10,657,261 B2 | 5/2020 | Kumar et al. |
| 10,764,040 B2 | 9/2020 | Kumar et al. |
| 10,979,419 B2 | 4/2021 | Kumar et al. |
| 11,025,627 B2 | 6/2021 | Li et al. |
| 11,134,379 B2 | 9/2021 | Shi et al. |
| 11,153,344 B2 | 10/2021 | Hayton |
| 11,206,134 B2 | 12/2021 | Kumar et al. |
| 11,303,616 B2 | 4/2022 | Kumar et al. |
| 11,349,675 B2 | 5/2022 | Kim et al. |
| 11,403,402 B2 | 8/2022 | Kumar et al. |
| 11,444,753 B1 | 9/2022 | Williams et al. |
| 11,595,217 B2 | 2/2023 | Kumar et al. |
| 2002/0002468 A1 | 1/2002 | Spagna et al. |
| 2002/0107803 A1 | 8/2002 | Lisanke et al. |
| 2003/0110130 A1 | 6/2003 | Pelletier |
| 2003/0185395 A1 | 10/2003 | Lee et al. |
| 2005/0251491 A1 | 11/2005 | Medina et al. |
| 2006/0089912 A1 | 4/2006 | Spagna et al. |
| 2008/0172747 A1 | 7/2008 | Hurtado et al. |
| 2010/0008500 A1 | 1/2010 | Lisanke et al. |
| 2012/0042160 A1* | 2/2012 | Nakhjiri ............ H04L 63/0892 713/151 |
| 2016/0364553 A1 | 12/2016 | Smith et al. |
| 2017/0041296 A1 | 2/2017 | Ford et al. |
| 2018/0082083 A1 | 3/2018 | Smith et al. |
| 2018/0123784 A1 | 5/2018 | Gehrmann |
| 2018/0367506 A1 | 12/2018 | Ford et al. |
| 2019/0222560 A1 | 7/2019 | Ford et al. |
| 2019/0327209 A1* | 10/2019 | Seferiadis ............ H04L 61/5007 |
| 2020/0145409 A1 | 5/2020 | Pochuev et al. |
| 2020/0186365 A1 | 6/2020 | Kumar et al. |
| 2020/0295933 A1 | 9/2020 | Link, II |
| 2020/0382957 A1 | 12/2020 | Johnson |
| 2020/0396067 A1 | 12/2020 | Barker |
| 2021/0194681 A1 | 6/2021 | Nix |
| 2022/0006652 A1 | 1/2022 | Mishra et al. |
| 2022/0045930 A1 | 2/2022 | Williams |
| 2022/0294609 A1 | 9/2022 | Williams et al. |
| 2022/0376898 A1 | 11/2022 | Kaliski, Jr. et al. |
| 2022/0393865 A1 | 12/2022 | Williams et al. |
| 2022/0393866 A1 | 12/2022 | Williams et al. |
| 2022/0407688 A1 | 12/2022 | Childe et al. |
| 2023/0020193 A1 | 1/2023 | Williams et al. |
| 2023/0057469 A1 | 2/2023 | Hoole et al. |
| 2023/0229758 A1 | 7/2023 | Terpstra et al. |
| 2023/0269099 A1* | 8/2023 | Medvinsky ............ H04L 9/3247 713/158 |

OTHER PUBLICATIONS

Arqit announces QuantumCloud powered b AWS, Dec. 9, 2022, 4 pps.

Raza et al, "Security Considerations for the WirelessHART Protocol", IEEE 2009, 8 pps.

Raza et al, "S3K: Scalable Security with Symmetric Keys—DTLS Key Establishment for the Internet of Things", Jun. 1, 2015, 11 pps.

Siddiqa et al, "Scalable Asymmetric Security Mechanism for Internet of Things", International Journal of Advanced Computer Science and Applications, vol. 11, No. 8, 2020, pp. 365-373.

Vohra, Meenakshi "Internet key exchange (IKE) based secure wireless and mobile networks" [online] San Jose State University, May 2004 [retrieved Jul. 5, 2023]. Retrieved from the Internet: URL: https://scholarworks.sjsu.edu/cgi/viewcontent.cgi?article=3589 &context=etd_theses (Year: 2004).

"Symmetric Identity Based Device Attestation" [online] TrustedComputing Group, Jan. 2020 [retrieved Jul. 5, 2023]. Retrieved from the Internet: URL: https://trustedcomputinggroup.org/wp-content/uploads/TCG_DICE_SymIDAttest_v1_r0p95_pub-1.pdf (Year: 2020).

Eronen, Ed et al. "R.F.C. 4279: Pre-Shared Key Ciphersuites for Transport Layer Security (TLS)" [online] R.F.C., Dec. 2005 [retrieved Jul. 5, 2023] Retrieved from the Internet: URL: https://www.rfc-editor.org/rfc/rfc4279 (Year 2005).

Raza, Shahid et al. "S3K: Scalable Security With Symmetric Keys—DTLS Key Establishment for the Internet of Things" [online] IEEE, Jan. 2016 [retrieved Jul. 5, 2023]. Retrieved from the Internet: URL: https://ieeexplore.ieee.org/stamp/stamp.jsp?arnumber=7373695 (Year: 2016).

Non-Final Office Action, dated Aug. 17, 2023, issued in corresponding U.S. Appl. No. 18/206,426, 17 pgs.

Notice of Allowance, dated Aug. 17, 2023, issued in corresponding U.S. Appl. No. 18/206,399, 17 pgs.

S. Maksuti et al., "Automated and Secure Onboarding for System of Systems," in IEEE Access, vol. 9, pp. 111095-111113, 2021. (Year: 2021).

Boskov, Ivana Arsen et al. "Time-to-Provision Evaluation of IoT Devices Using Automated Zero-Touch Provisioning." GLOBECOM 2020 - 2020 IEEE Global Communications Conference (2020): pp. 1-7. (Year: 2020).

Notice of Allowance, dated Jan. 24, 2024, issued in corresponding U.S. Appl. No. 18/377,866, 48 pages.

* cited by examiner

ENTITY RELATIONSHIPS FOR CONTENT DISTRIBUTION SERVICE

PRE-SHARED KEY BASED SELECTIVE ENCRYPTION OF PARTIAL SECTIONS OF MESSAGES OVER THE NETWORK

PRE-SHARED KEY BASED CONTENT SIGNING FOR SUPPLY CHAIN TAMPER RESISTANCE

DYNAMIC PRE-SHARED KEY BASED AUTHENTICATION WITH WIRELESS ACCESS POINT

SYSTEM AND METHOD FOR EXTENDED ATTRIBUTES IN CERTIFICATES FOR DYNAMIC AUTHORIZATION

BACKGROUND OF THE DISCLOSURE

Field of the Disclosure

This disclosure relates to the field of cybersecurity and, more particularly, to a system and method for device protection based on the principle of zero-trust networking in Internet of Things (IoT), Industrial IoT (IIoT), and Operational Technology (OT) environments. The disclosure provides methods to implement secure communications and data exchange between applications and services executing on devices using digital certificates on IoT/IIoT/OT devices for device identification and authentication, public or private public key infrastructure (PKI) systems for key and certificate management, or cumbersome and untenable manual modes of shared key or certificate lifecycle management.

Description of the Related Art

Device manufacturers, owners, and operators face production, operational, and economic challenges due to workflow dependencies on disparate cross-domain public key infrastructure (PKI) systems, high recurring costs of short-lived certificates issued by a commercial certificate authority (CA), emerging post quantum threats to asymmetric keys and PKI systems, and the complexity of in-field device key and certificate lifecycle management. Provisioning manufacturer issued birth certificates on devices during manufacturing in air-gapped and controlled environments poses scalability and workflow challenges at the factory. Provisioning owner issued operational certificates on devices during the on-boarding process poses scalability and workflow challenges in the field. The nature of split and/or heterogeneous PKI systems between the original equipment manufacturer (OEM) and device owner/operator poses cross-PKI interoperability issues.

The high volume of heterogeneous devices in IoT, IIOT, and OT environments, in the order of billions, makes private key protection, key renewal/rotation, and key/certificate lifecycle management in PKI based environments extremely cumbersome and expensive for network operations center (NOC), security operations center (SOC), application/device management services (AMS/DMS) operators in converged information technology (IT) and operations technology (OT) environments. Performing certificate chain verification and processing certificate revocation lists are computationally and bandwidth intensive for real-time applications on resource constrained devices. Local asymmetric keypair generation and periodic renewals for enhanced cybersecurity requires high entropy and compute capacity. On-device secure local storage to protect the long-lived private keys in custody is unavailable on low-cost OT devices (e.g., sensors, actuators, controllers) with read-only flash-based partitions and filesystems.

The existing symmetric key generation and distribution methods manage symmetric pre-shared keys (PSKs) without adequately addressing the intricate workflows associated with the usage of such PSKs by applications executing on headless (non-user) devices and communicating over insecure local and wide area networks with other devices in activities that include application data transfers, command and control messages, and telemetric data transfers. Further, the expiration and renewal of PSKs in use requires timely synchronization between tightly coupled applications to avoid service disruption in production environments.

Published standards such as the Group Domain of Interpretation (GDOI), specified in Request For Comments (RFC) 6407, describe methods to manage and distribute group security policy, keying materials, and group security associations based on group memberships for authenticated and encrypted multicast and broadcast communications between group members over the Internet Protocol Security (IPsec) protocol. However, unicast peer-to-peer and client-server communications require session key negotiation based on manually pre-configured PSKs and identity hints (e.g., the Transport Layer Security (TLS)-PSK standard as specified in RFC 4279). Besides, managing security associations and security policies over IPsec requires intricate network, subnet, and IP address-based addresses, masks, and allow/deny rules per member device that are technically overwhelming to manage and difficult to scale in converged IT/OT networks where the network fabric is already too complex to secure and protect.

Managing pre-shared keys in real-time use by a plurality of applications and services executing on distributed devices over local and wide area networks remains a major challenge.

Distribution of symmetric keys to a plurality of connected devices requires secure device authentication with a key distribution service, validation of devices based on domain membership, group membership, group based key management, distribution policies based on authorized application identifiers, and high availability to alleviate service disruptions during field operations.

The presently fundamental security gap in implementing a zero-trust network architecture is the inability to orchestrate the generation and distribution of pre-shared symmetric keys, securely on-demand and at-scale, to connected applications executing on heterogeneous devices enrolled into domain-based groups with device identification and authentication based on enrolled domain validation.

Current approaches for the generation, distribution, and usage of symmetric keys require a network-based Hardware Security Module (HSM) or a key management system (KMS) that operates as a secure element and/or key escrow/vault for key storage, protection, and usage. Whereas a HSM does not transmit the protected symmetric keys, a KMS may transmit (transfer) the symmetric keys over secure transport using a key encapsulation mechanism that requires use of a PKI based asymmetric public-private keypair by an authenticated receiver. Secure email protocols such as Secure/Multipurpose Internet Mail Extensions (S/MIME) use key encapsulation mechanisms for security. A major challenge for a KMS is the renewal rate of the symmetric keys and scalability as the volume of headless (non-user) devices proliferates. While a KMS may securely generate, store, and transfer symmetric keys, the dynamic coordination of key exchanges across connected applications and devices that pre-share keys for client authentication and secure communications are beyond the scope of a KMS.

Traditional PKI systems are designed to use a single cryptographic algorithm, requiring duplication of the PKI system to support a different algorithm to mitigate post quantum threats to long-lived devices using X.509 certificates. Multi-signature schemes provide two sets of cryptographic subject public keys and associated issuer signatures within a single X.509 certificate. However, multi-signature schemes require computational and memory intensive operations with larger certificate sizes that are too heavy (too large) and not viable for use on resource constrained devices. Other approaches split an encryption key into fragments. However, split keys require multiple parties (actors) to submit their fragments to establish a quorum with a specified threshold of fragments to access and decrypt the data.

The OASIS key management interoperability protocol (KMIP) specification describes message protocols for symmetric key operations (e.g., create, derive, re-key) using a unique identifier over HTTPS with various message formats (e.g., tag type length value (TTLV), JSON, XML). However, the specification does not include group based pre-shared keys and enhanced key usage and authorization techniques (permissions) based on factors such as for example network domain, application identifiers, or tenant identifiers. The mechanism to authenticate the client to the server and the underlying transport for confidentiality and integrity are not specified and is external to the protocol. Further, the specification does not address use of pre-shared key identity hints, between the initiators/clients and responders/servers in a connection, required for client authentication over secure transport protocols (e.g., TLS, IKE, SSH), insecure transport protocols (UDP, TCP) over IP, or non-IP communications protocols.

One innovative system and method discloses quantum-safe networking and quantum-safe key exchange protocols using a quantum safe (QS) network, quantum distributed (QD) keys, generation of quantum reference (QREF) locators based on input data and user secrets (credentials), and a QREF access token. While this approach provides quantum safe protocols, in the context of quantum computing (QC) threats to key exchange protocols based on the hardness of integer factorization and discrete logarithm problem, it requires a quantum key distribution (QKD) system, over a proprietary protocol, for the distribution of the QD keys (e.g., satellites, fiber optic grids, terrestrial lines). Further, establishing QS communication channels between the end-point devices requires quantum safe QD key provisioning with physical or direct connections to QS registration servers on QS networks from a manufacturer or retailer facility. The QD keys must be protected on a local secure element (such as for example a HSM, TPM, or secure memory enclave). The device identifiers and attributes, and the assigned QD key, must be stored on a QS server of the QS system in a device account to identity the end-point device and retrieve the appropriate QD key to establish the QS communication channel. Such a device identification and verification method does not leverage the information technology (IT) device management services and onboarding workflows in Enterprise (controlled or air-gapped), and operational technology (OT) field networks. Beyond the manual installation or uploading process over a physical channel, the solution requires a local agent (QREF application) to be installed and executed on the end-point devices to use the QD key, QREF access token, and device identifier/credentials to establish a QS communication channel, and further for the QS network to locate the device account and identify the QREF locator from the QREF access token and use the correct (same) end-point QD key to establish the QS communication channel. Requiring a local agent on the end-point device poses challenges on resource constrained and real-time operating system (RTOS) platforms wherein monolithic production (application) images are managed and regulated by the original equipment manufacturers (OEMs). The approach may also require reengineering of the line of business applications and security protocol stacks on OT/IoT/IIoT devices to use QD keys. The manufacturing workflows at the manufacturer/retailer's factory often do not permit access to the Internet, or the device owner/operator's Enterprise or cloud based production systems. Provisioning devices with operational cryptographic key data is generally deferred to device onboarding workflows at the production facility, where customization becomes a cumbersome process for IT NOC/SOC operators.

Other quantum key distribution (QKD) approaches generate symmetric encryption keys between two locations without sending the keys between the sites, using the physical entanglement properties of exchanged light particles through an ordinary optical fiber.

Other proposed approaches, based on symmetric pre-shared keys (PSKs), describe use of a resource server (or trust anchor, or trust manager, or collaboration service), local key generators to locally derive a symmetric key, using a key derivation function and an application secret value (that is stored on a secure element on the device endpoint or on a network endpoint) associated with a device identifying key, to circumvent transmitting the PSK between devices.

However, such approaches require use of a secure transport channel over DTLS, TLS, or IPsec on resource constrained devices for device authentication, and further may require the first and second devices to pre-share device identifiers to request the pairing key (i.e., PSK) from the resource server based on identity hints. Other approaches use a first symmetric key to generate a second symmetric key that may require a first (shared) master public key and a (unique) private key per device. Other approaches use a session key associated with an inter-domain authorization token, issued by an authorization provider to a collaboration service, wherein the session key is provided by the collaboration service to a credential management service for the device domain, and further wherein the device must retrieve the session key from the credential management service for the device domain. These other methods thereby advocate a complicated workflow between distributed devices and multiple services configured across domains. Further, these other approaches may require an inbound connection from the resource server to the devices for key revocation and renewal. These other proposed approaches do not fundamentally address the device authentication challenge posed on devices that do not have a secure element as the local root of trust (e.g., a subscriber identity module or SIM, a trusted platform module or TPM, a hardware security module or HSM, or a physically unclonable function or PUF), lack the local compute and memory resources required to establish a secure transport channel over DTLS, TLS, or IPsec, and may further comprise of a plurality of applications executing on the local (client or initiator) device that require use of a unique PSK per remote (server or responder) device. Additionally, without automated PSK lifecycle management, manual intervention is required to pre-provision or reprovision the PSKs posing a scalability problem. While the DTLS and TLS protocols provide for use of PSK based authentication and PSK identity hints during the handshake phase, the key provisioning, authorization, exchange, and management methods are outside the scope of the protocol specifications. Therein lies the major challenge for headless (non-user) and resource constrained connected devices in OT/IIoT/IoT environments. Further, support for the heterogeneous device classes (i.e., device types) require a viable and lightweight underlying transport and network protocol stack, along with a polyglot application programming interface (APIs) for application developers and programming languages (e.g., C, C++, C #, Java, Objective-C, Swift, Rust).

With the emerging trend towards convergence of information technology (IT) and operational technology (OT) workflows, operators are challenged by the complexities of device discovery and inventory management, particularly brownfield and greenfield devices in OT.

Increasingly the necessity and benefits of registering devices into a Domain Name System (DNS) during onboarding with a device owner/operator issued immutable local device identifier (LDevID) is becoming a specification in standards such as Institute of Electrical and Electronics Engineers (IEEE) 802.AR. Using the LDevID as a common name in a X.509 certificate requires buildout of expensive public and private PKI systems, recurring cost of per device certificates, and use of cumbersome key and certificate lifecycle management protocols by manufacturing utilities and line of business applications. This exposes a major technology gap in device pre or late-provisioning at the factory and device onboarding in the field of operations.

Another major technology gap that remains is implementing device authentication and secure data transport between devices and services for data integrity (tamper resistance) and data confidentiality (privacy) without: (a) provisioning digital certificates on devices at the factory (by device manufacturers) or in the field (by device owners/operators); (b) integration with public/private cross-domain PKI systems in production and operational environments; and (c) cumbersome workflows for key and certificate lifecycle management in air-gapped and controlled production environments.

Yet another technology gap that remains is a mechanism for trusted and scalable key exchange between applications required to use of keyed-hash message authentication code (HMAC) for data integrity and authentication. HMAC uses a shared secret instead of generating digital signatures using PKI based cryptography and asymmetric public-private key-pairs. This lack of a trusted and scalable mechanism for key exchange introduces major complexities in the adoption of HMAC authentication by word processing software, document exchange programs, and offline applications.

Yet another technology gap that remains is a mechanism to automate and scale device onboarding in the field, securely and without human errors. Current methods of device onboarding require use of pre-configured device accounts and passwords prior to first-time rendezvous with the device management service. This necessitates cumbersome pre-authorization activities for both the original device manufacturers (OEMs) and device owners/operators in the field. This also requires industry and enterprise-wide consensus on use of specific device identifiers (e.g., MAC addresses, serial numbers) for initial and local identification (based on specifications such as, for example, IEEE 802.1AR) between OEMs and end-users, which is difficult to achieve universally across the millions of brownfield and greenfield multi-vendor devices and device families (types) deployed in the field of operations or on-shelf.

Yet another technology gap that remains is a mechanism to automate and scale secure software updates through the supply chain with zero trust principles for a multi-part content inspection-based approval workflow and multi-person digital signing rules, beyond mere role-based "blind" authorization, to mitigate insider threats and advanced cyber-attacks based on compromise of the golden signing key. Recent high-profile breaches in the upstream supply chain demonstrate the lack of a trustworthy automated and gated workflow across the producer, broker, consumer content distribution ecosystem for IoT/IIoT/OT device software updates.

There are five fundamental market drivers for simplification of data and device protection with an agent-less pre-shared symmetric key distribution service. First, the viability of agent-based solutions as OEMs pushback on co-resident agents due to supply chain concerns and associated manufacturing and support costs. Second, the application complexity introduced by requiring developers to configure, protect, and manage keys and certificates for secure communications and data protection. Fundamentally, a certificate linked to a device identifier for device authentication is a device management function, and key usage linked to the security transport and network stack is a protocol layer function. This results in a long-tail development cycle introducing delays in product releases. Third, the operational complexity in certificate and key lifecycle management and key protection on field devices, impacts high availability of services to field devices. This may result in service disruptions and remediation activities in the field. Fourth, the interoperability challenges that emerge with multi-vendor equipment, diverse operating systems and processor platforms, resource constraints on brownfield and low-cost greenfield devices, and multi-party protocol stack implementations. And finally, infrastructure costs that increase the total cost of ownership, with PKI buildout and support, hybrid PKI systems between the device manufacturer and device operator, and certificate services for certificate management.

The adoption of blockchain technology to harvest, store, and analyze data from millions of distributed devices using cloud-hosted artificial intelligence (AI) and machine learning (ML) models faces implementation, scalability, and security/privacy challenges. For high scalability and security, smart contracts and transactions require immutable and authoritative real identities from connected leaf devices and edge gateways. Implementing PKI based systems and certificate-based authentication is expensive and cumbersome to manage at scale. Therefore, authentication methods based on proof of zero-knowledge and zero-trust networking are the essential building blocks of blockchain implementation models.

The IETF Manufacturer Usage Description Specification (MUD) https://datatracker.ietf.org/doc/html/draft-ietf-opsawg-mud-13 is not intended to address network authorization. IETF RFC-5280 defines use of an IP address or a domain name system (DNS) label in the subject alternate name (SAN) extension field in a certificate signing request (CSR). The Certificate Authority (CA)/Browser (CAB) forum's "Baseline Requirement Certificate Policy for the Issuance and Management of Publicly-Trusted Certificates" imposes restrictions on the use of IP addresses in certificates. The applicant must provide evidence of practical control of the IP address by for example performing a reverse-IP address lookup and then verifying control over the resulting domain name. This requires an embedded static IP address in the issued long-lived certificate. IP addresses may be dynamically assigned and are therefore mutable.

SUMMARY OF THE DISCLOSURE

A system and method to protect devices in Internet of Things (IoT), Industrial IoT (IIoT), and Operational Technology (OT) environments with application security by design to authenticate and communicate securely with data integrity and confidentiality, without requiring PKI based digital certificates and asymmetric keypairs on devices, or complicated key and certificate lifecycle management services from certificate authorities or managed security service providers.

The proposed system and method provide a key distribution service (KDS) to generate, distribute, and manage symmetric pre-shared keys at scale for use by applications on authenticated and domain validated devices in a permissioned device group to establish secure communications with pre-shared symmetric keys for data protection (i.e., integrity, authentication, privacy, confidentiality) and PSK based TLS authentication.

The proposed system and method provide device authentication using the KDS, or local KDS proxy installed on a server registered as a member device, to perform a secure and authenticated Domain Name System (DNS) server reverse lookup of the device's IP address (based on a DNS A record) and match the resolved DNS hostname (based on a DNS PTR, ALIAS or CNAME resource record) with the member identifier in the digitally signed KDS request.

According to an exemplary embodiment, the present disclosure provides a cost-effective, automated, and scalable symmetric pre-shared key distribution service for private (Enterprise, Tactical) and public (Internet) networks; permissioned group membership for devices with DNS domain validation; simplifies key generation, distribution, and management; and eliminates complicated certificate provisioning, key renewal, and key/certificate lifecycle management workflows, depending on implementation.

According to yet another exemplary embodiment, the present disclosure provides flexible deployment modes to host the key distribution service (KDS) on-premises or in the cloud as a multi-tenant software-as-a-service (SaaS). The KDS proxy may be hosted on-premises to locally perform device authentication and domain validation and proxy the authenticated device's requests for services to a cloud-hosted KDS SaaS. The tenant identifier configured for the KDS proxy server (device), and the local member devices must be the same. The KDS proxy installed on an on-premises server registers the server as a member device with the KDS (over UDP, TCP, or TLS) to retrieve the API token and API secret required for authenticated REST APIs to perform proxy transactions with the KDS on behalf of the local member devices. The KDS proxy retrieves the PSK for the group identifier (e.g., "KDS Proxy Servers"), and PSK identity hint (e.g., a UUID) configured in the server (device) configuration file to acquire the API secret and API token for authenticated REST APIs. The PSKs for the KDS proxy servers must be pre-configured on the KDS portal under the designated group identifier.

The disclosed method provides significant security improvements and efficiencies to retrofit legacy brownfield devices for secure communications and data protection with on-demand, simplified, and automated pre-shared key lifecycle management.

The disclosed system and method provide security for a plurality of inter-device and intra-device communications protocols including, at least, the connection-less User Datagram Protocol (UDP), connection-oriented Transmission Control Protocol (TCP), Internet Protocol (IP v4/v6), Controller Area Network Bus (CAN Bus), Modbus (over TCP/UDP), Highway Addressable Remote Transducer (HART), WirelessHART, and RS232 serial communications protocol. The CAN Bus, HART, Modbus networks may be bridged to an Ethernet (ETH) network using an intermediary device (CAN-ETH adapter, or HART-ETH adapter, or Modbus over TCP/UDP) that serves as a gateway between a software application program executing on an application server device on the Ethernet network and the CAN/HART devices on the respective CAN Bus and HART network. The security capabilities for the WirelessHART network may be enriched through integration of the WirelessHART security manager with the KDS.

The WirelessHART security protocol and architecture uses pre-shared join keys between wireless devices, a network manager, and a security manager associated with a WirelessHART network. The security manager is responsible for the generation, storage, renewal, and revocation of the keys. The network manager authenticates devices using a device unique or shared pre-shared join key and distributes network, unicast and broadcast session keys. The WirelessHART protocol does not specify authentication, key management and distribution to wired or mobile devices, support for device groups, support for device domain enrollment (e.g., into DNS managed network domains), support for multicast communication, authorization and transactional accounting security services (for the non-IP addressable devices), cryptographic agility to configure key sizes and algorithms for quantum resistant ciphers (only specifies the AES-128 CBC-MAC and counter mode of encryption and keyed message integrity check), or integration of wireless and legacy HART devices. Further the pre-shared join keys must be configured on all the wireless devices and stored on the security manager. Because the join key serves as an authentication method to assert that the devices (e.g., sensors, gateways) are listening to the advertisement broadcast on the network to request admission to join the network, the scope of the device enrollment is restricted to the broadcast range, rather than to a domain level scope.

Alternate approaches based on quantum safe (QS) networks and quantum key exchange protocols require a constellation of satellites, a plurality of user ground stations, QS registration servers, device accounts on QS servers, quantum distributed keys on end-point devices, physical channels to QS registration servers for end-point device provisioning, and a quantum reference application that must be installed and executed on the user end-point device to establish QS communication channels. In contrast, the proposed system and method for headless (non-user) devices in OT, IoT, and IIOT ecosystems (a) uses the Enterprise domain name system (DNS) service over TLS/HTTPS for domain based device enrollment, identification, and authentication based on digitally signed resource records retrieved using Domain Name System Security Extensions (DNSSEC); (b) uses the Enterprise dynamic host configuration protocol (DHCP) service to automatically discover device attributes based on scope; (c) does not require physical or network connectivity to the key distribution service (KDS); (d) does not require device provisioning at manufacture or point of sale; (e) requires no agent application to be installed or executed on the end-point device; (f) does not require reengineering of the security transport stack; (g) operates over standard security protocols (e.g., TLS, IPsec), transport protocols (e.g., TCP, UDP, CAN Bus, Modbus (over TCP/UDP), HART, WirelessHART, RS232 serial), and networking (e.g., IP, non-IP) protocols; (h) uses a secure key exchange protocol between the first and second device (e.g., DH, ECDH, CRYSTALS-Kyber); and (i) distributes symmetric pre-shared keys (PSKs) to authenticated member devices based on group identifiers and PSK identity hints, wherein the peer applications communicate a PSK identity hint during a communications handshake for client authentication, or to establish a secure communication channel for data encryption using the associated PSK, or for data authenticity in a consumer-producer transaction.

In one exemplary embodiment of the proposed system and method, device identification may be performed using a registered DNS hostname (via a PTR, ALIAS or CNAME DNS record) of a DNS domain enrolled device, or the SIM ICCID of a mobile device registered with a mobile service provider. The device DNS hostname may be configured manually or dynamically on the DNS server. For domain enrolled resource slack devices (e.g., general purpose operating system (GPOS) based edge gateways, greenfield downstream devices) with a native dynamic DNS client, the DNS may be configured dynamically with the device hostname. For resource constrained devices, where user installable aftermarket software is not permitted by the OEM, the DHCP server may be configured with an extensible custom attribute for the network domain part (e.g., acme.com) and the device initial DNS hostname may be inferred using the MAC address or serial number of the device as the prefix (e.g., 001B44113AB7.acme.com or Y9831031.acme.com). The KDS may be configured to use the inferred device initial DNS hostname to automatically (extract and) configure the MAC address or serial number of the member device as the member UUID. A DNS alias for the device may be configured manually later with an operator-friendly hostname (e.g., camera-lobby-west.acme.com). A contract manufacturer or OEM may provide a manifest (batch) of MAC addresses or serial numbers of the devices for Enterprise IT administrators to pre-configure the DNS server with address (A) and PTR records for the anticipated devices.

In one exemplary embodiment of the proposed system and method, device two-factor authentication may be performed using the group shared or device unique member key as the first factor and the device unique identifier (e.g., DNS hostname or SIM ICCID) as the second factor.

A common use case with headless operational technology devices is authentication with trusted non-repudiable identity prior to initiating a session key exchange for secure transactions with services or peer devices. A client application executes on device A, and a server application executes on device B. Both the devices are set-up with a device configuration that includes the basic set of parameters to rendezvous with the key distribution service (KDS) directly or through an on-premises KDS proxy. The proposed method is agent-less, may be deployed on brownfield, greenfield or mobile devices, and the applications may use the retrieved keys for data authentication or encryption with any protocol stack or crypto engine. The devices are enrolled into the network domain. Both address (A) and pointer (PTR) records are configured in DNS for IP address reverse lookup-based device domain verification. For mobile devices, the device IMSI identifier is used for device verification with the mobile service provider with a challenge for proof of possession of the authentication key. The device may be configured automatically using the KDS interface APIs to retrieve vendor specific information from the DHCP server. The device is authenticated by the KDS proxy over a secure channel with a security challenge as the first factor of authentication and authenticated for device domain verification by the DNS server as the second factor of authentication. The application may use a pre-shared key identity hint to create or retrieve a key over the secure channel. All key operations for status verification, renewals, and deletion are performed over the secure channel with two-factor device authentication. The application may use the retrieved keys for client authentication over TLS-PSK, data authentication and data encryption over insecure UDP, TCP, or non-IP protocols. The retrieved keys may also be used for partial and selective message encryption, content signing, or supply chain tamper resistance.

In one exemplary embodiment, a method is executed for generating, distributing, and managing the lifecycle of a symmetric pre-shared key (PSK) for client authentication (C-PSK) between applications executing on distributed devices including a client application executing on a client device, a server application executing on a server device, a key distribution service (KDS), a KDS proxy, a KDS interface, a symmetric KDS member PSK (M-PSK), a M-PSK identity hint, a tenant identifier, a device group identifier associated with the tenant identifier, a member domain associated with the group identifier, an application identifier associated with the group identifier, a C-PSK identity hint, a key record, a dynamic host configuration protocol (DHCP) server, and a domain name system (DNS) server. The method includes authenticating, with the KDS, by the client application executing on the client device, using the configured tenant identifier, symmetric KDS member PSK (M-PSK) and M-PSK identity hint, wherein the client device is registered by a DNS hostname on the DNS server configured with a KDS or KDS proxy, and configured as a member of a device group on the KDS. The method further includes acquiring, by the client application the C-PSK from the KDS, using at least the group identifier and C-PSK identity hint, for use as a shared symmetric key for client authentication over a secure transport protocol to communicate with the server application executing on the server device registered by a DNS hostname in the DNS server, wherein the server device is configured as a member of the device group on the KDS. The method further includes authenticating, with the KDS, by the server application executing on the server device, using the configured tenant identifier, symmetric KDS member PSK (M-PSK) and the M-PSK identity hint, wherein the server device is registered by a DNS hostname on the DNS server configured with a KDS or KDS proxy, and configured as a member of a device group on the KDS. The method further includes acquiring, by the server application the C-PSK from the KDS, using at least the group identifier and C-PSK identity hint, for use as a shared symmetric key for client authentication over a secure transport protocol to communicate with the client application executing on the client device registered by a DNS hostname in the DNS server, wherein the client device is configured as a member of the device group on the KDS. The method further includes initiating, by the client application a TLS-PSK session using the acquired C-PSK for the client device in the device group as the PSK for client authentication, to establish secure communications with the server application executing on the server device. The method further includes renewing, by the client and server applications, the C-PSK for client authentication upon expiry or for high velocity key rotation, programmatically and automatically using the KDS interface, without requiring human intervention, and without service disruption.

The approach additionally includes methods wherein:
the device member authentication handshake is performed by the KDS interface on the client and server devices using the tenant identifier, the device member PSK (M-PSK) and M-PSK identity hint for the first factor of device authentication, and further wherein the session key is generated using a key exchange handshake between the KDS interface and the KDS or KDS proxy, and further wherein the device member validation for the second factor of device authentication is performed by:

performing, by the KDS or KDS proxy, a DNS reverse lookup of the device member IP address to query for the DNS hostname;

retrieving, by the KDS or KDS proxy, the DNS hostname from the resource record in the DNS response; and comparing and matching, by the KDS or KDS proxy, the retrieved DNS hostname with the device member identifier in the KDS requests.

The approach further includes methods wherein:

the device authentication and key exchange handshakes may be performed over a connection-less UDP or connection-oriented TCP transport protocol, without requiring a security transport protocol such as DTLS, TLS or IPsec, and further wherein data authentication and/or data encryption may be performed with the retrieved pre-shared keys over any communications protocol such as UDP/IP, TCP/IP, or non-IP protocols.

The KDS interface provides the application programming interface (APIs) for the client and server applications to send requests and receive responses for key operations directly to/from the KDS, or indirectly through the KDS proxy.

The client and server devices are registered by a unique DNS hostname in the domain on a local DNS server with an IP address (A) record and a PTR record for DNS hostname reverse lookup.

On the KDS the client and server devices are configured as members of the tenancy associated with the tenant identifier and the device group associated with the tenant identifier, and further wherein the device group is configured with a key record that includes a key instance (C-PSK) for client authentication.

The key record configured for the device group on the KDS includes a key expiration timestamp and a key status to manage automatic key renewal, key rotation, and key revocation operations on the KDS.

The key record configured for the device group on the KDS includes a key token for the client application to send an authenticated API request to the server application using the key instance as an API shared secret and the key token as an API shared token and further wherein the API request may be a REST API request.

An authenticated member device's request for any key operation, based on the group identifier and C-PSK identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, C-PSK identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and C-PSK identity hint, may be processed by the KDS and permitted based on a match of the member device tenant identifier with the associated license owner identifier retrieved from the DHCP server as vendor specific member device information.

A device unique C-PSK identity hint may be generated by the client application to create a device unique PSK for client authentication (C-PSK) using a device unique registration identifier and a derivation function (for example, a HMAC-SHA256 algorithm).

In another exemplary embodiment, a method is executed for generating, distributing, and managing the lifecycle of a symmetric pre-shared key (PSK) for secure communications (S-PSK), for use between applications executing on distributed devices including an client application executing on an client device, a server application executing on a server device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a S-PSK identity hint, a derived device key (D-PSK) a key record, a dynamic host configuration protocol (DHCP) server, and a domain name system (DNS) server. The method includes authenticating, with the KDS, by the client application executing on the client device, using the configured tenant identifier, symmetric KDS member PSK (M-PSK) and M-PSK identity hint, wherein the client device is registered by a DNS hostname on the DNS server configured with a KDS or KDS proxy, and configured as a member of a device group on the KDS. The method further includes acquiring, by the client application the S-PSK from the KDS, using at least the group identifier and S-PSK identity hint, for use as a shared symmetric key to secure communications over an insecure transport protocol and communicate with a server application executing on the server device registered by a DNS hostname on the DNS server, wherein the server device is configured as a member of the device group. The method further includes authenticating, with the KDS, by the server application executing on the server device, using the configured tenant identifier, symmetric KDS member PSK (M-PSK) and M-PSK identity hint, wherein the server device is registered by a DNS hostname on the DNS server configured with a KDS or KDS proxy, and configured as a member of a device group on the KDS. The method further includes acquiring, by the server application the S-PSK from the KDS, using at least the group identifier and S-PSK identity hint, for use as a shared symmetric key to secure communications over an insecure transport protocol and communicate with the client application executing on the client device registered by a DNS hostname on the DNS server, wherein the client device is configured as a member of the device group. The method further includes protecting, by the client application executing on the client device, using the acquired S-PSK the authenticity and/or the confidentiality of data in communications with the server application executing on the server device over an insecure connection-oriented or connection-less transport protocol. The method further includes protecting, by the server application executing on the server device, using the acquired S-PSK the authenticity and/or the confidentiality of data in communications with the client application executing on the client device over an insecure connection-oriented or connection-less transport protocol. The method further includes renewing, by the client and server applications, the S-PSK for secure communications upon expiry, or for high velocity key rotation, programmatically and automatically using the KDS interface, without requiring human intervention, and without service disruption.

The approach additionally includes methods wherein:

the device member authentication handshake is performed by the KDS interface on the client and server devices using the tenant identifier, the device member PSK (M-PSK) and M-PSK identity hint for the first factor of device authentication, and further wherein the session key is generated using a key exchange handshake between the KDS interface and the KDS or KDS proxy, and further wherein the device member validation for the second factor of device authentication is performed by:

performing, by the KDS or KDS proxy, a DNS reverse lookup of the device member IP address to query for the DNS hostname; and retrieving, by the KDS or KDS proxy, the DNS hostname from the resource record in the DNS response; and comparing and matching, by the KDS or KDS proxy, the retrieved DNS hostname with the device member identifier in the KDS requests.

The approach further includes methods wherein: the device authentication and key exchange handshakes may be performed over a connection-less UDP or connection-oriented TCP transport protocol, without requiring a security transport protocol such as DTLS, TLS or IPsec, and further wherein data authentication and/or data encryption may be performed with the retrieved pre-shared keys over any communications protocol such as UDP/IP, TCP/IP, or non-IP protocols.

The KDS interface provides the application programming interface (APIs) for the client and server applications to send requests and receive responses for key operations directly to/from the KDS, or indirectly through the KDS proxy.

The client and server devices are registered by a unique DNS hostname in the domain on a local DNS server with an IP address (A) record and a PTR record for DNS hostname reverse lookup.

On the KDS the client and server devices are configured as members of the tenancy associated with the tenant identifier and the device group associated with the tenant identifier, and further wherein the device group is configured with a key record that includes a key instance (S-PSK) to secure communications between the client and server applications.

The key record configured for the device group on the KDS includes a key expiration timestamp and a key status to manage automatic key renewal, key rotation, and key revocation operations on the KDS.

Prior to acquiring the S-PSK from the KDS by the client application, the S-PSK is created on the KDS by the server application with the server member device as the key creator and with restricted key usage permissions, for example, for data authentication, data encryption, content (producer or broker) signing, broadcast signing, broadcast encryption, multicast signing, multicast encryption, token signing, or token encryption operations.

The acquiring of the S-PSK from the KDS by the client application restricts key usage based on the permissions configured by the key creator.

The key record configured for the device group on the KDS includes a key token for the client application to send an authenticated API request to the server application using the key instance as an API shared secret and the key token as an API shared token and further wherein the API request may be a REST API request.

An authenticated member device's request for any key operation, based on the group identifier and S-PSK identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, S-PSK identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and S-PSK identity hint, may be processed by the KDS and permitted based on a match of the member device tenant identifier with the associated license owner identifier retrieved from the DHCP server as vendor specific member device information.

A derived device key (D-PSK) may be created locally, just-in-time on-demand and not stored locally, using the retrieved S-PSK and a device unique identifier as the registration identifier for the client and server applications to sign and/or encrypt messages or tokens for data authentication and/or privacy.

In another exemplary embodiment, a method is executed for certificate-less authentication and validation of mobile devices including an application executing on a mobile device, a key distribution service (KDS), a KDS interface, a SIM on the mobile device, a device directory service (DDS), and a mobile service provider (MSP) associated with the mobile device. The mobile device member authentication handshake is performed by the KDS interface on the client mobile device using the tenant identifier, the device member PSK (M-PSK) and M-PSK identity hint for the first factor of device authentication, and further wherein the session key is generated using a key exchange handshake between the KDS interface and the KDS or KDS proxy, and further wherein the device member validation for the second factor of device authentication is performed by:

receiving, by the KDS from the mobile device, the integrated circuit card identifier (ICCID), international mobile equipment identity (IMEI), and International Mobile Subscriber Identity (IMSI) information of the mobile device; and sending, by the KDS to the mobile device, a nonce for signing by the SIM on the mobile device using the authentication key stored securely within the SIM, wherein the storage location may be in the card circuitry or on an applet on the SIM; and receiving, by the KDS from the mobile device, the signed nonce; and sending, by the KDS to the mobile services provider of the mobile device, the nonce and IMSI for signing using the associated authentication key of the mobile device; and authenticating, by the KDS, the mobile device by comparing and matching the signed nonces received from the mobile device and the mobile service provider to authenticate and validate the mobile device.

The approach additionally includes methods wherein: an authenticated mobile member device's request for any key operation, based on the group identifier and C-PSK or S-PSK identity hint, may be processed by the KDS and permitted based on a match of the member device tenant identifier with the associated license owner identifier retrieved from the DDS as vendor specific member device information.

In another exemplary embodiment, a method is executed for generating, distributing, and managing the lifecycle of a symmetric pre-shared key (PSK) for certificate-less selective encryption (S-PSK) of partial sections of messages over insecure transport, for use between applications executing on distributed devices including an client application executing on an client device, a server application executing on a server device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a S-PSK identity hint, a key record, a dynamic host configuration protocol (DHCP) server, and a domain name system (DNS) server. The method includes retrieving, by an client application, the pre-shared key from the KDS using at least the group identifier and S-PSK identity hint; selectively encrypting with the received pre-shared key, by the client application, partial sections of messages transmitted over the network; retrieving, by a server application, the pre-shared key from the KDS using at least the group identifier and S-PSK identity hint; and selectively decrypting with the received pre-shared key, by the server application, the selectively encrypted partial sections of messages received over the network.

The approach additionally includes methods wherein: an authenticated member device's request for any key operation, based on the group identifier and S-PSK identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, S-PSK identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and S-PSK identity hint, may be processed by the KDS and permitted based on a match of the member device tenant identifier with the associated license owner identifier retrieved from the DHCP server as vendor specific member device information.

In another exemplary embodiment, a method is executed for generating, distributing, and managing the lifecycle of a symmetric pre-shared key (PSK) for certificate-less selective encryption (S-PSK) of partial sections of messages over insecure transport, for use between applications executing on distributed mobile devices including an client application executing on an client mobile device, a server application executing on a server mobile device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a S-PSK identity hint, a key record, a device directory service (DDS), and a mobile service provider (MSP) server.

The approach additionally includes methods wherein: an authenticated member device's request for any key operation, based on the group identifier, S-PSK identity hint, and application identifier, may be processed by the KDS and permitted based on a match with an application identifier associated with the group identifier to allow or deny the key operation.

An authenticated member device's request for any key operation, based on the group identifier and S-PSK identity hint, may be processed by the KDS and permitted based on a match of the member device tenant identifier with the associated license owner identifier retrieved from the DDS as vendor specific member device information.

In another exemplary embodiment, a method is executed for generating, distributing, and managing the lifecycle of symmetric pre-shared keys (PSKs) for certificate-less document security with selective object encryption, for use between applications executing on distributed devices including a producer application executing on a producer device, a consumer application executing on a consumer device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a key record, a dynamic host configuration protocol (DHCP) server, a device directory service (DDS), and a domain name system (DNS) server. The method includes creating, by the producer application on the KDS, pre-shared keys with identity hints; encrypting embedded objects within a document, by the producer application, selectively using the retrieved pre-shared keys, wherein the producer application may be a word processing software or a document exchange program, and further wherein different embedded objects may be encrypted with different pre-shared keys, and further wherein the pre-shared key identity hint is tagged with the respective encrypted embedded object; sending, by the producer application to the consumer application, the document with the embedded encrypted objects and the tagged pre-shared key identity hints; retrieving, by the consumer application from the KDS, using at least the group identifier and pre-shared key identity hint, the pre-shared keys for the pre-shared key identity hints tagged with the respective encrypted embedded objects in the received document, for decryption; and restricting access privileges to the encrypted embedded objects within the document, by the consumer application, on devices authenticated and validated by the KDS, wherein the consumer application may be a word processing software or a document exchange program.

The approach additionally includes methods wherein: an authenticated member device's request for any key operation, based on the group identifier and pre-shared key (PSK) identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, pre-shared key (PSK) identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and pre-shared key identity hint, may be processed by the KDS and permitted based on a match of the member device tenant identifier with the associated license owner identifier retrieved from the DHCP server or DDS as vendor specific member device information.

In another exemplary embodiment, a method is executed for generating, distributing, and managing the lifecycle of a symmetric pre-shared key (PSK) for certificate-less keyed hash message authentication code (HMAC) based content signing for tamper resistance, for use between applications executing on distributed devices including a producer application executing on a producer device, a consumer application executing respectively on a consumer device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a key record, a dynamic host configuration protocol (DHCP) server, a device directory service (DDS), and a domain name system (DNS) server. The method includes creating, by a producer application on the KDS, a symmetric pre-shared key with an associated pre-shared key (PSK) identity hint; signing, by the producer application, digital content using the created pre-shared key; generating, by the producer application an associated signature manifest with the tenant identifier, group identifier, digital signature, and pre-shared key identity hint; sending, by the producer application to the consumer applications, the signed digital content and the associated signature manifest; receiving, by the consumer application, the signed digital content and the associated signature manifest with the tenant identifier, group identifier, digital signature, and the pre-shared key identity hint; retrieving, by the consumer application from the KDS, using at least the tenant identifier, group identifier, and pre-shared key identity hint, the pre-shared key for the pre-shared key identity hint in the received signature manifest; and verifying, by the consumer application, the received signed digital content using the retrieved pre-shared key to regenerate the digital signature and compare for match with the digital signature in the received signature manifest.

The approach additionally includes methods wherein: an authenticated member device's request for any key operation, based on the group identifier and pre-shared key (PSK) identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, pre-shared key (PSK) identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and pre-shared key identity hint, may be processed by the KDS and permitted based on a match of the member device tenant identifier with the associated license owner identifier retrieved from the DHCP server or DDS as vendor specific member device information.

In another exemplary embodiment, a method is executed for generating, distributing, and managing the lifecycle of symmetric pre-shared keys (PSKs) for certificate-less keyed hash message authentication code (HMAC) based content signing for supply chain tamper resistance, for use between applications executing on distributed devices including a broker application executing on a broker device, a consumer application executing respectively on a consumer device, a key distribution service (KDS), a KDS proxy, a KDS interface, a symmetric KDS member M-PSK, a M-PSK identity hint, a tenant identifier, a device group identifier associated with the tenant identifier, a member domain associated with the group identifier, an application identifier associated with the group identifier, a key record, a dynamic host configuration protocol (DHCP) server, a device directory service (DDS), and a domain name system (DNS) server. The method includes receiving, by a broker application, signed digital content and an associated signature manifest; creating, by the broker application, an additional pre-shared key on the KDS; signing, by the broker application, the received signed digital content using the created pre-shared key to generate an extended signed digital content; appending, by the broker application, the tenant identifier, group identifier, additional digital signature, and additional associated pre-shared key identity hint to the received signature manifest to generate an extended signature manifest; sending, by the broker application to the consumer applications, the extended signed digital content and the associated extended signature manifest; receiving, by the consumer application, the extended signed digital content and the associated extended signature manifest with the tenant identifiers, group identifiers, digital signatures, and the pre-shared key identity hints; retrieving, by the consumer application from the KDS, using at least the tenant identifier, group identifier, and pre-shared key identity hint, the pre-shared keys for the identity hints in the received extended signature manifest; and verifying, by the consumer application, the received extended signed digital content using the retrieved pre-shared keys to regenerate the digital signatures and compare for match with the respective digital signatures associated with the respective identity hints in the received extended signature manifest.

The approach additionally includes methods wherein: an authenticated member device's request for any key operation, based on the group identifier and pre-shared key (PSK) identity hint, may be processed by the KDS and permitted based on a match of the member domain with the domain (i.e., domain name and top-level domain suffix parts) derived from the resource records retrieved by the DNS reverse lookup for the member device DNS hostname.

An authenticated member device's request for any key operation, based on the group identifier, pre-shared key (PSK) identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and pre-shared key identity hint, may be processed by the KDS and permitted based on a match of the member device tenant identifier with the associated license owner identifier retrieved from the DHCP server or DDS as vendor specific member device information.

In another exemplary embodiment, a method is executed for agent-less device risk monitoring including a machine learning model, a multi-dimensional feature matrix, harvested device intelligence, a threat intelligence provider, a device management system, and a network activity monitoring system. The method includes selecting an algorithm to build a machine learning model using a multi-dimensional feature matrix with harvested device intelligence as training datasets; building a multi-dimensional feature matrix that includes device tenancy, group memberships, key type and usage profile, volume of key usage, rate of key rotation, and application identifiers (e.g., file name, file hash); extending the feature matrix with imported application-based indicators of compromise from the external forensics-based threat intelligence provider that includes content integrity measurement and vulnerability assessments comprising of scores categorized by, for example, application reputation, static/dynamic analysis, runtime introspection analysis, domain generation algorithm (DGA) analysis, obfuscation level, unpacking level, IP address and domain reputation, geo-location, autonomous system numbers (ASNs), and IP address age; extending the feature matric by retrieving device properties (e.g., model, manufacturer, identifiers, attributes, update history) from the device management system; extending the feature matrix by retrieving flow records for connection history of inter-device communications from the network activity monitoring system; predicting the device risk score using the multi-dimensional feature matrix for linear regression; and classifying a security event as true positive, false positive, true negative, or false negative using an unsupervised model, multi-layer deep learning network networks, and the multi-dimensional feature matrix for logistic regression.

A common use case with wireless operational technology devices is secure provisioning at the factory on a manufacturer network, and onboarding in the field on a production network. A main or purpose-built onboarding application on a device A must connect to a secure wireless access point (WAP) in the production network. The manufacturer of the device is provided with the guest SSID and guest pre-shared key to connect the device to the guest wireless network. The device must be switched with zero-touch from the guest wireless network to the secure wireless network during device onboarding in the production network. The wireless access point is configured for multi-SSID mode of operation with different SSIDs and pre-shared keys for the guest and secure wireless networks. Device A is setup with a device configuration that includes the basic set of parameters to rendezvous with the KDS directly or through an on-premises KDS proxy, and the internal key identity hint to retrieve the internal pre-shared key for the internal SSID. The guest SSID and guest pre-shared key are configured in the main or onboarding application. Device A is enrolled into the network domain. Both address (A) and pointer (PTR) records are configured in DNS for IP address reverse lookup-based device domain verification. Device A authenticates with the wireless access point using the guest pre-shared key to connect to the guest wireless network. Device A may be configured automatically using KDS interface APIs to retrieve vendor specific information from the DHCP server. The internal SSID may be retrieved from DHCP attributes for the scope. Device A is authenticated by the KDS proxy over a secure channel with a security challenge as the first factor of authentication and authenticated for device domain verification by the DNS server as the second factor of authentication. The application uses the internal pre-shared key identity hint to retrieve the pre-shared key for the secure wireless network over the secure channel. The application uses the retrieved internal pre-shared key to authenticate with the wireless access point over the secure wireless network.

In another exemplary embodiment, a method is executed for distributing a symmetric internal wireless access point (WAP) pre-shared key (IWAP-PSK) for secure wireless authentication by a device with a WAP in a production network including a supplicant program executing on the device, the WAP configured for multi-SSID (service set identifier) mode of operation, a key distribution service (KDS), a KDS proxy, a KDS interface, a symmetric KDS member PSK (M-PSK), a M-PSK identity hint, a tenant identifier, a device group identifier associated with the tenant identifier, a member domain associated with the group identifier, an application identifier associated with the group identifier, the IWAP-PSK identity hint, an internal WAP SSID (IWAP-SSID), a guest WAP pre-shared key (GWAP-PSK), a guest WAP SSID (GWAP-SSID), a key record, a dynamic host configuration protocol (DHCP) server, and a domain name system (DNS) server. The method includes authenticating, by the supplicant program with the WAP, using the GWAP-SSID and GWAP-PSK to establish initial wireless access for the device over the production network. The method further includes authenticating, with the KDS, by the supplicant program executing on the device, using the configured tenant identifier, symmetric KDS member PSK (M-PSK) and M-PSK identity hint, wherein the client device is registered by a DNS hostname on the DNS server configured with a KDS or KDS proxy, and configured as a member of a device group on the KDS. The method further includes retrieving, by the supplicant program the IWAP-PSK from the KDS, using at least the group identifier and IWAP-PSK identity hint, for use as a shared symmetric key for authentication with the wireless access point. The method further includes authenticating, by the supplicant program with the WAP, using the IWAP-SSID and retrieved IWAP-PSK to establish secure wireless access for the device over the production network to perform a switch-over from the guest SSID to internal SSID wireless network.

The approach additionally includes methods wherein: on the KDS the device is configured as a member of the tenancy associated with the tenant identifier and the device group associated with the tenant identifier, and further wherein the device group is configured with a key record that includes a key instance (IWAP-PSK) for secure wireless authentication.

An authenticated member device's request for any key operation, based on the group identifier and IWAP-PSK identity hint, may be processed by the KDS and permitted based on a match of the member domain with the domain (i.e., domain name and top-level domain suffix parts) derived from the resource records retrieved by the DNS reverse lookup for the member device DNS hostname.

The GWAP-SSID, GWAP-PSK, IWAP-SSID, M-PSK, and M-PSK identity hint may be factory configured attributes on the executable application image or system firmware on a real time operating system (RTOS) platform or specified through a configuration file on a general purpose operating system (GPOS) platform.

The primary and secondary KDS/KDS proxy URLs, the tenant identifier, and the group identifier and identity hints associated with the production WAP for secure access may be discovered using network characteristics based on custom attributes configured on a DHCP server, or a DNS server, associated with the member device LAN.

An authenticated member device's request for any key operation, based on the group identifier, IWAP-PSK identity hint, and application identifier, may be processed by the KDS and permitted based on a match with an application identifier associated with the group identifier to allow or deny the key operation.

The device specific information configured as extended custom attributes for a member device may be retrieved from the DHCP server using extended KDS interface APIs to automate local device configuration and export vendor specific member device information to the KDS.

An authenticated member device's request for any key operation, based on the group identifier and IWAP-PSK identity hint, may be processed by the KDS and permitted based on a match of the member device tenant identifier with the associated license owner identifier retrieved from the DHCP server as vendor specific member device information.

The supplicant program may detect a change in the IWAP-PSK based on failure to authenticate with the WAP using the IWAP-SSID and last retrieved and stored IWAP-PSK, and automatically switch-over to the guest wireless network using the GWAP-SSID and GWAP-PSK, authenticate with the KDS, retrieve a IWAP-PSK from the KDS, and authenticate with the WAP using the IWAP-SSID and retrieved IWAP-PSK to switch-over to the secure wireless network.

The supplicant program for security reasons may not store the last retrieved IWAP-PSK locally on the device, and dynamically at power cycle or application restart, authenticate with the guest wireless network using the GWAP-SSID and GWAP-PSK, authenticate with the KDS, retrieve an IWAP-PSK from the KDS, and authenticate with the WAP using the IWAP-SSID and retrieved IWAP-PSK to switch-over to the secure wireless network.

The supplicant program may be a Wi-Fi supplicant, or a Wi-Fi supplicant function implemented within a production application or system firmware.

The member device DNS hostname on the local DNS server is equivalent to, and may also serve as, the local device identifier (LDevID) as described in the Institute of Electrical and Electronics Engineers (IEEE) 802.1AR standard for device identification.

The disclosed system and method provide for the automated management, on the KDS, of the status, renewal, and revocation (administratively or explicitly by the key creator) of the PSKs distributed to member devices by the KDS. This resolves major operational and administrative challenges commonly attributed in PKI based solutions to the additional cost of certificate revocation, the overheads associated with managing and distributing a large certificate revocation list (CRL) to resource constrained devices, querying the certificate status online or processing the CRL by real time applications that require low latencies at runtime, and the complexities associated with implementing a key renewal method for key lifecycle management on headless devices.

The disclosed system and method provide for the just-in-time on-demand retrieval of symmetric pre-shared keys by embedded applications and embedded devices without requiring local persistence (storage) of the retrieved keys. Cloud based services and microservices may require pre-shared keys for digitally signed tokens, for example shared access signature (SAS) tokens, to provision devices and establish authenticated connections. Microservices (for example, authorization services) may require pre-shared keys to encrypt access tokens for secure distribution to requestors (e.g., client applications on devices). The key exchange ceremony with the cloud-based service may require securing retrieving and storing a nonce (i.e., a symmetric pre-shared key) on a local secure element (e.g., a trusted platform module or TPM) and using the secured nonce to sign and/or encrypt a service token in future transactions. A local hardware, firmware, or software based secure element may not be available on legacy/brownfield devices and a significant majority of resource slack low-cost greenfield devices. Further, resource constrained devices lack writable storage space on non-volatile random-access memory (NVRAM), flash, or hard disk drive (HDD) to persist data objects. Use of PKI based key pairs and explicitly trusted certificates is a complicated and hard-to-scale solution due to compute, memory, and storage limitations. Therefore, the ability to dynamically retrieve and use pre-shared keys on-demand from a KDS, without persisting the retrieved keys locally or requiring pre-provisioned keys, enables application security by design on low-cost and resource constrained devices.

A system and method for the dynamic retrieval of PKI based trusted intermediate and root certificates, leaf certificates and associated private keys, by applications (client, server, or command line utilities) executing on a device with two-factor device authentication and application programming interface (APIs) in any modern programming language, without installing agents on the device. The key distribution service (KDS) interface provides the application programming interface (APIs) for the applications to send requests and receive responses for certificate operations directly to/from the KDS, or indirectly through the KDS proxy. The certificates may be imported (in single or batch mode), renewed, or rekeyed through the KDS portal. The trusted applications may retrieve trusted certificates, the leaf certificate and associated private key, and verify certificate status using the KDS APIs. The KDS enforces policy-based authorization with a pre-configured list of trusted applications. The applications may store the retrieved trusted certificates in a local trust store, and the retrieved leaf certificates and associated private keys in a local key store, for use at runtime. Optionally the applications may use a local secure element (such as a TPM or SIM) to protect the retrieved private keys. Optionally the applications may retrieve the leaf certificate and associated private key dynamically (i.e., not persist the retrieved artifacts in a local key store such as a secure file system, secure element, or NVRAM).

Devices in IoT, IIOT, and OT environments that are resource constrained (e.g., in terms of compute and/or storage capacity), or a local secure element to protect the cryptographic private key of a asymmetric key pair require a method for remote server side key generation and secure private key distribution.

A system and method for the dynamic retrieval of PKI based trusted intermediate and root certificates, leaf certificates and associated private keys, by applications (client, server, or command line utilities) executing on a device with two-factor device authentication and application programming interface (APIs) in any modern programming language, without installing agents on the device. The key distribution service (KDS) interface provides the application programming interface (APIs) for the applications to send requests and receive responses for certificate operations directly to/from the KDS, or indirectly through the KDS proxy. The certificates may be imported (in single or batch mode), renewed, or rekeyed through the KDS portal. The trusted applications may retrieve trusted certificates, the leaf certificate and associated private key, and verify certificate status using the KDS APIs. The KDS enforces policy-based authorization with a pre-configured list of trusted applications. The applications may store the retrieved trusted certificates in a local trust store, and the retrieved leaf certificates and associated private keys in a local key store, for use at runtime. Optionally the applications may use a local secure element (such as a TPM or SIM) to protect the retrieved private keys. Optionally the applications may retrieve the leaf certificate and associated private key dynamically (i.e., not persist the retrieved artifacts in a local key store such as a secure file system, secure element, or NVRAM).

Devices in IoT, IIOT, and OT environments that are resource constrained (e.g., in terms of compute and/or storage capacity), or a local secure element to protect the cryptographic private key of a asymmetric key pair require a method for remote server side key generation and secure private key distribution.

The disclosed method configures and uses extended attributes as security extensions in the X.509 certificate subject alternate name (SAN) field to specify a host address, network address, and network mask for scope and address pool based network segmentation for authorization of a client device for managed access to a server device; wherein the vendor class identifier associated with the client device, the scope, and the address pool are configured on a DHCP server associated with the deployment infrastructure. Further, the method provides for use of a public or private certificate authority (CA) issued X.509 certificate, or a self-signed certificate (i.e., issued by a null CA, such as, for example, OpenSSL utilities, wherein the certificate is signed with its own private key and not by a trusted CA). This method provides regulation of the self-signed certificate with device two-factor authentication in the local network and runtime validation of the extended host (IP) and network (subnet) address attributes in the certificate SAN for evidence of practical control over the host address, address pool, and network subnet. The anti-spoofing security countermeasures (for IP addresses, DHCP, and DNS) must be implemented on the local network.

BRIEF DESCRIPTION OF THE DRAWING FIGURES

The disclosure is best understood from the following detailed description when read in connection with the accompanying drawings. According to common practice, various features/elements of the drawings may not be drawn to scale. Common numerical references represent like features/elements. The following figures are included in the drawings.

Figure 3A:
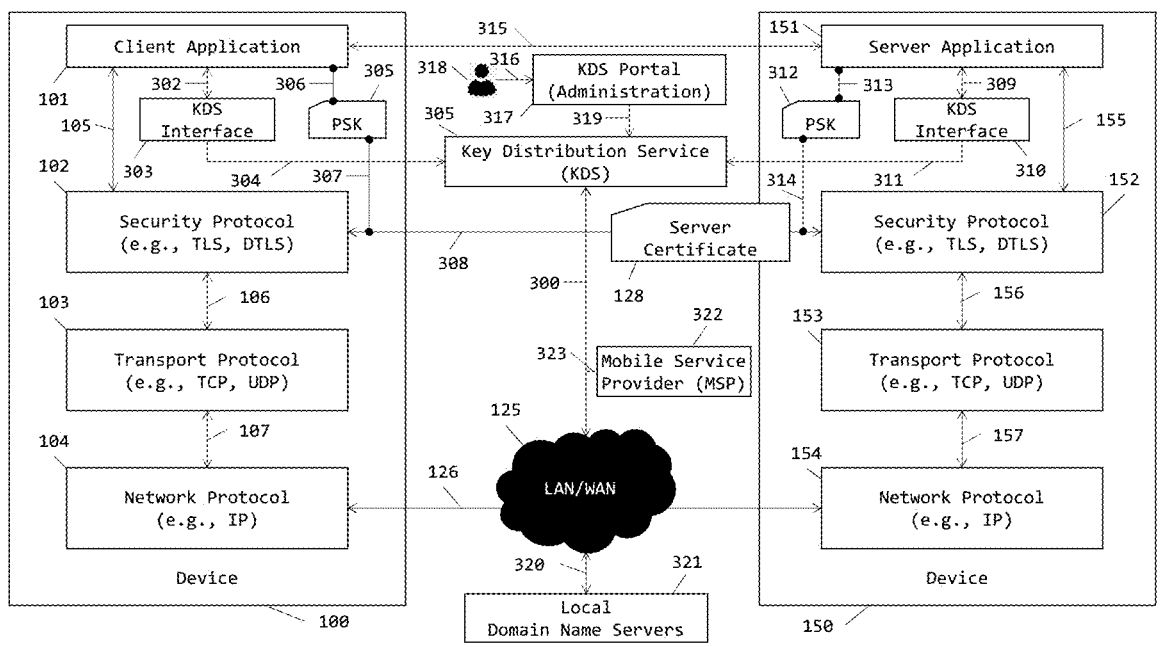
FIG. 3A is a schematic diagram illustrating a method to establish a connection between devices over secure transport with pre-shared key (PSK) based client (and device) authentication, and server certificate verification, in accordance with various exemplary embodiments of the disclosed system.
Figure 3B:
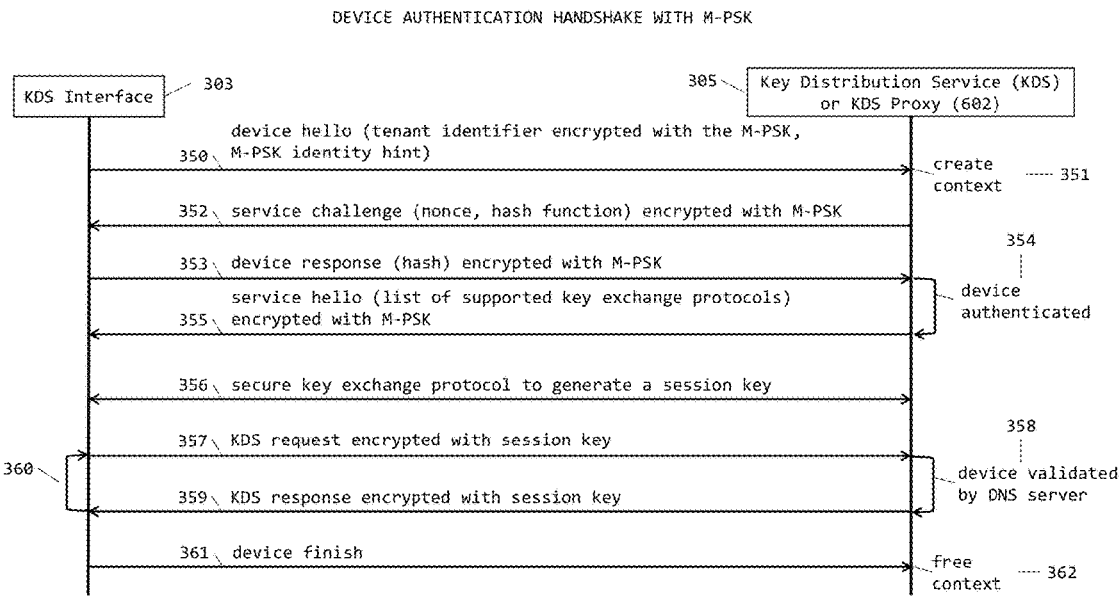

FIG. 3B is a transaction state machine illustrating a method to authenticate a member device with a key distribution service (KDS) or KDS proxy using a configured KDS member pre-shared key (M-PSK) and M-PSK identity hint, and generate a session key using a secure key exchange method, to perform device validation using a domain name system (DNS) server and securely communicate with the KDS or KDS proxy to perform transactions, in accordance with various exemplary embodiments of the disclosed system.

Figure 3C:
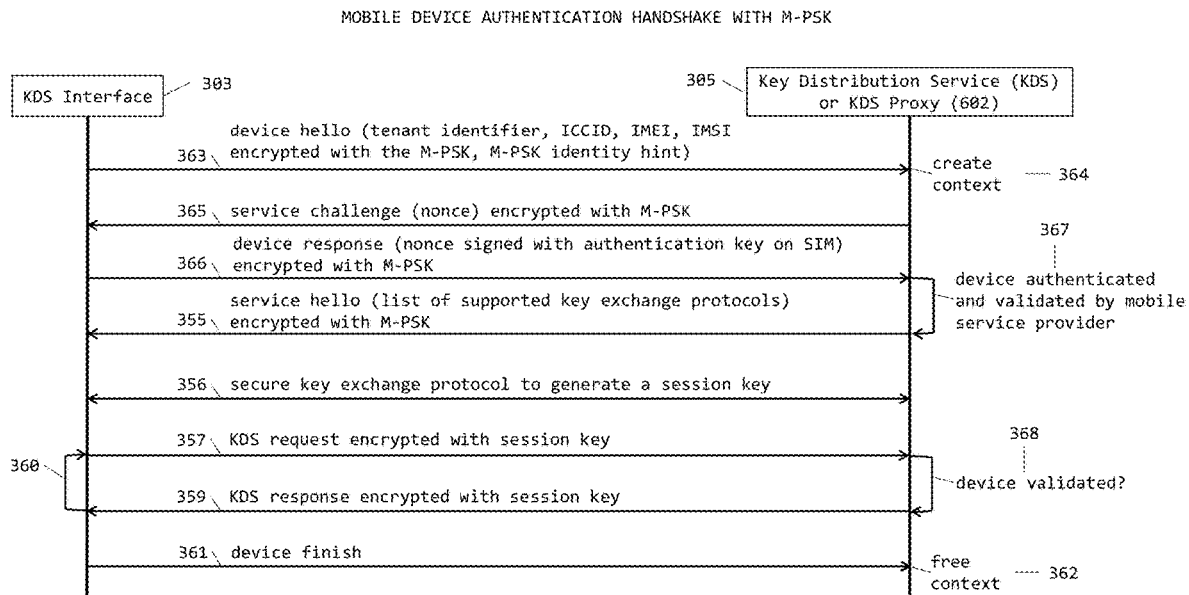

FIG. 3C is a transaction state machine illustrating a method to authenticate a mobile member device with a key distribution service (KDS) or KDS proxy using a configured KDS member pre-shared key (M-PSK) and M-PSK identity hint to perform device authentication and validation using a mobile service provider (MSP), and generate a session key using a secure key exchange method to securely communicate with the KDS or KDS proxy to perform transactions, in accordance with various exemplary embodiments of the disclosed system.

Figure 3D:
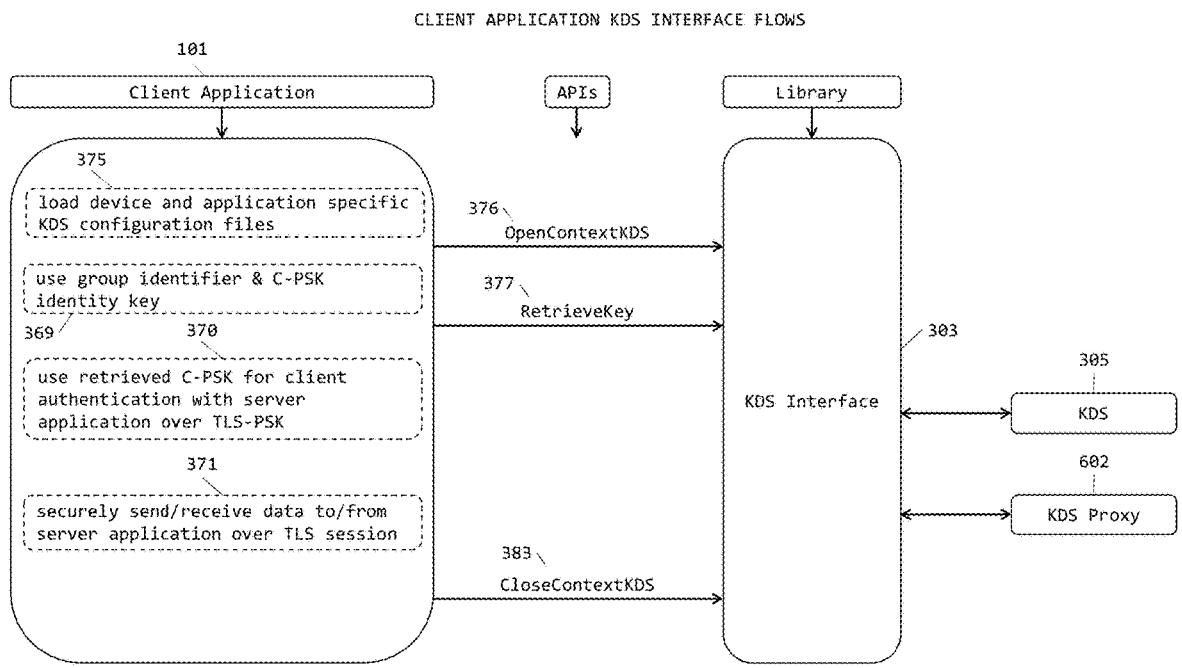

FIG. 3D is a diagram of an exemplary computer system in which embodiments of the method of retrieving a pre-shared key to initiate client authentication over TLS using TLS-PSK can be implemented.

Figure 3E:
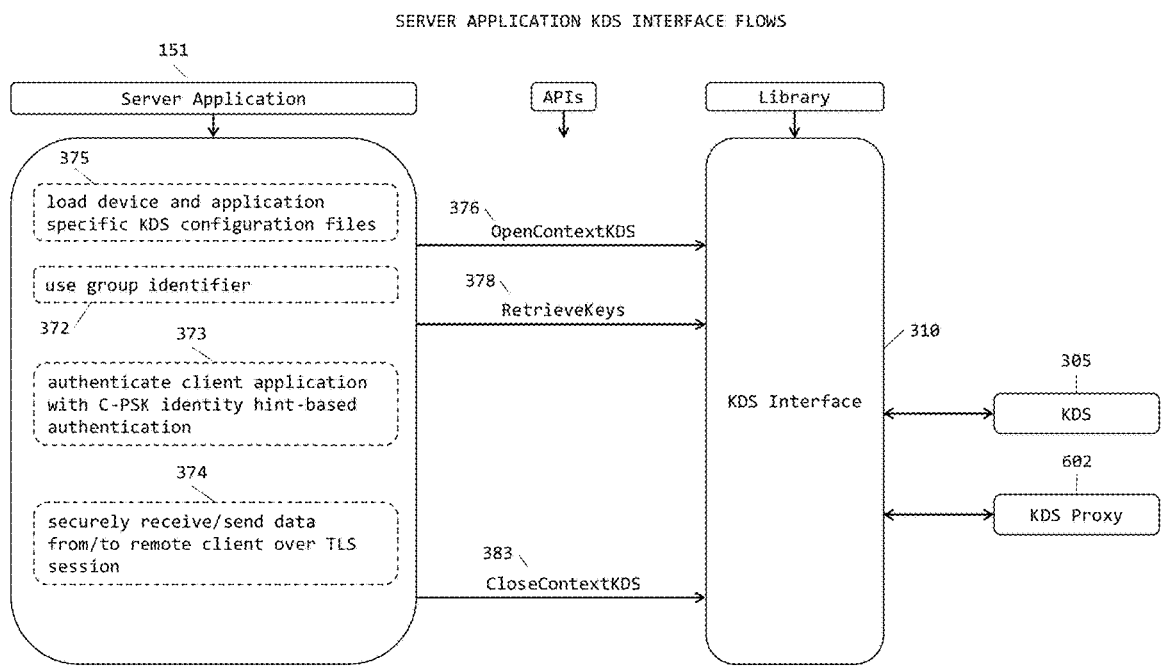

FIG. 3E is a diagram of an exemplary computer system in which embodiments of the method of retrieving pre-shared keys to accept client authentication over TLS using TLS-PSK can be implemented.

Figure 3F:
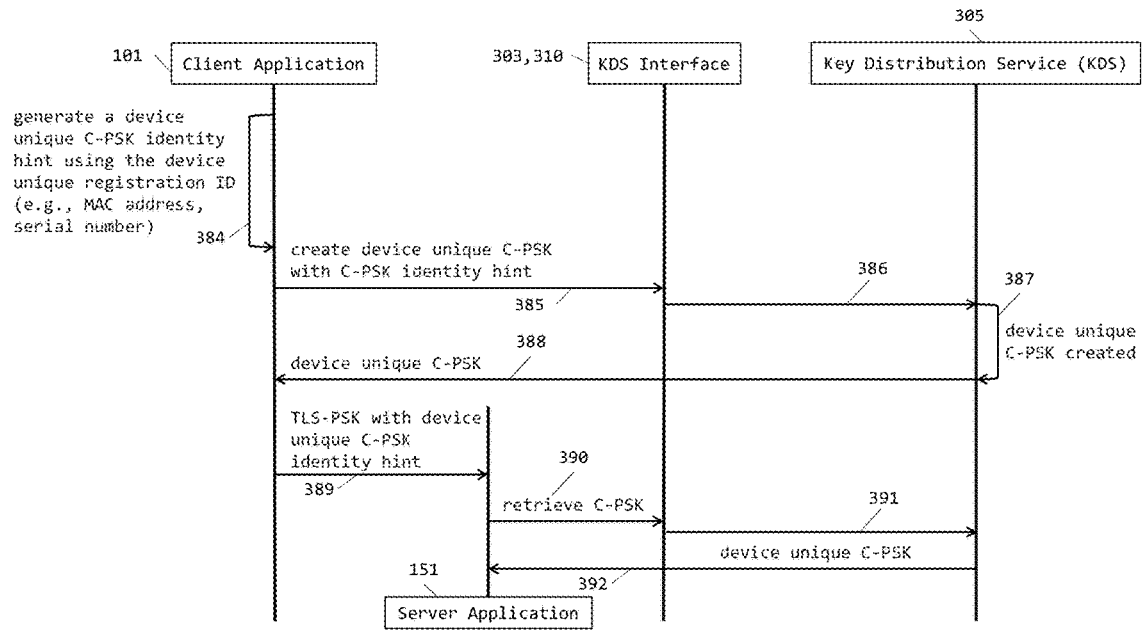

FIG. 3F is a diagram of an exemplary computer system in which embodiments of the method of device unique pre-shared keys for client authentication (C-PSK) over TLS-PSK between a client and server application can be implemented.

Figure 3G:
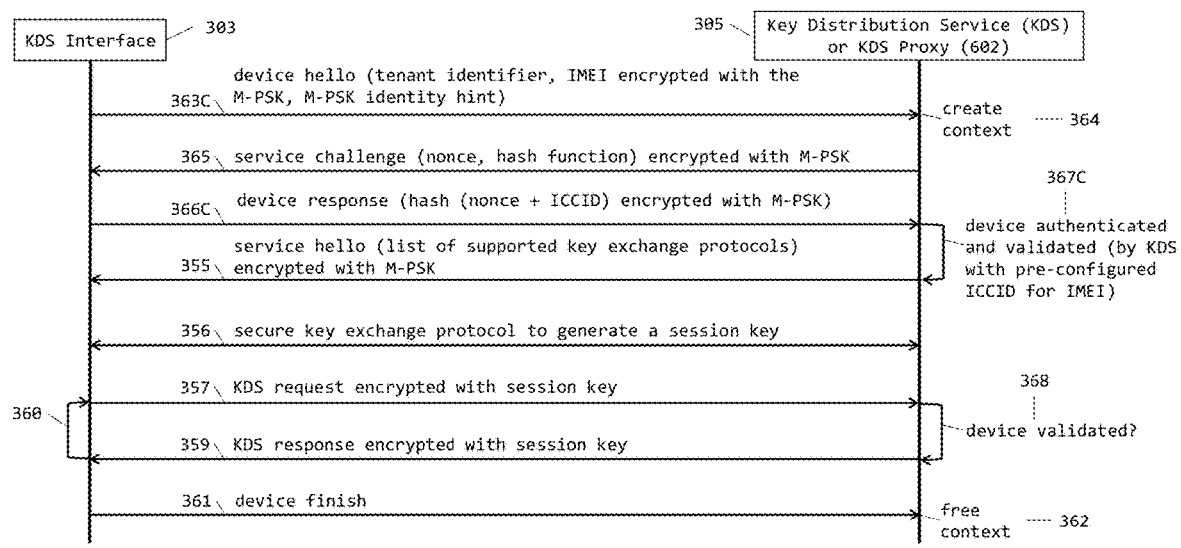

FIG. 3G is a transaction state machine illustrating a method to authenticate a mobile member device with a key distribution service (KDS) or KDS proxy using a configured KDS member pre-shared key (M-PSK) and M-PSK identity hint to perform device authentication and validation using the mobile device identifiers (e.g., IMEI, ICCID), and generate a session key using a secure key exchange method to securely communicate with the KDS or KDS proxy to perform transactions, in accordance with various exemplary embodiments of the disclosed system.

Figure 3H:
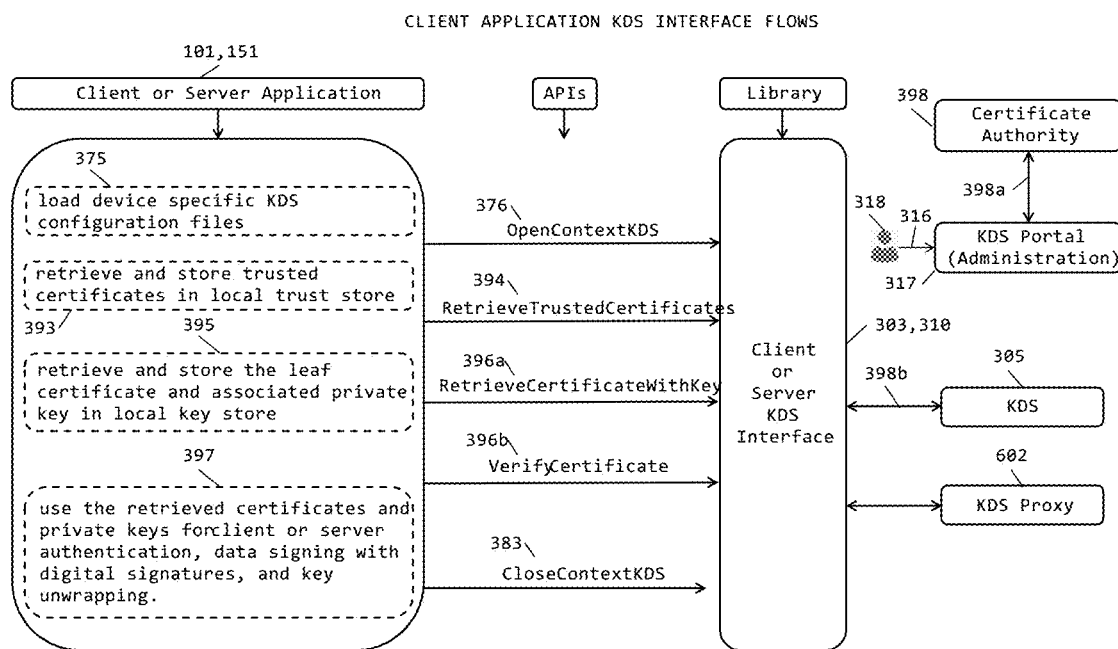

FIG. 3H is a diagram of an exemplary computer system in which embodiments of the method of device two-factor authentication, retrieval of trusted intermediate and root certificates, leaf certificates and the associated private keys, using the KDS interface APIs, KDS, and certificate authority (CA) can be implemented.

Figure 4:
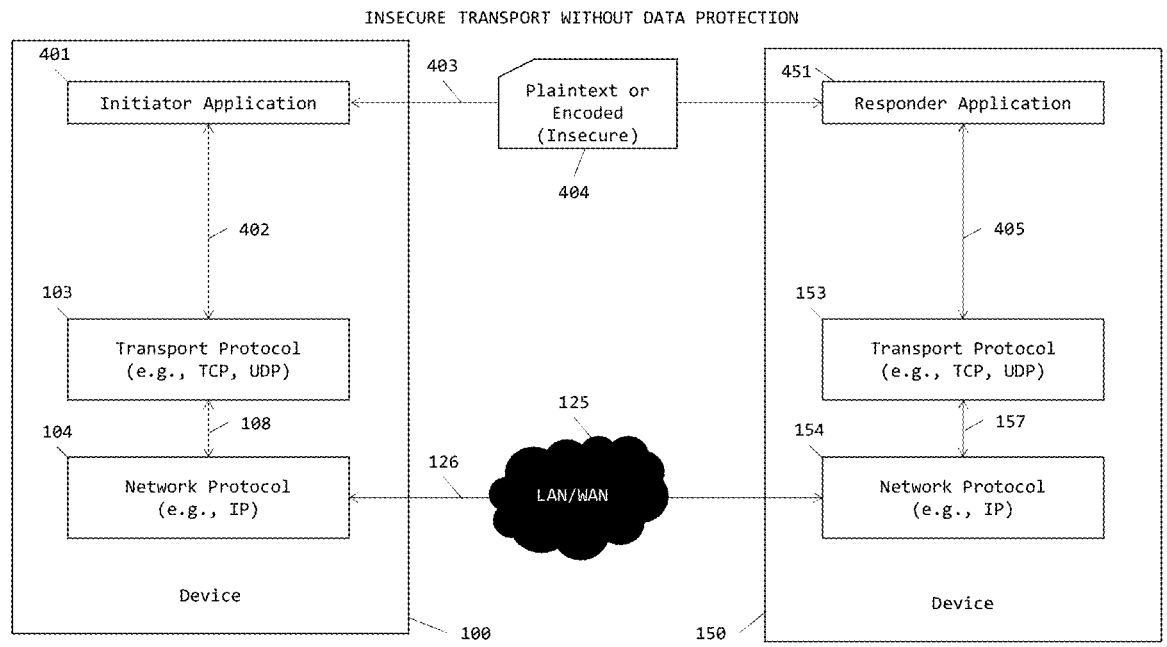

FIG. 4 is a schematic diagram illustrating a common method to establish an insecure connection between devices over a connection-oriented or connection-less transport protocol.

Figure 5A:
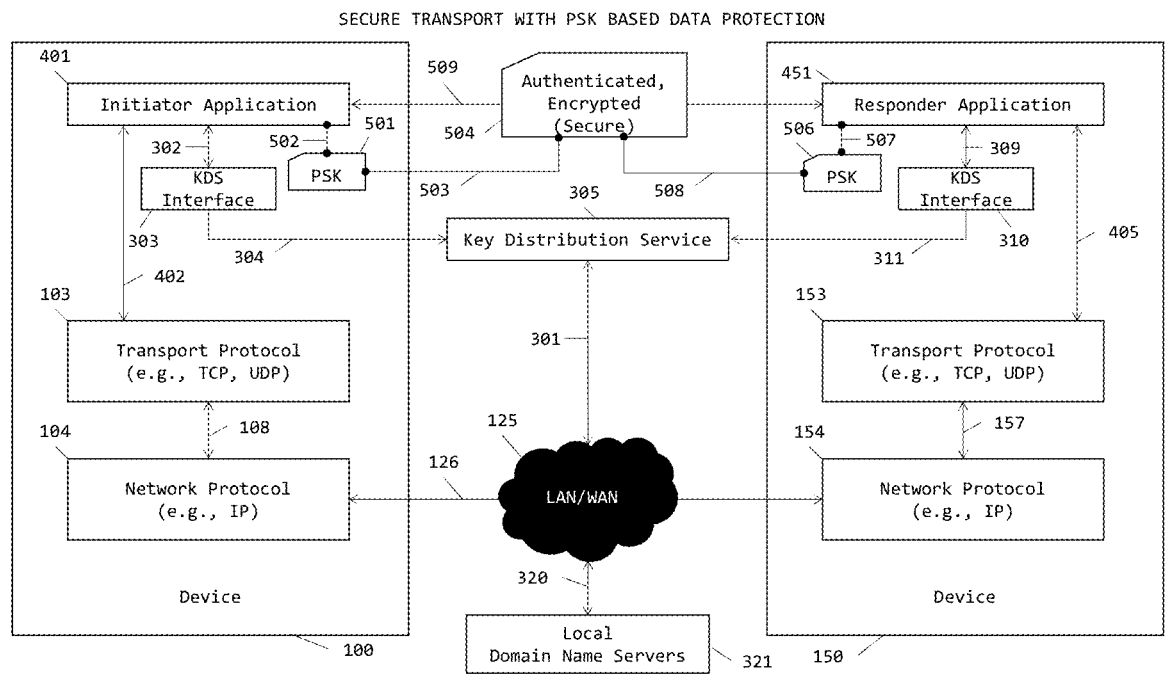

FIG. 5A is a schematic diagram illustrating a method to establish a secure connection between devices over a connection-oriented or connection-less transport protocol using a pre-shared key (PSK) for mutual device authentication and data protection in accordance with various exemplary embodiments of the disclosed system.

Figure 5B:
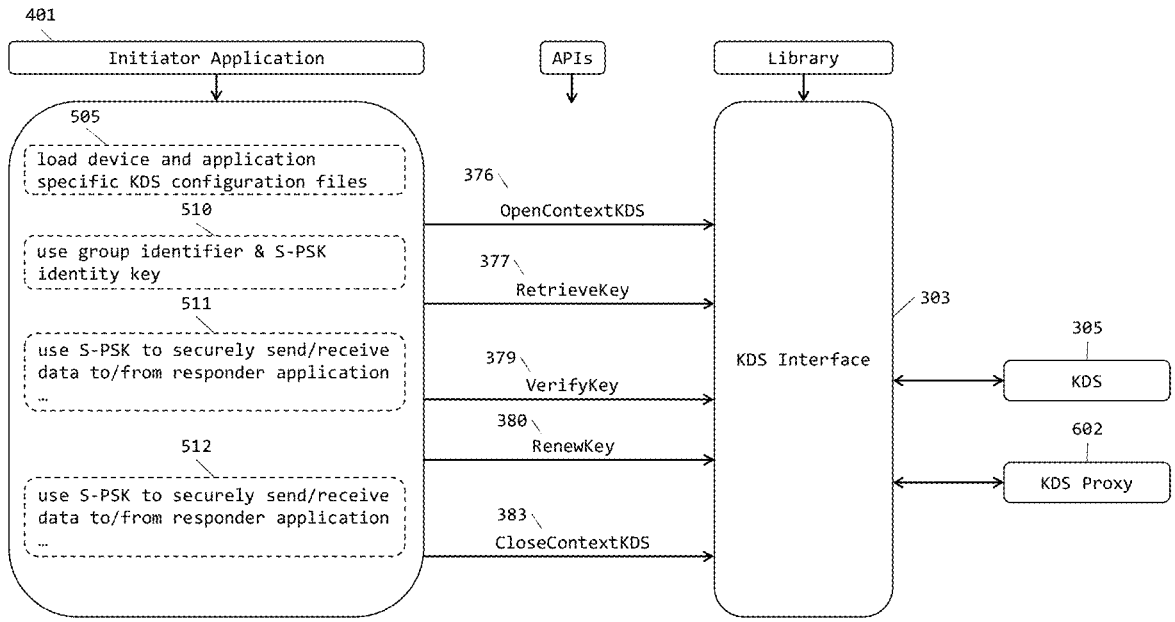

FIG. 5B is a diagram of an exemplary computer system in which embodiments of the method of retrieving, using, verifying, and renewing a pre-shared key to initiate secure communication over an insecure transport protocol can be implemented.

Figure 5C:
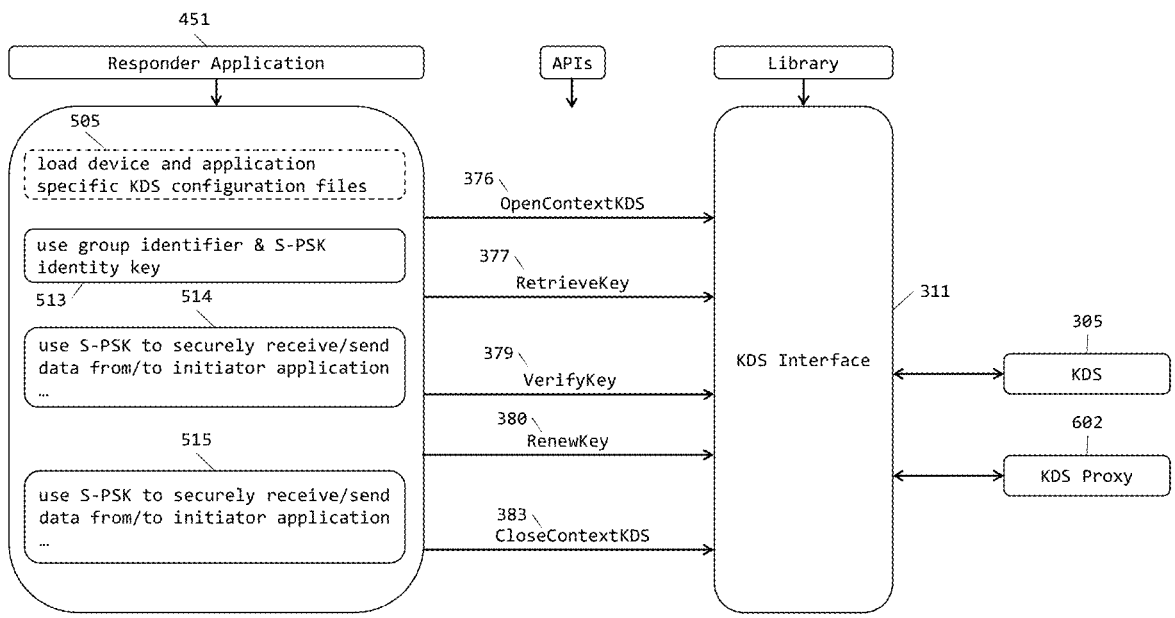

FIG. 5C is a diagram of an exemplary computer system in which embodiments of the method of retrieving, using, verifying, and renewing a pre-shared key to accept secure communication over an insecure transport protocol can be implemented.

Figure 5D:
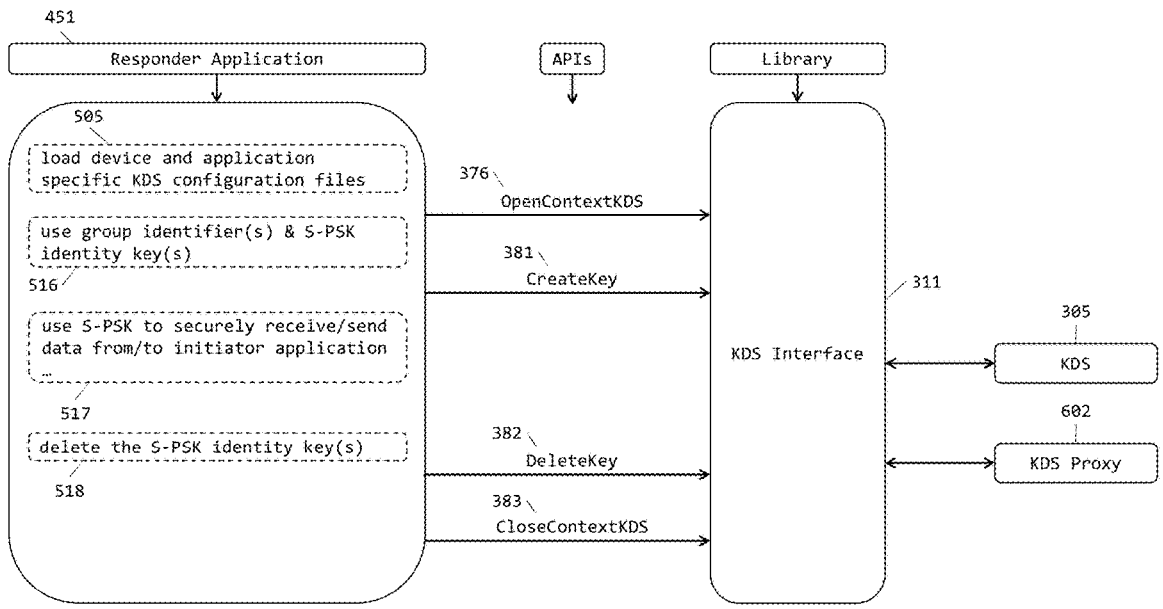

FIG. 5D is a diagram of an exemplary computer system in which other embodiments of the method of creating, using, and deleting a pre-shared key to accept secure communication over an insecure transport protocol can be implemented.

Figure 5E:
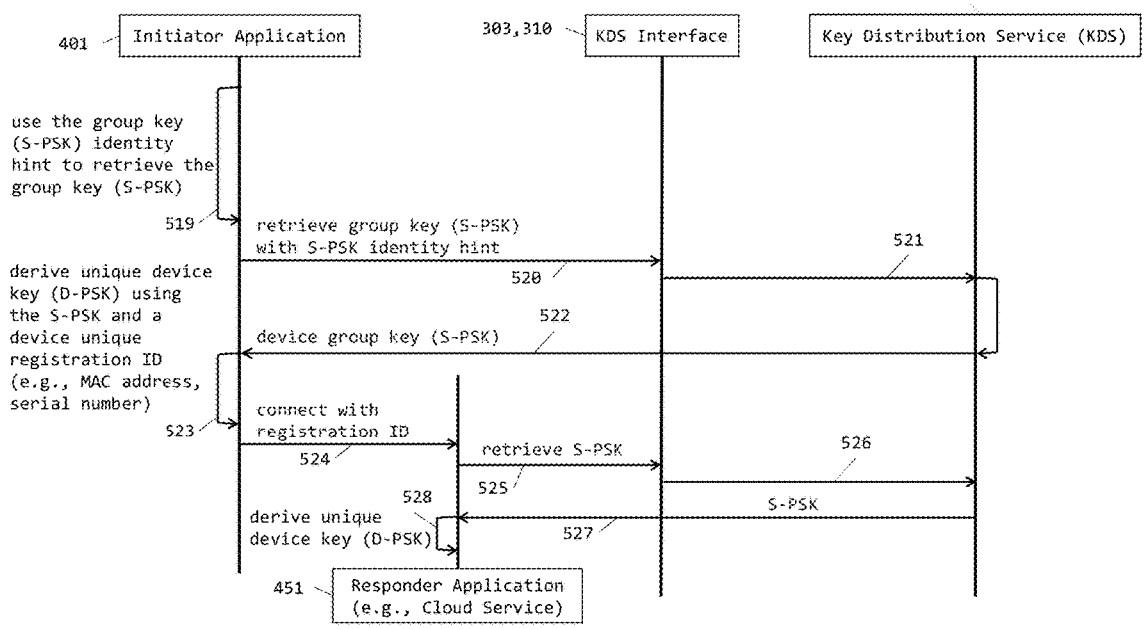

FIG. 5E is a diagram of an exemplary computer system in which embodiments of the method of device unique pre-shared keys for authenticated secure communications (D-PSK), derived using a group key (S-PSK) and device unique registration ID, between an client and server application can be implemented.

Figure 6:
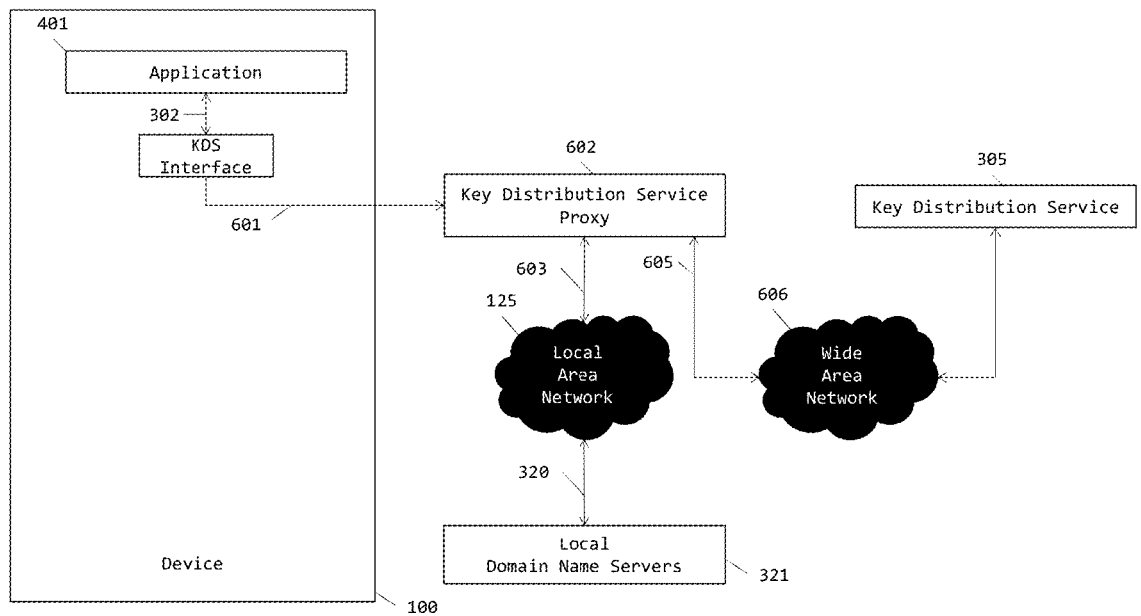

FIG. 6 is a schematic diagram illustrating a method to perform authentication and domain validation of a device using a key distribution service proxy for the device internet protocol (IP) address based reverse lookup to retrieve the authoritative device DNS hostname from a configured local DNS server over the local area network in accordance with various exemplary embodiments of the disclosed system.

Figure 7A:
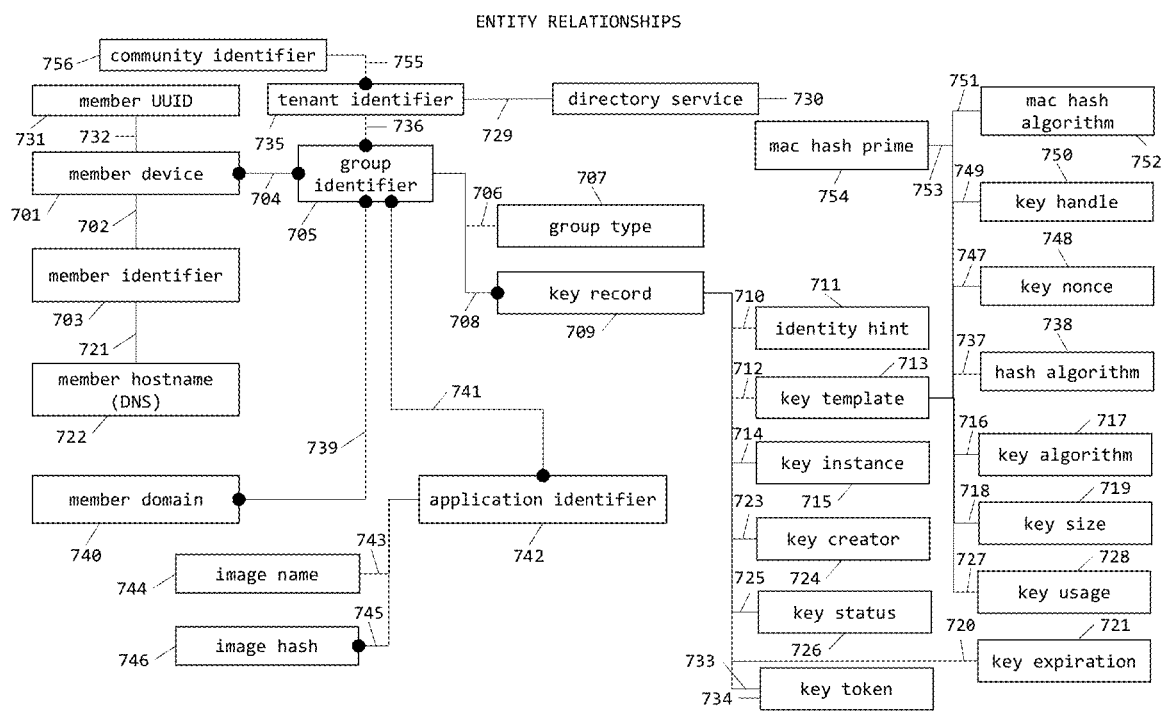

FIG. 7A is a schematic diagram illustrating entity relationships between components of the model in accordance with various exemplary embodiments of the disclosed system.

Figure 7B:
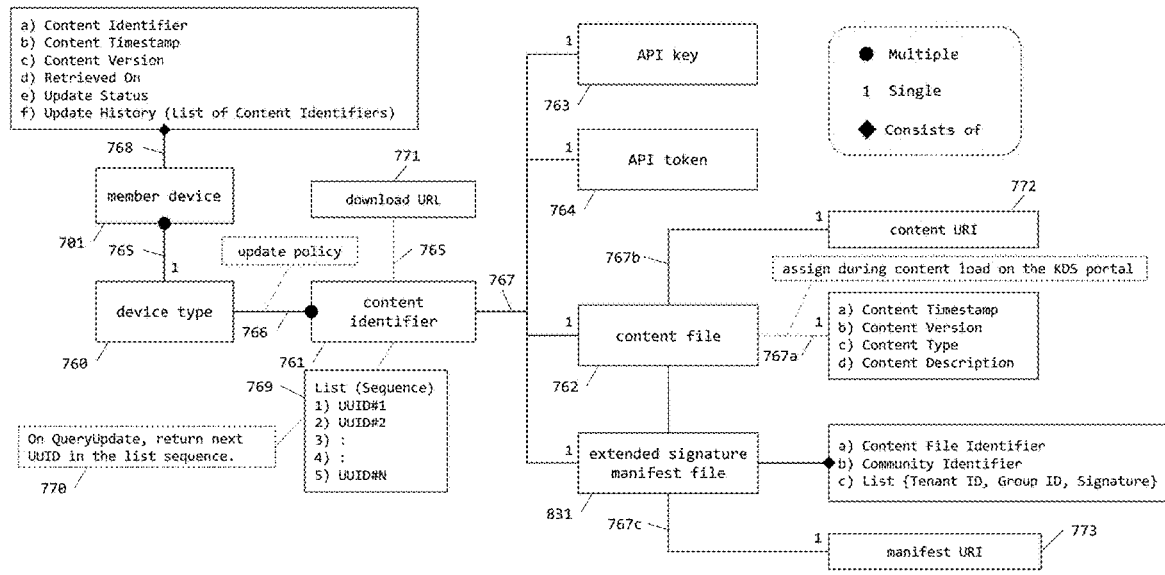

FIG. 7B is a schematic diagram illustrating further entity relationships between components of the model in accordance with various exemplary embodiments of the disclosed system.

Figure 8A:
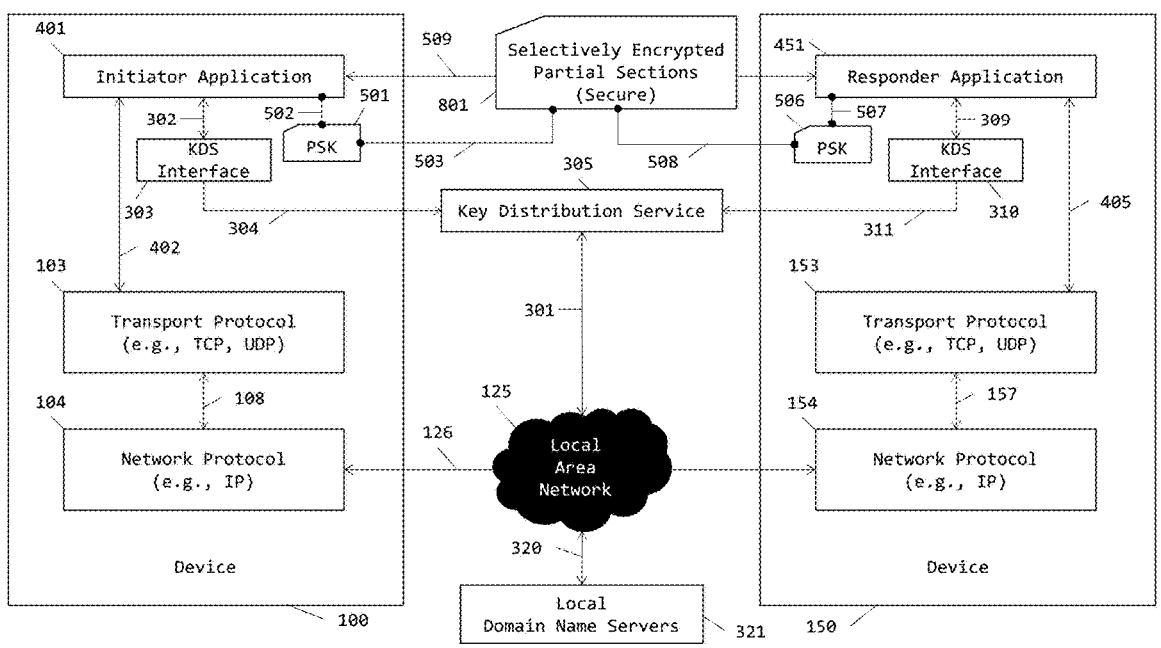

FIG. 8A is a diagram of an exemplary computer system in which embodiments of the method of pre-shared key based selective encryption/decryption of partial sections of messages transmitted/received between client/server applications over a local area network can be implemented.

Figure 8B:
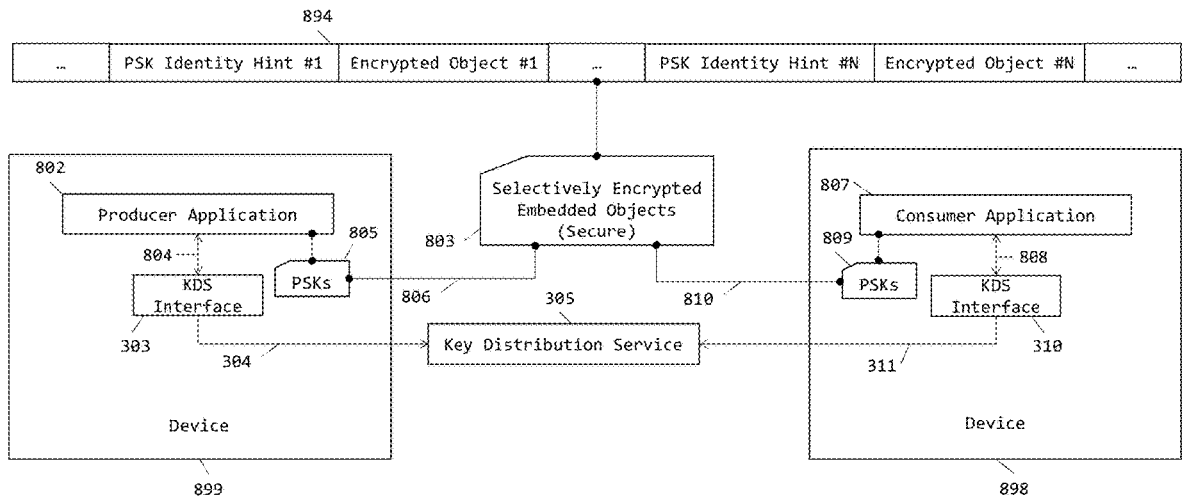

FIG. 8B is a diagram of an exemplary computer system in which embodiments of the method of pre-shared key based selective encryption/decryption of objects embedded within documents exchanged between producer/consumer applications can be implemented.

Figure 8C:
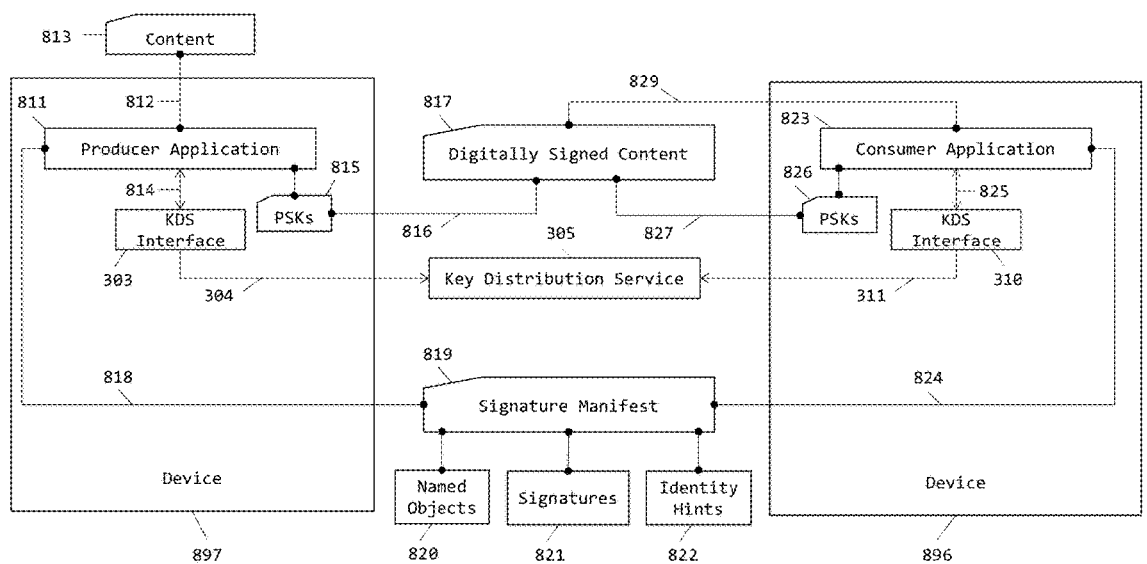

FIG. 8C is a diagram of an exemplary computer system in which embodiments of the method of pre-shared key based content signing by a producer application and pre-shared key based content verification by a consumer application for tamper resistance can be implemented.

Figure 8D:
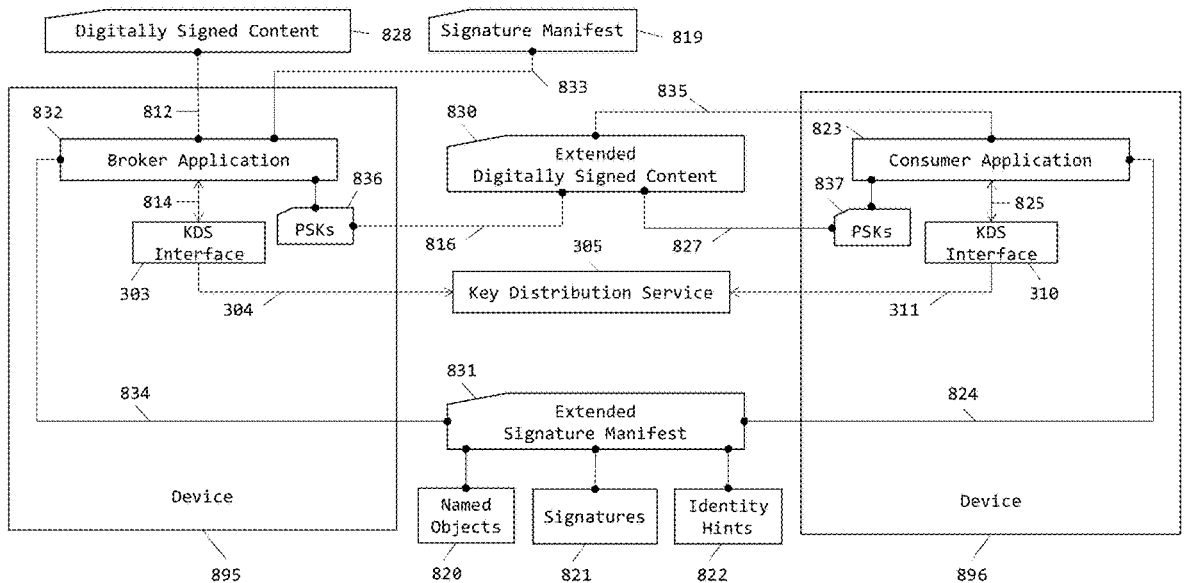

FIG. 8D is a diagram of an exemplary computer system in which embodiments of the method of additional pre-shared key based content signing by a broker application and multiple pre-shared keys based content verification by a consumer application for supply chain tamper resistance can be implemented.

Figure 8E:
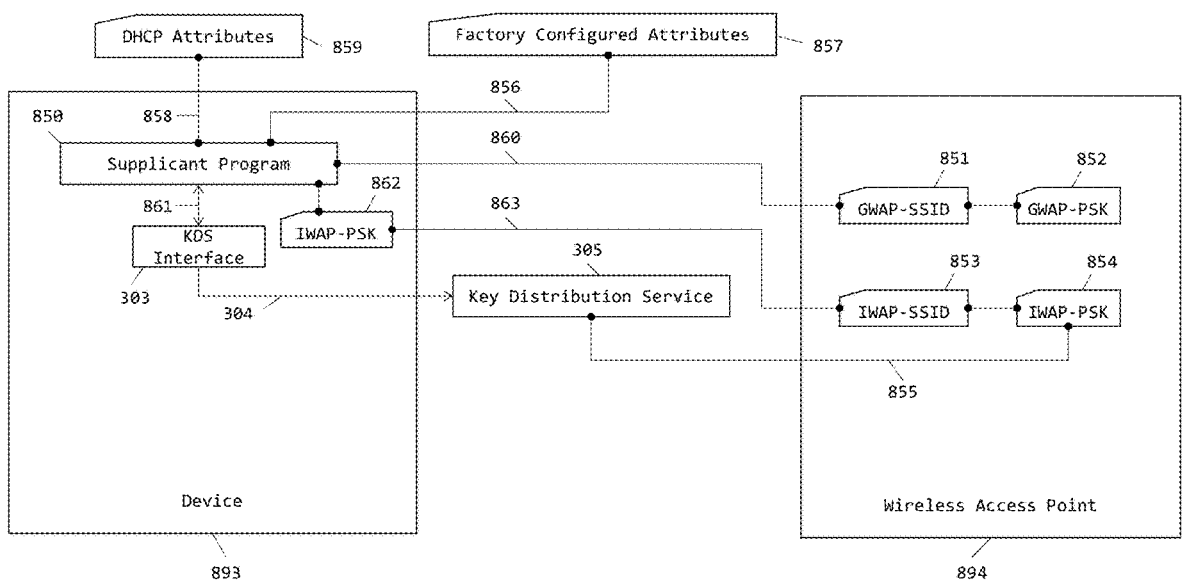

FIG. 8E is a diagram of an exemplary computer system in which embodiments of the method of dynamically and securely retrieving an internal wireless access point (WAP) pre-shared key (PSK) over a guest wireless network for device authentication with a multi-SSID (service set identifier) mode WAP for switch-over to a secure wireless network can be implemented.

Figure 9:
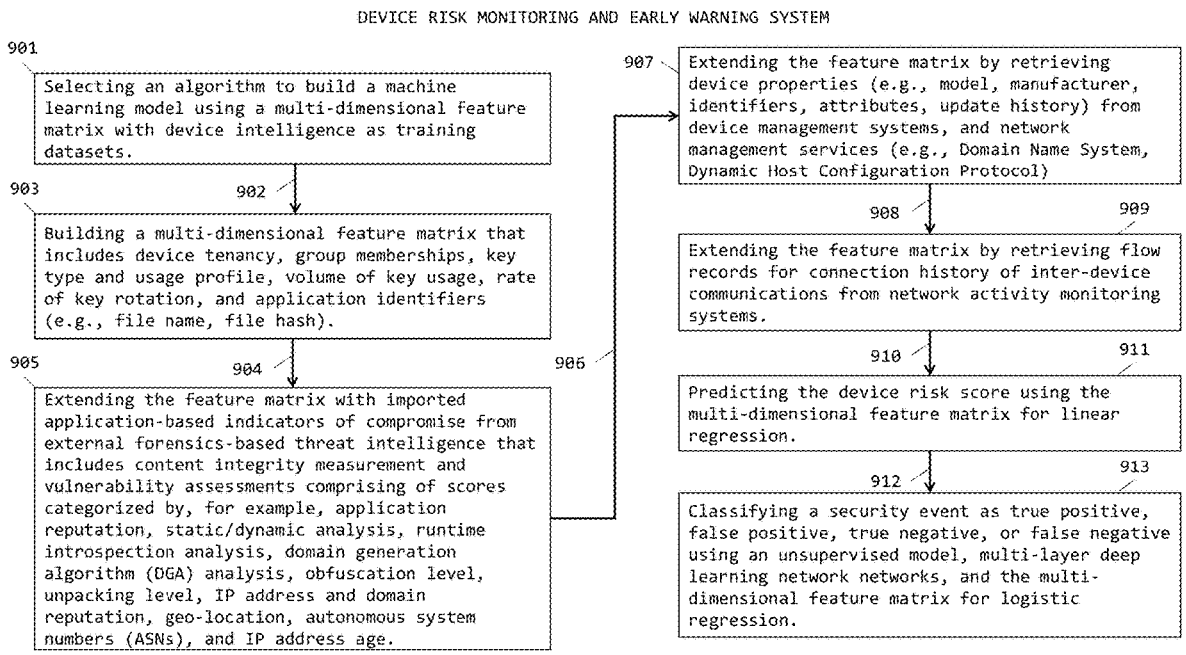

FIG. 9 is a diagram of an exemplary computer system in which embodiments of the method predicting the device risk score and classifying a security event by building a machine learning model using a multi-dimensional feature matrix with device intelligence as training and test datasets can be implemented.

Figure 10:
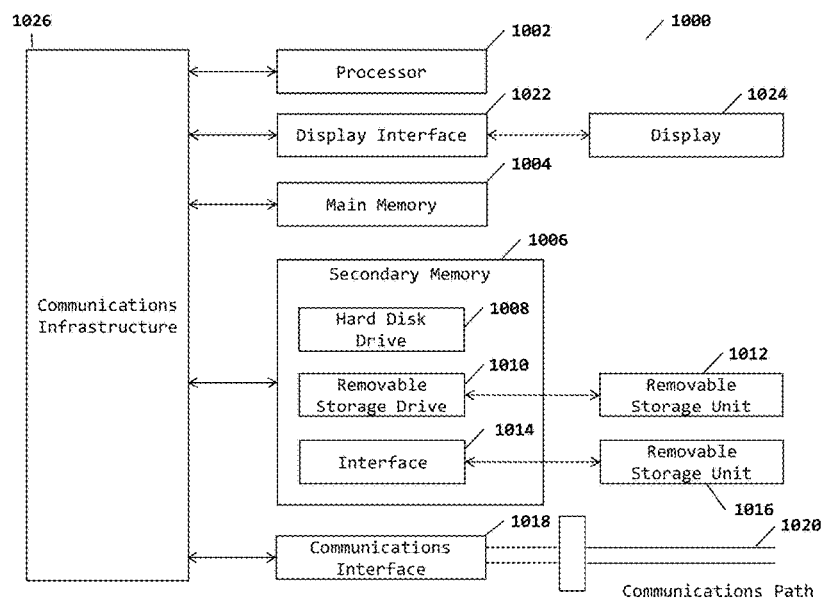

FIG. 10 is a diagram of an exemplary computer system in which embodiments of the method of certificateless device security and data protection can be implemented.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Although the disclosure is illustrated and described herein with reference to specific embodiments, the disclosure is not intended to be limited to the details shown herein. Rather, various modifications may be made in the details within the scope and range of equivalents of the claims and without departing from the scope of the disclosure.

The systems and method of certificateless device protection and application security is proposed wherein: applications executing on a first device can connect to an authorized key distribution service (KDS) to request symmetric keys (generated by the KDS, or created by service applications) to communicate with applications executing on a second device;

applications on authenticated member devices may retrieve symmetric keys from an authorized KDS to communicate with other authenticated member devices of the group; symmetric keys may to set to expire based on a time-to-live (TTL) interval that triggers an automatic rekey; applications may use the retrieved symmetric key as a pre-shared key for direct message exchange (e.g., over UDP or TCP transport protocols) or over the TLS-PSK secure transport protocol; the communications between the applications and the authorized KDS occur over a secure channel (for example, on resource constrained devices over UDP or TCP with M-PSK based authentication and ephemeral Diffie-Hellman (DH) or Elliptic-Curve DH (ECDH) key exchange for session key based encryption of requests and responses; or using NIST approved quantum resistant cryptographic algorithms (NISTI®8309 https://doi.org/10.6028/NIST IR.8309) for general encryption (such as for example CRYSTALS-Kyber), and identity verification and digital signatures (such as for example CRYSTALS-Dilithium, FALCON, and SPHINCS+); or alternatively on non-resource-constrained devices over TLS with server authentication); the KDS validates the device using DNS reverse lookup (member device IP address to DNS hostname) to resolve the DNS hostname and match with the member identifier; the KDS automatically rekeys expired PSKs, or the service application (i.e., key creator) explicitly rekeys an expired PSK; the KDS performs DNS reverse lookups using a list of configured DNS servers; a KDS proxy may be installed on-premise to resolve and authenticate the device DNS hostnames using local DNS reverse lookup; and the KDS or KDS proxy may use a mobile service provider (MSP) service to authenticate and validated managed mobile devices.

In one exemplary embodiment of the disclosed system, a KDS proxy securely proxies the KDS Interface Application Programming Interface (API) requests from authenticated and validated devices to the externally hosted (e.g., cloud) KDS using an API access token and an API access secret to digitally sign the mapped Representational State Transfer (REST) API requests to the KDS. The KDS proxy appends the proxy's group identifier and PSK identity hint (for the KDS proxy listener to retrieve the corresponding API token and API secret to authenticate the REST API request) and, at least, the authenticated member identifier and member DNS hostname retrieved from the local DNS server in the proxied API requests to the externally hosted KDS.

In one exemplary embodiment of the disclosed system, the member device authentication may be performed using the Domain Name System (DNS) server wherein: the KDS Interface on the member device uses member PSK based authentication with the KDS over UDP; all API service requests from member devices sent through the KDS Interface are encrypted over a secure session (for example, using ephemeral Diffie-Hellman (DH) or Elliptic-Curve DH (ECDH) key exchange over UDP to generate a session key, or using NIST approved quantum resistant cryptographic algorithms (NISTI®8309 https://doi.org/10.6028/NIST.IR.8309) for general encryption (such as for example CRYSTALS-Kyber), and identity verification and digital signatures (such as for example CRYSTALS-Dilithium, FALCON, and SPHINCS+); the KDS (and where applicable the KDS proxy) performs a DNS reverse lookup on the member device IP address of the requestor and compares the retrieved DNS hostname with the member identifier received in the digitally signed API request; PTR records (and optionally ALIAS and CNAME resource records as applicable) for the respective address (A) records are configured on the DNS server; the DNS hostnames retrieved through the DNS reverse lookup are cached by the KDS (and where applicable the KDS proxy) for the duration indicated in the response TTL; the KDS proxy to KDS requests are secured using an API access token and digitally signed using an API access secret along with, for example, a HMAC-MD5-128, HMAC-SHA-160, HMAC-SHA-224, HMAC-SHA-256, HMAC-SHA-384, or HMAC-SHA-512 digest of the URL comprising of the path, API method, API request time and API access token.

In one exemplary embodiment of the disclosed system, for high availability a secondary KDS may be configured for data synchronization and service level failover. The KDS Interface library that initiates transactions with the KDS switches over to the secondary KDS on a timeout on the primary KDS. An automatic switch back to the primary KDS may be attempted during subsequent transactions.

In one exemplary embodiment of the disclosed system, a shared device group type comprises of a list of devices identified by the DNS hostname; a private device group type (e.g., for local storage encryption, or intra-device communications) comprises of a single device; and a tenant comprises for a plurality of device groups. Other device group types may be defined for specific purposes (e.g., shared, private, onboarding, authenticator, anonymous, community, any suitable device groups).

In one exemplary embodiment of the disclosed system, the client and server applications engaged in an Internet Key Exchange (IKE) protocol handshake, to establish security associations for data authentication and/or encryption over IPsec, may retrieve pre-shared keys (PSKs) from the KDS for PSK-based client authentication over IKE.

In one exemplary embodiment of the disclosed system, a device may be a member of multiple device groups; the applications may retrieve keys to access multiple device members (or groups); the applications may use the retrieved symmetric pre-shared key over any transport protocol (e.g., User Datagram Protocol or UDP, Transmission Control Protocol or TCP, Internet Protocol or IP, non-IP); the applications may use the retrieved symmetric key for PSK-based client authentication over a TLS-PSK session, or for PSK-based client authentication over an IKE session; and the applications may use the retrieved key with any open-source or third-party secure transport or crypto library.

Modifying (hundreds of) line of business (LOB) legacy, brownfield, or greenfield applications (e.g., client, server) executing on in-field devices for application security by design is a daunting task for developers, product managers, and field operators. Interoperability between LOB applications is essential for seamless migration in production and mission-critical environments without triggering service outages. This requires an agent-less solution wherein connected applications may be selectively integrated with the key distribution service (KDS) using a simple set of APIs for polyglot applications (C, C++, C #, Java, Objective-C, etc.) to perform key operations (e.g., retrieval and renewal of PSKs). The KDS Interface library provides application developers with a simple set of APIs and transparently manages all the authentication ceremonies, application identifiers, and secure communications (request-response handshake) with the KDS on behalf of the application. Once the requested PSK is retrieved, the connected applications may use the retrieved PSK with any third-party cryptographic library to perform local key operations and use any underlying protocol stack for communications. This level of compatibility and simplicity is essential to minimize the coding effort required by application developers to quickly and easily harden applications for enhanced security.

In one exemplary embodiment of the disclosed system, the KDS Interface application programming interface (API) may include at least the following set of operations:

1) OpenContextKDS (KDS Device Configuration, Key Limit)

Allocates and initializes a context to connect directly to the primary or secondary KDS servers (or indirectly through a KDS proxy), using the specified KDS device configuration (e.g., as a JSON file, which may optionally, for security reasons, be digitally signed and include the signer's certificate or public key for signature verification) settings comprising of the primary and secondary KDS server addresses, protocol (e.g., UDP, TCP, TLS), port number (e.g., 500, 443), key exchange method (e.g., DH, ECDH, CRYSTALS-Kyber), KDS member PSK (M-PSK), M-PSK identity hint, tenant identifier, and member identifier for M-PSK-based device authentication with the KDS. The Uniform Resource Locator (URL) for the KDS and KDS proxy specify the respective service endpoint addresses. The tenant identifier identifies a tenant in a multi-tenant "software as a service (SaaS)" KDS subscription model. The member identifier identifies the tenant member device to the KDS. These generic KDS configuration settings may be loaded from a KDS configuration file provided to the applications executing on the member device. The device may be a member of multiple device groups, and a device group may be assigned multiple key records (i.e., identity hints), therefore the group identifier and identity hint must be provided explicitly during a KDS query operation. The group identifiers associated with the member device, and identity hints associated with a group identifier may be included in an application-specific configuration settings file loaded by the application for cross-validation at runtime. The key limit specifies the maximum number of active retrieved keys for storage in the KDS context's internal key cache.

During KDS context creation on the device, a static public authentication key and secret authentication key may be generated based on the configured key exchange method wherein each party knows the other party's static public authentication key.

Returns a handle to the KDS context (KDS Handle). The context caches the retrieved key records.

2) CreateKey (KDS Handle, Group Identifier, Identity Hint, Key Template)

Creates (and owns) a PSK with the member identifier as the key creator. The key template may specify at least the key algorithm, key size, key usage, and key expiration. The key sizes may be specified, for example, as 56, 80, 112, 128, 192, 256, or higher bits. The key algorithm may be specified as, for example, as AES, DES, 3DES, Blowfish, CAST, RC4, RC5, RC6, or ChaCha20. The cipher types for the specified key algorithms may be further specified, for example, as GCM, CCM, ECB, CBC, CTR, OFNB, CFNB, EAX, XTS, CBC-MAC. The key usage may be specified, for example, as client authentication, data authentication, data encryption, content (producer or broker) signing, broadcast signing, broadcast encryption, multicast signing, multicast encryption, token signing, or token encryption.

The key template specified may include extended attributes provided by the application including, for example, description of activity, network type (e.g., wired, wireless), network protocol (e.g., IP, CAN Bus, Modbus, HART, WirelessHART), and transport protocol (e.g., UDP, TCP, TLS, DTLS, IPsec) for KDS based key related activity audit logs.

Returns a Local Key Identifier (LKID) and key record (wherein the key expiration period may be specified as a timestamp, and 0 may imply that an explicit release by the key creator is required). The keys may also be pre-generated using the KDS administration portal. The key creator is set to the member identifier or KDS administrator accordingly in the key record. The LKID is a local fast lookup index stored within the KDS context wherein the retrieved key records may be cached in the process space (execution context). The key record may be returned as a read-only reference to the application. If a key already exists for the specified group identifier, identity hint, and key template, the KDS returns an error code. The KDS may be configured to generate a security event notification on key creation errors, as a security countermeasure against brute-force attacks to guess the group identifier and identity hint to retrieve keys.

3) RetrieveKey (KDS Handle, Group Identifier, Identity Hint)

Retrieves a key record based on the group identifier and identity hint.

Returns a LKID and key record. The key record may be returned as a read-only reference to the application.

On failure to qualify the specified group identifier or identity hint, the KDS may be configured to generate a security event notification as a security countermeasure against brute-force attacks to guess the group identifier and identity hint to retrieve keys.

4) RetrieveCommunityKey (KDS Handle, Community Identifier, Cotenant Identifier, Group Identifier, Identity Hint)

Retrieves a key record based on the group identifier and identity hint associated with a different tenant (cotenant identifier) within a community (community identifier) of tenants.

Returns a LKID and key record. The key record may be returned as a read-only reference to the application.

On failure to qualify the specified group identifier or identity hint, the KDS may be configured to generate a security event notification as a security countermeasure against brute-force attacks to guess the group identifier and identity hint to retrieve keys.

5) RetrieveKeys (KDS Handle, Group Identifier)

Retrieves all key records for the group identifier.

Returns a list of key records (to pre-populate PSKs and identity hints for TLS-PSK based client authentication, or cache M-PSKs for the first factor of authentication by the KDS proxy).

On failure to qualify the specified group identifier, the KDS may be configured to generate a security event notification as a security countermeasure against brute-force attacks to guess the group identifier to retrieve key records.

6) VerifyKey (KDS Handle, Group Identifier, Identity Hint)

Verifies the key expiration status locally based on the expiration timestamp in the cached key record stored within the KDS context. For non-expired keys, retrieves the key status from the KDS.

Returns the KDS key status (e.g., ACTIVE, SUSPENDED, EXPIRED, DELETED, REVOKED, or INVALID). A key status other than ACTIVE or SUSPENDED may be considered by applications as a DEACTIVATED status for previously retrieved keys. On failure to qualify the specified group identifier or identity hint, the KDS may be configured to generate a security event notification as a security countermeasure against brute-force attacks to guess the group identifier and identity hint to retrieve keys. Alternatively, the applications may setup a timer based on the calculated key expiration time and renew the key explicitly in the registered callback handler using the key identity hint as context to cross-reference the associated expired key.

7) RenewKey (KDS Handle, Group Identifier, Identity Hint)

Renews (i.e., re-keys) a key record (due to key expiration or for on-demand renewal) created (owned) by the member identifier for use as a PSK for client authentication or secure communications. For keys that were not created (owned) by the member identifier, a renewed key record is retrieved (due to expiration).

On failure to qualify the specified group identifier or identity hint, the KDS may be configured to generate a security event notification as a security countermeasure against brute-force attacks to guess the group identifier and identity hint to retrieve keys.

8) DeleteKey (KDS Handle, Group Identifier, Identity Hint, Delete Type)

The type of deletion may be specified as LOCAL or SERVICE.

For LOCAL mode, or SERVICE mode wherein the member identifier is not the creator (owner), the key record is cleared (freed) from the local cache of the KDSI context.

For SERVICE mode, wherein the member identifier is the creator (owner), the key record is deleted on the KDS. A key record may be deleted programmatically by the creator (owner) member identifier or by an authorized KDS portal administrator for keys created (owned) by the KDS service. The delete operation on the KDS may be configured and implemented either as a purge (permanent delete) of the key record or as an adjustment of key status to preserve key history.

On failure to qualify the specified group identifier or identity hint, the KDS may be configured to generate a security event notification as a security countermeasure against brute-force attacks to guess the group identifier and identity hint to retrieve keys.

9) CloseContextKDS (KDS Handle)

Releases and frees the KDS context.

In one exemplary embodiment of the disclosed system, the KDS Interface application programming interface (API) may be extended to automate local device configuration, export vendor specific member device information to the KDS, integrate with ecosystem services (e.g., DHCP services, cloud based device provisioning and hub services), and to verify content signing, and include at least the following set of operations:

1) DeriveDeviceKey (KDS Handle, Group Identifier, Identity Hint) to generate a device unique key for integration with cloud services (e.g., microservices for device registration, device provisioning, hub attached business applications for telemetry, data analytics, digital twins).

2) RetrieveDhcpOption (KDS Handle, Vendor Class Identifier, Custom Option Code, Attribute Identifier, Attribute Buffer, Buffer Length) to retrieve the specified DHCP option as a string in the attribute buffer. The vendor specific information for a member device configured on the DHCP service may include, for example, the KDS server primary address, KDS server secondary address, tenant identifier, group identifier, SPSK identity hint, internal WAP SSID, internal WAP PSK identity hint, network domain, device type, country of manufacture, model identifier, serial number, supported network types, supported network protocols, and license owner identifier. The DHCP standard option code 43 for encapsulated vendor specific information including the custom option code available for private use may be configured for the defined vendor class identifier, scope, and address pool by policy on the DHCP service.

3) ReadDhcpOption (KDS Handle, Attribute Identifier, Attribute Buffer, Buffer Length) to return the requested attribute value as a string in the attribute buffer.

4) ExportDeviceAttribute (KDS Handle, Attribute Identifier, Attribute Buffer, Buffer Length) to send the vendor specific device information as a device attribute to the KDS.

5) GenerateSignatureManifest (KDS Handle, Content File, Signature Manifest File) to generate (or optionally extend) a signature manifest file for content signing and supply chain tamper resistance.

6) VerifySignatureManifest (KDS Handle, Content File, Signature Manifest File) to verify content signing and supply chain tamper resistance using a signature manifest file.

7) QueryUpdate (KDS Handle, Group Identifier) to check for updates. The KDS verifies whether update pending for member ID based on the last content retrieved-on date and pending published content associated with the device type and group.

8) RetrieveUpdate (KDS Handle, Group Identifier) to retrieve the download URL and URIs for the published content identifier (i.e., content file and extended signature manifest file).

9) Notify UpdateStatus (KDS Handle, Group Identifier, Content Identifier, Status Code) to notify status of the device update (0: Complete, non-zero-integer: Error Code) based on the retrieved download URL/URIs to the KDS for state synchronization.

In one exemplary embodiment of the disclosed system, the KDS interface application programming interface (API) includes helper utilities (or convenience APIs) for the applications executing on the member device to optionally perform local key operations using the KDS context. The Local Key Identifier (LKID) is a local fast lookup index stored within the KDS context wherein the retrieved key records may be cached in the process space (execution context).

1) AuthenticateMessage (KDS Handle, Message Buffer, Message Length, Hash Function, Hash Buffer, Hash Length, LKID)

Generates a keyed-hash message authentication code (HMAC) for the specified message using the cryptographic hash function (e.g., HMAC-MD5-128, HMAC-SHA-160, HMAC-SHA-224, HMAC-SHA-256, HMAC-SHA-384, HMAC-SHA-512, HMAC-POLY1305, BLAKE-224, BLAKE-256, BLAKE-384, BLAKE-512, BLAKE2B-256, BLAKE2S-256, or BLAKE3-256) and secret pre-shared key (S-PSK) associated with the specified local key identifier (LKID).

Returns the HMAC for the message to be authenticated. The HMAC hash must be sent alongside the message (irrespective of whether the message is encrypted) for the server application to verify the integrity and authenticate the client application's message.

This helper API may be utilized by applications during signing (as the producer) and verification (as the consumer) operations.

2) EncryptMessage (KDS Handle, Plaintext Buffer, Plaintext Length, Ciphertext Buffer, Ciphertext Length, LKID)

Encrypts the specified plaintext message using the secret pre-shared key (S-PSK) associated with the specified local key identifier (LKID).

Returns the encrypted message in the specified ciphertext buffer.

3) DecryptMessage (KDS Handle, Ciphertext Buffer, Ciphertext Length, Plaintext Buffer, Plaintext Length, LKID)

Decrypts the specified ciphertext message using the secret pre-shared key (S-PSK) associated with the specified local key identifier (LKID).

Returns the decrypted message in the plaintext buffer.

In one exemplary embodiment of the disclosed system, the KDS interface application programming interface (API) may include application identifiers comprising of, for example, a file path (e.g., file directory), a file name, and a file hash in all requests to the KDS or KDS proxy. The KDS may store the application identifiers in activity records of device transactions (e.g., member identifier, tenant identifier, group identifier, identity hint, request type, transaction status, request timestamp) for device risk monitoring. The KDS interface may determine the application identifiers based on the process identifier (PID) and operating system specific lookup to retrieve the associated application module load path and application name. The application identifiers provide threat intelligence to track unauthorized (or malicious) applications on the device that attempt to access the KDS. The KDS may be configured with security policies to inspect the application identifiers received as part of the KDS interface request against externally sourced threat intelligence, namely application image/binary reputation/deny lists, deny the key request, and block unauthorized or malware applications from retrieving the pre-shared keys. By not storing the retrieved pre-shared keys in local storage on the device, the operational pre-shared keys may be protected by authorized applications from abuse/exploit by co-resident unauthorized or malware applications. In contrast, configuring, managing, and monitoring application access to persisted PKI issued certificates and password-protected private keys (of an asymmetric keypair) on headless devices requires difficult-to-administer local user, group, and service level access control lists (ACLs).

In the disclosed system and method, a pre-shared key (PSK) is described and annotated based on purpose and function. The PSK pre-configured for member devices to authenticate with the KDS, using the associated PSK identity hint for the tenant identifier during the device authentication handshake, prior to initiating key related operations is referred to as the KDS member PSK (M-PSK). The pre-configured M-PSK for member devices is associated with a pre-configured M-PSK identity hint for use during the device authentication handshake. The KDS may be pre-configured with a plurality of M-PSKs and associated M-PSK identity hints for each configured tenant in a multi-tenancy and shared (and synchronized) with the KDS proxy associated with the tenant. The M-PSK identity hint and associated M-PSK may be pre-configured on the KDS and member devices. The M-PSK identity hint and associated M-PSK may be unique for each member device to establish a first factor of authentication for enhanced security or may be shared between member devices within a tenancy or device group. The DNS reverse lookup using the member device IP address for the member device hostname through the configured authoritative DNS server for member device domain validation establishes the second factor of authentication. In this manner, multi-factor authentication of a member device is performed by a KDS (or KDS proxy).

The member devices may be pre-configured at the factory (by initializing program variables in the application image on RTOS platforms) or in the field (by loading a configuration file on GPOS platforms) during onboarding with a default and shared M-PSK identity hint and M-PSK for initial (day-zero) pre-authentication with the KDS. However, post device authentication and domain validation, a member device may generate a device unique private M-PSK identity hint and create an associated M-PSK (using the KDS interface API) with the reserved group identifier of "pre-authentication" (and associated group type of "onboarding") for subsequent pre-authentication with the KDS.

The PSK distributed to a client or server application, executing respectively on a member client or server device, for the client application to authenticate with the server application is referred to as the client authentication PSK (C-PSK). The PSK distributed to an client application executing on a member client device to securely communicate with a server application executing on a member server device, over a connection-oriented or connection-less transport protocol, is referred to as the PSK for secure communications (S-PSK). The C-PSKs and S-PSKs are generated, or may optionally be pre-configured on the KDS, and distributed to authenticated and domain validated member devices based on group membership and tenancy association, to post-configure the member devices. While the PSKs on the client and server devices, and on the client and server devices, are depicted with different labels in the figures, the symmetric keys are shared and are therefore identical within specific workflows as illustrated in FIG. 3A and FIG. 5A. In one exemplary embodiment of the disclosed system and method, applications executing on a member device may acquire and use a plurality of PSKs (C-PSKs, S-PSKs) based on different group identifiers and identity hints. In yet another exemplary embodiment of the disclosed system and method, server applications executing on a member device may acquire and use a plurality of PSKs (C-PSKs) based on different identity hints for a group identifier, because a group identifier may be associated to a plurality of key records as illustrated in FIG. 7A.

In this manner, the M-PSK, the device member domain validation by an authoritative DNS server, the securely distributed C-PSK or S-PSK, and the negotiated session key for TLS/DTLS based connections together establish a three-factor authentication of a member device, and four-fold increase in security, for high assurance of trust in a member device.

The purpose of the device authentication handshake using the pre-configured M-PSK and associated PSK identity hint between a member device and a KDS is to pre-authenticate the member device prior to initiating any DNS reverse lookup requests with the configured DNS servers. This provides a safeguard mechanism against rogue devices attempting to connect with a KDS using a stolen M-PSK or a dictionary attack to guess the M-PSK. Despite the safeguard, a sophisticated attacker could still use a compromised M-PSK and associated PSK identity hint from a cloned rogue device to perform a device authentication handshake. However, the subsequent member device DNS hostname validation through the authorized DNS server(s), based on the pre-requisite security countermeasure that the LAN is protected against IP address spoofing (by the network fabric of access, distribution, and core switches and routers in the path) would detect the rogue device as an unauthorized device and generate an alert to block subsequent accesses from the rogue device through a midstream network firewall or intrusion detection system security countermeasure (rule). The M-PSK and associated PSK identity hint may optionally be protected using a node-locked configuration file and a PUF as a security countermeasure. The ability to configure a plurality of M-PSKs and associated PSK identity hints on the KDS provides for timely remediation, with M-PSK renewal, should a M-PSK be compromised.

In the disclosed system and method, the member device may be assigned an IP address (IPv4 or IPv6) using either a statically configured IP address or a dynamically assigned IP address by a Dynamic Host Configuration Protocol (DHCP) server configured for the LAN. The DNS server must be configured with the assigned member device IP address (A) record entry either manually or automatically (e.g., with Dynamic DNS). For a member device configured for dynamic IP address assignment, the allocated (leased) IP address may be reserved by the DHCP server for the member device with the associated Media Access Control (MAC) address, thereby ensuring an immutable IP address for the member device in the network domain of device enrollment.

In the disclosed system and method, all DNS operations are performed over secure DNS (DNS over TLS or DNS over HTTPS) to prevent DNS data tampering by man-in-the-middle (MITM) attacks. For protection against DNS data falsification or DNS cache poisoning attacks, the DNS answer resource records (i.e., responses) from the configured DNS servers to the KDS requests may be digitally signed as per the Domain Name System Security Extensions (DNSSEC) specification. Therefore, device validation may be performed by the KDS using authenticated DNS records.

Figure 1A:
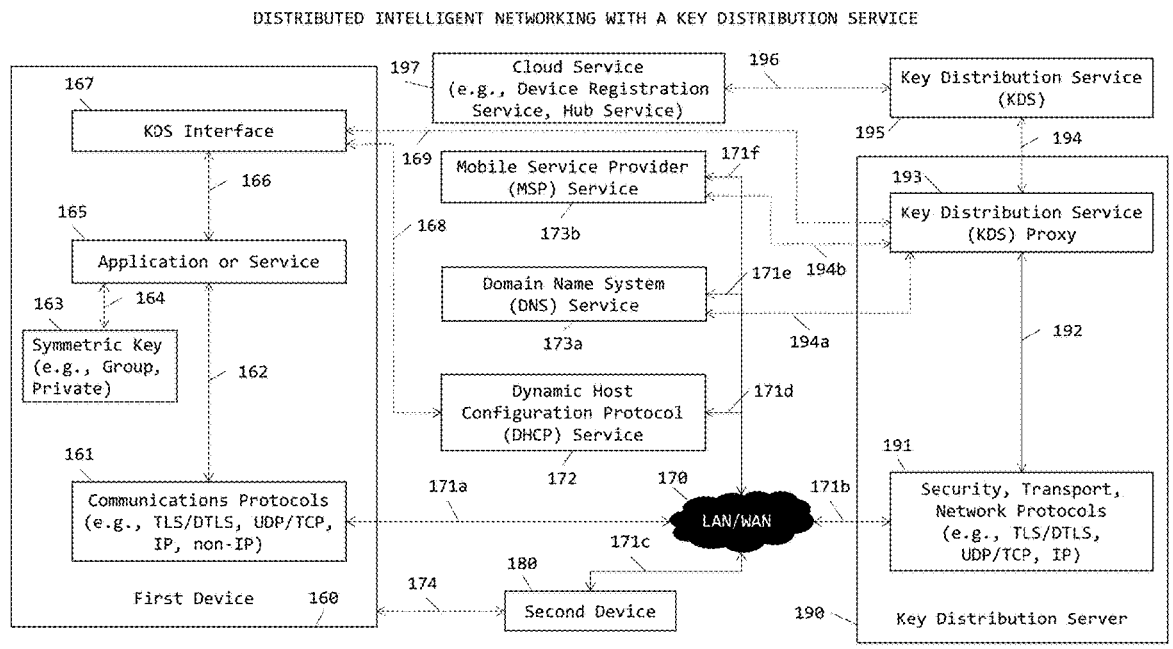
FIG. 1A is a schematic diagram illustrating an example distributed intelligent network and key distribution service in accordance with various exemplary embodiments of the disclosed system.

Referring to FIG. 1A, an application or service 165 executing on a first device 160 may establish an authenticated and secure communication with an application or service on a second device 180 over a local or wide area network (LAN/WAN) 125. The first device 160 and the second device 180 use a respective (and identical) client KDS interface 303 or server KDS interface 310 (FIG. 3A)(collectively referred to as KDS interface 167 in FIG. 1A), a respective (and identical) pre-shared symmetric key data 163, a respective communications protocols stacks comprising of standard security protocols (e.g., TLS, DTLS), standard transport protocols (e.g., TCP, UDP), standard networking protocols (e.g., IPv4, IPv6), and non-IP protocols (e.g., CAN Bus, HART, WirelessHART, RS232 serial) 161. The first device and the second device connect to a respective DHCP service 172 for device configuration and attributes including vendor specific information configured with extensible custom options, a respective DNS service 173a for device domain authentication, and a respective key distribution service (KDS) proxy 602 for key operations over a local or wide area network (LAN/WAN) 125. Each device may reside on a different LAN/WAN 125, domain, and use a different DHCP service 172 and DNS service 321. In an alternate embodiment of the disclosed system and method, a mobile device may be authenticated by a mobile service provider (MSP) 322 service over a wide area network (WAN) 125. The key distribution service proxy (proxies) 602 connect over the LAN/WAN 125 to a key distribution service (KDS) 305 hosted on-premises or in the cloud. The KDS 305 may connect over the WAN 125 to a cloud service 197 comprising of, for example, device registration services or hub services.

Referring to FIG. 1A, at step 166 application or service 165 may initially use the KDS interface 167 (client KDS interface 303 or server KDS interface 310, FIG. 3A) APIs to retrieve (auto discover) device information (e.g., configuration and attributes). The application or service 165 may also load the device specific primary/secondary KDS server addresses and tenant identifier from a device configuration file. The application or service 165 may also load the application specific group identifiers and pre-shared identity hints from an application specific configuration file. At step 168 the client KDS interface 303 or server KDS interface 310 queries the DHCP service 172 for the requested device information. Subsequently, at step 166 application or service 165 may use the client KDS interface 303 or server KDS interface 310 APIs to send key requests (for key operations such as, for example, create, retrieve, verify, renew, delete) to a KDS proxy 602, wherein the key request comprises of at least the tenant identifier and group identifier, and for singular keys the per-shared key identity hint. At step 169 the client KDS interface 303 or server KDS interface 310 initiates device authentication, session key exchange, and sends key requests over a secure channel to the KDS proxy 602. At step 194a the KDS proxy 602 authenticates the device DNS hostname using the DNS service 173a to perform a reverse lookup for the device DNS hostname by device IP address. For mobile devices, the KDS proxy 602 authenticates the mobile device using the MSP 322 service to match nonces signed by the SIM on the device and by the MSP based on the device IMSI. Post device authentication, at step 194 the KDS proxy 602 sends the key request to the KDS 305. Retrieved pre-shared symmetric key data 163 is provided to the application or service 165. At step 164 the application or service 165 uses the retrieved pre-shared symmetric key data 163 to perform cryptographic operations based on the designated key type and usage constraints. At step 162 client authentication, data authentication, or data encryption is performed accordingly to establish an authenticated and secure communication at step 174 with a second device 180, wherein on the second device 180 identical sequence of steps are executed to retrieve the pre-shared symmetric key data 163 and perform cryptographic operations at step 164. At step 166 an application or service 165 may request a plurality of keys from the KDS proxy 602. At steps 192 and 194, the KDS proxy 602 uses security, transport, and network protocols 191 on the key distribution server 190 for communications with the KDS 305, the first device 160, and the second device 180 over the LAN/WAN 125. References 171a-171f in FIG. 1A depict communications routed over the LAN/WAN 125 network fabric between devices 160/180 and services 172/305/321/323/602.

Figure 2A:
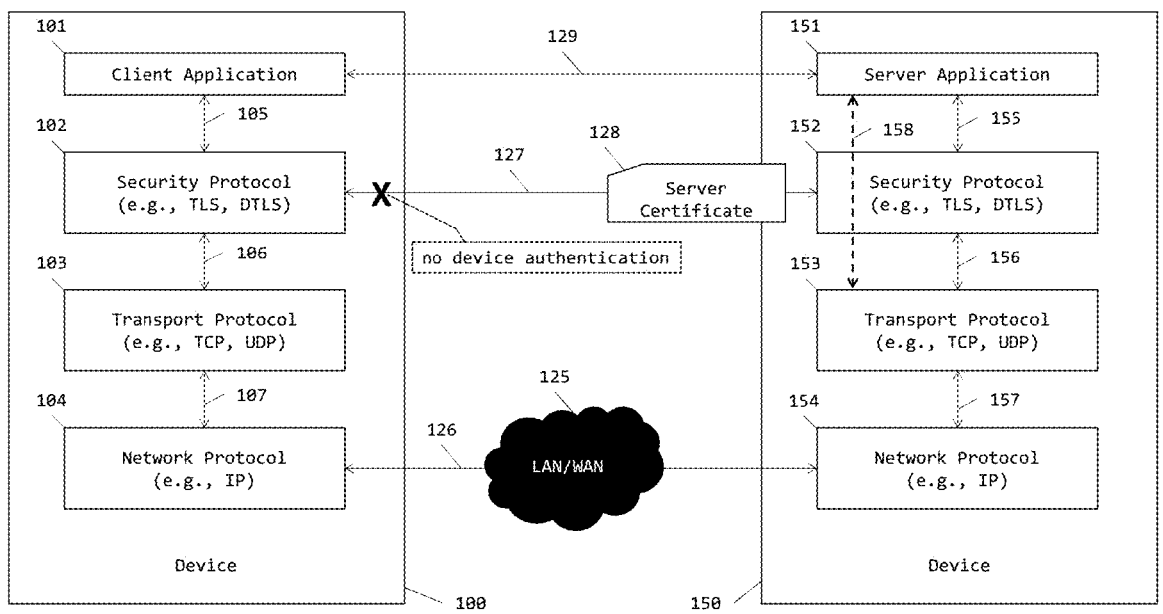
FIG. 2A is a schematic diagram illustrating a common method to establish a connection between devices over secure transport with server certificate verification illustrating the absence of device authentication.

Referring to FIG. 2A, a client application 101 executing on device 100 establishes a connection 129 over a local or wide area network (LAN/WAN) 125 with a server application 151 executing on device 150. At step 105, the client application 101 uses a security protocol stack 102, such as for example connection-oriented Transport Layer Security (TLS) or connection-less Datagram TLS (DTLS) to establish a secure session 127 with the server application 151. At step 106, the security protocol stack 102 uses a transport protocol stack 103, such as for example the connection-oriented Transmission Control Protocol (TCP) or connection-less User Datagram Protocol (UDP). At step 107, the transport protocol stack 103 uses a network protocol stack 104, such as for example the Internet Protocol (IP) version 4 (IPv4) or version 6 (IPv6) to establish a network connection 126 over a local or wide area network (LAN/WAN) 125. At step 155, the server application 151 uses a security protocol stack 152, such as for example connection-oriented Transport Layer Security (TLS) or connection-less Datagram TLS (DTLS) to establish a secure session 127 with the client application 101. At step 156, the security protocol stack 152 uses a transport protocol stack 153, such as for example the connection-oriented Transmission Control Protocol (TCP) or connection-less User Datagram Protocol (UDP). At step 157, the transport protocol stack 153 uses a network protocol stack 154, such as for example the Internet Protocol (IP) version 4 (IPv4) or version 6 (IPv6) to establish a network connection 126 over a local or wide area network (LAN/WAN) 125.

Referring to FIG. 2A, at secure session 127 the client application 101 executing on device 100 uses the server certificate 128 to perform certificate chain verification and authenticate the server application 151 executing on device 150. The certificate chain verification includes verifying all certificates in the chain from the leaf certificate, through one or more intermediate (issuer) certificates, to the root certificate authority (CA) certificate. However, there is no device authentication performed by the server application 151 to identify the device 100 as an authentic connected device. This illustrates the security risks in permitting headless OT/IIoT/IoT devices to connect with legitimate services without device authentication. Implementing TLS or DTLS compliant protocol stacks with PKI certificate based device authentication on resource constrained devices is a challenge for the original equipment manufacturers (OEMs).

Figure 2B:
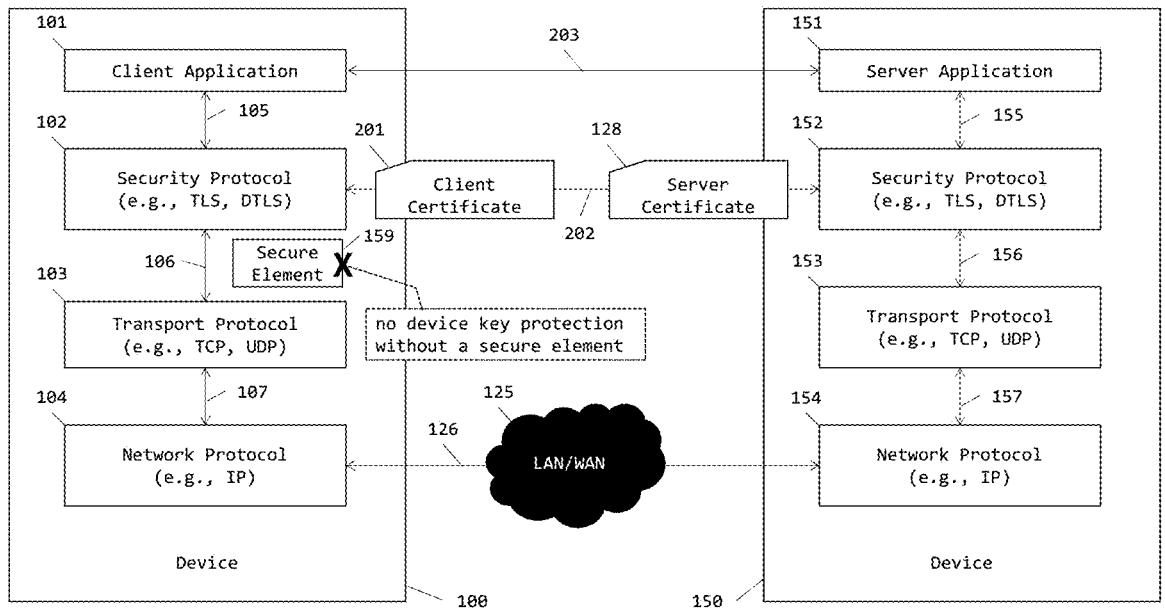
FIG. 2B is a schematic diagram illustrating a common method to establish a connection between devices over secure transport with client certificate and server certificate verification illustrating the absence of device key protection without requiring a secure element on the device.

Referring to FIG. 2B, at step 203 the client application 101 executing on device 100 establishes a secure connection over a local or wide area network (LAN/WAN) 125 with a server application 151 executing on device 150. At step 202, establishing a secure session includes sending a client certificate 201 to the server application 151 for authentication of the client application 101 executing on the device 100 by the server application 151 executing on device 150. However, there is no device key protection without a secure element on the device 100. Therefore, the private key corresponding to the public key included in the client certificate is unprotected from malware exploits and device cloning. This illustrates the security vulnerabilities in headless OT/IIoT/IoT devices, with PKI based solutions, in the absence of private key protection. Adding support for a hardware or firmware based secure element (e.g., TPM, PUF, integrated or embedded SIM) by the original equipment manufacturer increases the per unit device price.

Referring to FIG. 3A and FIG. 7A, in one exemplary embodiment of the disclosed system and method, at step 316 an administrator 318 uses the KDS portal 317 to configure entities and relationships in the KDS 305. The configuration includes at least the creation of tenants by tenant identifier 735; groups by group identifier 705, group type 707, and a plurality of key records 709; and member devices 701 by member identifier 703. A list of authorized local Domain Name Servers (DNS) 321 may be explicitly configured on the KDS portal 317, in addition to system level configuration of settings for a DNS connector. In another exemplary embodiment of the disclosed system and method, at step 316 an administrator 318 may use the KDS portal 317 to create key records, create key instances, and renew expired key instances. This simplifies the retrieval and usage of pre-shared keys using a group identifier 705 and identity hint 711 by applications executing on the member devices. In yet another exemplary embodiment of the disclosed system and method, a list of online (i.e., Internet, cloud) authorized mobile service provider (MSP) 322 servers may be explicitly configured on the KDS portal 317 to authenticate devices with a local SIM (e.g., mobile devices, smartphones) configured by an MSP.

Referring to FIG. 3A and FIG. 7A, in one exemplary embodiment of the disclosed system and method, at step 302 the client application 101 executing on device 100 uses the key distribution service (KDS) interface 303 to authenticate the member device 100 with the KDS 305 over the local or wide area network (LAN/WAN) 125. At step 304 the KDS interface uses APIs to communicate with the KDS 305 to retrieve, create and retrieve, verify, renew, or delete a symmetric key instance 714, depicted as PSK 312, based at least the tenant identifier 735, member identifier 703, group identifier 705, and identity hint 711. In yet another exemplary embodiment of the disclosed method, the entire key record 709 is retrieved. The KDS 305 uses a configured local Domain Name Server (DNS) 321, with communications at steps 300 and 320 routed over the LAN/WAN 125 network fabric, to reverse lookup the requestor member device IP address (of device 100) and retrieve the registered member DNS hostname 722. The retrieved member DNS hostname 722 is then matched with the received member identifier 703 in the API request at step 304 to authenticate the member device 100. At step 306, the client application 101 uses the retrieved PSK 313 and associated identity hint 711 to initiate a TLS-PSK based client authentication at step 307.

Referring to FIG. 3B, FIG. 3A, FIG. 6 and FIG. 7, in one exemplary embodiment of the disclosed system and method, step 304 includes a device authentication handshake using the configured KDS member PSK (M-PSK) and M-PSK identity hint with the KDS 305 (or KDS proxy 602) and the configured DNS server 321. At step 350, the client KDS interface 303 sends a device hello to the KDS 305, wherein the message comprises of at least the configured tenant identifier 735 encrypted with the configured M-PSK and the configured M-PSK identity hint 711. At step 351 the KDS 305 creates (establishes) a session context and at step 352 sends a server challenge to the client KDS interface 303 comprising of at least a unique and random nonce value and a hash function specification, wherein the service challenge is encrypted with the M-PSK associated with the received M-PSK identity hint 711. At step 353 the client KDS interface 303 generates and sends a device response to the KDS 305 comprising of a hash output corresponding to the service challenge 352, wherein the device response is encrypted with the M-PSK. At step 354 the KDS 305 verifies the received hash output and on match with an expected hash output authenticates the device and at step 355 sends a server hello to the client KDS interface 303 to commence key exchange. The server hello message includes a list of supported key exchange protocols encrypted with the M-PSK. At step 356 the KDS interface commences a secure key exchange protocol handshake using one of the supported key exchange protocols, for example, the ephemeral Diffie-Hellman (DH) or Elliptic-Curve DH (ECDH) key exchange method, or using NIST approved quantum resistant cryptographic algorithms (NISTIR 8309 https://doi.org/10.6028/NIST IR 8309) for general encryption (such as for example CRYSTALS-Kyber) over an insecure channel (e.g., UDP or TCP) to generate a session key at the client KDS interface 303 and KDS 305. The session key is never transmitted over the insecure channel. At step 357 the client KDS interface 303 sends a KDS request encrypted with the session key. At step 358 the KDS 305 the device is validated using the device IP address and a DNS reverse lookup to match with the device member DNS hostname 722. On validation, at step 359 the KDS 305 sends a KDS response encrypted with the session key to the client KDS interface 303. At step 360, subsequent key operations may be initiated repeating steps 357, 358 and 359. At step 361 the client KDS interface 303 sends a device finish to the KDS 305 to free (release) the context at step 362. A subsequent session may be established repeating the sequence beginning with step 350.

Referring to FIG. 3B and FIG. 6, in one exemplary embodiment of the disclosed system and method, the described message sequence for device authentication handshake using the configured device member PSK (M-PSK) is identical between the client KDS interface 303 and KDS proxy 602.

Referring to FIG. 3B and FIG. 6, in one exemplary embodiment of the disclosed system and method, the described message sequence for device authentication handshake using the configured device member PSK (M-PSK) and M-PSK identity hint may be performed using a connection-less (e.g., UDP) or connection-oriented (e.g., TCP) transport protocol on resource constrained devices wherein use of a secure transport protocol (e.g., DTLS, TLS, IPsec) is not feasible.

Referring to FIG. 3A and FIG. 7A, in one exemplary embodiment of the disclosed system and method, at step 309 the server application 151 executing on device 150 uses the key distribution service (KDS) interface 310 to authenticate the member device 150 with the KDS 305 over the local or wide area network (LAN/WAN) 125. At step 311 the KDS interface uses APIs to communicate with the KDS 305 to retrieve, create and retrieve, verify, renew, or delete a symmetric key instance 714, depicted as PSK 312, based at least the tenant identifier 735, member identifier 703, group identifier 705, and identity hint 711. In yet another exemplary embodiment of the disclosed method, the entire key record 709 is retrieved. The KDS 305 uses a configured local Domain Name Server (DNS) 321 to reverse lookup the requestor member device IP address (of device 150) and retrieve the registered member DNS hostname 722. The retrieved member DNS hostname 722 is then matched with the received member identifier 703 in the API request at step 311 to authenticate the member device 150. At step 313, the server application 151 uses the retrieved PSK 312 to verify a TLS-PSK based client authentication at step 308.

Referring to FIG. 3A, in one exemplary embodiment of the disclosed system and method, at step 308, a PSK-based client authentication and a server certificate-based server authentication are accomplished to establish a secure session between the client application 101 and the server application 151.

Referring to FIG. 3A and FIG. 7A, in one exemplary embodiment of the disclosed system and method, at step 315, the shared symmetric keys depicted as 305 and 312, the server application 151 executing on device 150 authenticates the client application 101 executing on device 100. The server application 151 may use different identity hints 711 and key instances 715, and therefore different symmetric PSKs 506, to authenticate client applications 101 on different devices 100.

Referring to FIG. 3A, in one exemplary embodiment of the disclosed system and method, at step 309 a server application 151 may use the server KDS interface 310 to retrieve at step 311 a list of key records 709 by group identifier 705 to cache key instances 715 by identity hints 711 for quick look up during TLS-PSK based handshake for session establishment.

Referring to FIG. 3C, FIG. 3A, FIG. 3B, and FIG. 7A in yet another exemplary embodiment of the disclosed system and method, at step 304 includes a device authentication handshake for mobile member devices using the configured KDS member PSK (M-PSK) and M-PSK identity hint with the KDS 305 (or KDS proxy 602) and the configured MSP 322 server. At step 363, the client KDS interface 303 sends a device hello to the KDS 305, wherein the message comprises of at least the configured tenant identifier 735, the device ICCID as the member identifier 703, the device IMEI as the member (universally unique identifier) UUID 731, and the device IMSI all encrypted with the configured M-PSK and the configured M-PSK identity hint 711. At step 364 the KDS 305 creates (establishes) a session context and at step 365 sends a server challenge to the client KDS interface 303 comprising of a random nonce value, wherein the service challenge is encrypted with the M-PSK associated with the received M-PSK identity hint 711. At step 366 the client KDS interface 303 generates and sends a device response to the KDS 305 comprising of a nonce signed with the SIM's authentication key (stored in the SIM card circuitry or as an applet on the SIM) corresponding to the service challenge 352, wherein the device response is encrypted with the M-PSK. At step 367 the KDS 305 first sends the nonce corresponding to the service challenge 365 and the device IMSI of the mobile member device to the mobile service provider (MSP) 322 corresponding to the mobile member device, then receives the signed nonce from the MSP 322, and finally compares and matches the signed nonces received from the client KDS interface 303 and the MSP 322 to authenticate and validate the mobile member device. At step 368, the mobile member device validation performed at step 367 is verified.

Referring to FIG. 3B and FIG. 3C, in one exemplary embodiment of the disclosed system and method, based on the configured and negotiated key exchange methods, at steps 350 and 363 the device hello may include a static public authentication key, generated by the client KDS interface 303 for the application on the member device, encrypted with the M-PSK. Accordingly, at step 355 the server hello may include a static public authentication key, generated on the KDS 305 or KDS proxy 602, encrypted with the M-PSK.

Referring to FIG. 3D and FIG. 3A, at step 375, the client application 101 loads distinct device and application specific configuration files comprising of configuration settings required to access the KDS 305 or KDS proxy 602. At step 376 the client application 101 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 369 the client application 101 uses the group identifier and C-PSK identity key loaded from the application specific configuration file. At step 377, the client application 101 uses the RetrieveKey API to retrieve the pre-shared key (C-PSK) associated with the group identifier and C-PSK identity hint. At step 370, the client application 101 uses the retrieved C-PSK for PSK based client authentication with the server application over TLS (i.e., TLS-PSK). At step 371, the client application 101 securely sends/receives data to/from the server application over the TLS session using the negotiated session key. At step 383, the client application 101 uses the CloseContextKDS API to free the KDS context, thereby deleting the local C-PSK (i.e., the C-PSK is not persisted locally and re-acquired from the KDS 305 or KDS proxy 602 over client application restart).

Referring to FIG. 3E and FIG. 3A, at step 375, the server application 151 loads distinct device and application specific configuration files comprising of configuration settings required to access the KDS 305 or KDS proxy 602. At step 376 the server application 151 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 372 the server application 151 uses the group identifier loaded from the application specific configuration file. At step 378, the server application 151 uses the RetrieveKeys API to retrieve the pre-shared keys (C-PSKs) associated with the group identifier (i.e., pre-load C-PSKs required to accept connections from the client applications 101). At step 373, the server application 151 uses the C-PSK identity hint received from a client application 101 to reference the associated pre-loaded C-PSK for PSK based authentication of the client application 101 over TLS (i.e., TLS-PSK). At step 374, the server application 151 securely receives/sends data from/to the client application over the TLS session using the negotiated session key. At step 383, the server application 151 uses the CloseContextKDS API to free the KDS context, thereby deleting the local pre-loaded C-PSKs (i.e., the C-PSKs are not persisted locally and re-acquired from the KDS 305 or KDS proxy 602 over server application restart).

Referring to FIG. 3E and FIG. 3D, the client and server applications may use the VerifyKey API to verify the status of the C-PSK with the client KDS interface 303. The client KDS interface 303 examines the C-PSK expiration timestamp, and for non-expired keys verifies the activation status of the C-PSK with the KDS 305 or KDS proxy 602. For a deactivated C-PSK, the client and server applications may use the RenewKey API to retrieve a renewed C-PSK.

In the disclosed system and method, an application executing on a device may use TLS-PSK, or UDP/TCP over IP, TLS without client authentication, or non-IP communications protocols. For TLS connections with servers, the server trusted certificates (root, intermediate, leaf) may be installed on the device and updated using standard device update methods.

In the disclosed system and method, an application executing on a device may be dynamically configured with a device unique pre-shared key for client authentication (C-PSK) over TLS-PSK. During onboarding, the main application (on RTOS platforms) or client application (on GPOS platforms) may generate a device unique C-PSK identity hint and create a device unique C-PSK programmatically using the KDSI APIs. The device unique C-PSK identity hint may be generated using the device unique registration ID (e.g., MAC address, serial number. The device unique C-PSK may be dynamically created on the KDS using the KDSI APIs. The server application on the TLS server may dynamically retrieve the client's device unique C-PSK using the KDSI APIs during the connection setup phase. The TLS client and server application may implement callbacks to validate the received PSK identity hint and fetch the pre-shared key during connection setup.

Referring to FIG. 3F, at step 384 the client application 101 executing on a member device generates a device unique C-PSK identity hint using the device unique registration ID (e.g., MAC address, serial number). The derivation function may be, for example, a HMAC-SHA256 algorithm. At step 385 the client application 101 uses the client KDS interface 303 to create a device unique C-PSK using the generated C-PSK identity hint. At step 386 the client KDS interface 303 communicates with the KDS 305 to create at step 387 a device unique C-PSK. At step 388 the device unique C-PSK is retrieved by the client application 101. At step 389 the client application 101 initiates a TLS connection with the server application 151 using the C-PSK identity hint for client authentication using the TLS-PSK protocol specification. At step 390 the server application 151 retrieves the C-PSK associated with the received C-PSK identity hint from the client application 101 using the server KDS interface 310 to communicate at step 391 with the KDS 305. At step 392 the associated C-PSK is retrieved by the server application 151 to perform client authentication.

Referring to FIG. 3H, in one exemplary embodiment of the disclosed system, the client KDS interface (303) and server KDS interface (310) application programming interface (API) may include at least the following set of operations:

1) RetrieveTrustedCertificates (KDS Handle)
   Retrieves trusted certificates in PKCS #8 PEM format (e.g., intermediate and root certificates concatenated with a new line character as the separator) for the device based on the tenant identifier.
2) RetrieveCertificateWithKey (KDS Handle, Subject Name)
   Retrieves leaf certificate in PKCS #8 PEM format for the specified subject name.
   Retrieves associated private key in PKCS #8 PEM format encrypted with the registered member M-PSK.
3) VerifyCertificate (KDS Handle, Certificate Serial Number)
   Verify certificate status (ACTIVE, EXPIRED, REVOKED) for the specified certificate serial number.

Referring to FIG. 3H, in another exemplary embodiment, a method is executed for an agentless solution on registered member devices authenticated with two-factor device authentication to retrieve trusted intermediate and root certificates, and leaf certificates and associated private keys, and verify status of the retrieved certificates, with a key distribution service (KDS) 305 using client KDS interface 303 APIs in any modern programming language. The public or private PKI based trusted certificates, and the leaf certificates and private keys, may be issued by a certificate authority (CA) 398 hosted on-cloud or on-premises. The KDS 305 interfaces with the CA 398 to import (in single or batch mode), renew, or rekey certificates over an authenticated REST API connector, and query status of a certificate on request by the client application executing on the authenticated member device. The KDS 305 enforces policy-based authorization to restrict retrieval of the leaf certificate and associated private key by trusted applications configured on the KDS 305. The client application 101 (e.g., TLS client, IKE client, SSH client, or command line utilities) executing on the authenticated devices may use the Online Certificate Status Protocol (OCSP) based certificate status verification, or client KDS interface 303 API to verify certificate status. The KDS proxy 602 and KDS 305 enforce device two-factor authentication on API requests for leaf certificate and associated private key retrievals.

Referring to FIG. 3H, FIG. 2A, FIG. 3A, and FIG. 7A, in another exemplary embodiment, a method is executed for importing, creating, renewing, rekeying, retrieving, or acquiring a leaf certificate for a public key and an associated private key of an asymmetric key pair, used in client authentication between applications executing on distributed devices, in data signing with digital signatures, in key unwrapping, including a client application executing on a first device, a server application executing on a second device, trusted intermediate certificates and trusted root certificates issued by a certificate authority (CA) 398, a key distribution service (KDS) 305, a KDS portal 317, a KDS administrator 318, a KDS proxy 602, a client KDS interface 303, a symmetric KDS member M-PSK, a M-PSK identity hint, a tenant identifier, an application identifier, a dynamic host configuration protocol (DHCP) service 172, and a domain name system (DNS) service 321.

The approach additionally includes methods wherein:

Importing by the KDS administrator 318 on the KDS portal 317, the leaf certificates and the associated private keys in single or batch mode.

Creating by the KDS administrator 318 on the KDS portal 317, an asymmetric key pair and sending a create leaf certificate request for the public key to the certificate authority 398.

Renewing by the KDS administrator 318 on the KDS portal 317, on expiry the leaf certificates by sending a request to the certificate authority 398; and private keys in single or batch mode by sending a request to the certificate authority 398.

Rekeying by the KDS administrator 318 on the KDS portal 317, by creating a new asymmetric key pair and sending a rekey leaf certificate request with the old leaf certificate and the new public key to the certificate authority 398.

Retrieving, by the KDS administrator 318 on the KDS portal 317, a plurality of leaf certificates and associated private keys as a batch generated by the certificate authority 398 and associated with a batch identifier; wherein the batch may be generated on request by the KDS administrator 318 on the KDS portal 317 or autonomously generated by the certificate authority 398.

Authenticating with the KDS 305, by the client application 101 executing on the first device 160, using the tenant identifier, the symmetric KDS member PSK (M-PSK), and the M-PSK identity hint, wherein the first device 160 is registered by a first DNS hostname on the DNS service 321 configured with the KDS 305 or the KDS proxy 602, and wherein the first device 160 is registered as a member device on the KDS 305.

Acquiring, by the client application 101, the trusted certificates, the leaf certificate, and the associated private key from the KDS 305 using at least the tenant identifier for trusted certificates and the subject name for leaf certificates, wherein the acquired leaf certificate and associated private key is used in certificate-based client authentication, for mutual authentication, over a secure transport protocol during communication with the server application 151 executing on the second device 180, or in data signing with digital signatures, or in key unwrapping.

Initiating, by the client application 101, a secure session using a security protocol, wherein the session is initiated using the acquired leaf certificate and associated private key for certificate-based client authentication, to establish secure communications with the server application 151 executing on the second device 180.

Verifying, by the client application 101, the certificate status programmatically using the client KDS interface 303, without requiring human intervention, and without service disruption, and wherein a further certificate-based client authentication is executed upon certificate renewal or rekey by re-acquiring the leaf certificate, the associated private key, and the trusted intermediate and root certificates.

The approach additionally includes methods wherein:

The device member authentication handshake is performed by the client KDS interface 303 on the first device 160 using the tenant identifier, the device member PSK (M-PSK), and the M-PSK identity hint as a first factor of a device authentication, and further wherein a session key is generated using a key exchange handshake between the client KDS interface 303 and the KDS 305 or the KDS proxy 602, and further wherein a device member validation is performed as a second factor of the device authentication, by:

performing, by the KDS 305 or the KDS proxy 602, a DNS reverse lookup of a device member IP address to query for the first DNS hostname; and retrieving, by the KDS 305 or the KDS proxy 602, the first DNS hostname from a resource record in a DNS response; and comparing and matching, by the KDS 305 or the KDS proxy 602, the retrieved first DNS hostname with a device member identifier in a plurality of KDS requests.

The approach additionally includes methods wherein:

The device authentication and a plurality of key exchange handshakes are performed over a connection-less UDP or connection-oriented TCP transport protocol, without requiring a security transport protocol, and further wherein a data authentication and/or a data encryption is performed with the retrieved pre-shared keys using any communications protocol.

The client KDS interface 303 provides a plurality of application programming interfaces (APIs), wherein the client application sends a plurality of requests for key and certificate operations directly to the KDS 305 and receive a plurality of responses for key and certificate operations directly from the KDS 305, or wherein the client application sends a plurality of requests for key and certificate operations indirectly through the KDS proxy 602 and receive a plurality of responses for key and certificate operations indirectly through the KDS proxy 602.

The first device 160 is registered by a unique DNS hostname in a domain on a local DNS server with an IP address (A) record and a PTR record used in a DNS hostname reverse lookup.

On the KDS 305 the first device 160 is configured as a member of a tenancy associated with the tenant identifier.

An authenticated request from the first device 160 for any certificate operation, based on the tenant identifier and the application identifier, is processed by the KDS 305 and permitted based on a match with an application identifier associated with the tenant identifier, wherein the KDS 305 is configured to allow or deny the certificate operation.

The client application 101 uses the acquired leaf certificate and associated private key for data signing with a digital signature.

The client application 101 uses the acquired leaf certificate for key unwrapping (i.e., to decrypt a wrapped key).

On request by the KDS administrator 318 at the KDS portal 317 the certificate authority 398 generates the asymmetric key pair and the leaf certificate for the generated public key and sends the generated leaf certificate and the associated generated private key file to the KDS portal 317.

Referring to FIG. 3H, FIG. 2A, FIG. 3A, and FIG. 7A, in another exemplary embodiment, a method is executed for importing, creating, renewing, rekeying, retrieving, or acquiring a leaf certificate for a public key and an associated private key of an asymmetric key pair, used in server authentication with applications executing on distributed devices, in data signing with digital signatures, in key unwrapping, including a client application 101 executing on a first device 160, a server application 151 executing on a second device 180, trusted intermediate certificates and trusted root certificates issued by a certificate authority (CA) 398, a key distribution service (KDS) 305, a KDS portal 317, a KDS administrator 318, a KDS proxy 602, a server KDS interface 310, a symmetric KDS member M-PSK, a M-PSK identity hint, a tenant identifier, an application identifier, a dynamic host configuration protocol (DHCP) service 172, and a domain name system (DNS) service 321.

The approach additionally includes methods wherein:

Importing by the KDS administrator 318 on the KDS portal 317, the leaf certificates and the associated private keys in single or batch mode.

Creating by the KDS administrator 318 on the KDS portal 317, a asymmetric key pair and sending a create leaf certificate request for the public key to the certificate authority 398.

Renewing by the KDS administrator 318 on the KDS portal 317, on expiry the leaf certificates by sending a request to the certificate authority 398.

Rekeying by the KDS administrator 318 on the KDS portal 317, by creating a new asymmetric key pair and sending a rekey leaf certificate request with the old leaf certificate and the new public key to the certificate authority 398.

Retrieving, by the KDS administrator 318 on the KDS portal 317, a plurality of leaf certificates and associated private keys as a batch generated by the certificate authority 398 and associated with a batch identifier; wherein the batch may be generated on request by the KDS administrator 318 on the KDS portal 317 or autonomously generated by the certificate authority 398.

Authenticating with the KDS 305, by the server application 151 executing on the second device 180, using the tenant identifier, the symmetric KDS member PSK (M-PSK), and the M-PSK identity hint, wherein the second device 180 is registered by a second DNS hostname on the DNS service 321 configured with the KDS 305 or the KDS proxy 602, and wherein the second device 180 is registered as a member device on the KDS 305.

Acquiring, by the server application 151, the trusted certificates, the leaf certificate, and the associated private key from the KDS 305 using at least the tenant identifier for trusted certificates and the subject name for leaf certificates, wherein the acquired leaf certificate and associated private key is used in certificate-based server authentication over a secure transport protocol during communication with the client application 101 executing on the first device 160, or in data signing with digital signatures, or in key unwrapping.

Initiating, by the server application 151, a secure session using a security protocol, wherein the session is initiated using the acquired leaf certificate and associated private key for certificate-based server authentication, to establish secure communications with the client application 101 executing on the first device 160.

Verifying, by the server application 151, the certificate status programmatically using the server KDS interface 310, without requiring human intervention, and without service disruption, and wherein a further certificate-based server authentication is executed upon certificate renewal or rekey by re-acquiring the leaf certificate, the associated private key, and the trusted intermediate and root certificates.

The approach additionally includes methods wherein:

a device member authentication handshake is performed by the server KDS interface 310 on the second device 180 using the tenant identifier, the device member PSK (M-PSK), and the M-PSK identity hint as a first factor of a device authentication, and further wherein a session key is generated using a key exchange handshake between the server KDS interface 310 and the KDS 305 or the KDS proxy 602, and further wherein a device member validation is performed as a second factor of the device authentication, by:

performing, by the KDS 305 or the KDS proxy 602, a DNS reverse lookup of a device member IP address to query for the first DNS hostname; and retrieving, by the KDS 305 or the KDS proxy 602, the first DNS hostname from a resource record in a DNS response; and comparing and matching, by the KDS 305 or the KDS proxy 602, the retrieved first DNS hostname with a device member identifier in a plurality of KDS requests.

The approach additionally includes methods wherein:

The device authentication and a plurality of key exchange handshakes are performed over a connection-less UDP or connection-oriented TCP transport protocol, without requiring a security transport protocol, and further wherein a data authentication and/or a data encryption is performed with the retrieved pre-shared keys using any communications protocol.

The server KDS interface 310 provides a plurality of application programming interfaces (APIs), wherein the server application 151 sends a plurality of requests for key and certificate operations directly to the KDS 305 and receive a plurality of responses for key and certificate operations directly from the KDS 305, or wherein the server application 151 sends a plurality of requests for key and certificate operations indirectly through the KDS proxy 602 and receive a plurality of responses for key and certificate operations indirectly through the KDS proxy 602.

The second device 180 is registered by a unique DNS hostname in a domain on a local DNS service 321 with an IP address (A) record and a PTR record used in a DNS hostname reverse lookup.

On the KDS 305 the second device 180 is configured as a member of a tenancy associated with the tenant identifier.

An authenticated request from the second device 180 for any certificate operation, based on the tenant identifier and the application identifier, is processed by the KDS 305 and permitted based on a match with an application identifier associated with the tenant identifier, wherein the KDS 305 is configured to allow or deny the certificate operation.

The server application 151 uses the acquired leaf certificate and associated private key for data signing with a digital signature.

The server application 151 uses the acquired leaf certificate key unwrapping (i.e., to decrypt a wrapped key).

On request by the KDS administrator 318 at the KDS portal 317 the certificate authority 398 generates the asymmetric key pair and the leaf certificate for the generated public key and sends the generated leaf certificate and the associated generated private key file to the KDS portal 317.

In another exemplary embodiment, a method is executed for assigning a leaf certificate and the associated private key to a member device from the imported or retrieved batch of leaf certificates and associated private keys, wherein a lookup is performed for a match of the member UUID, or member identifier, or member DNS hostname with the subject name in the leaf certificate and the matched certificate and associated private key, for retrieval by the member device using the client KDS interface 303 or server KDS interface 394 RetrieveCertificateWithKey API. In yet another exemplary embodiment of the disclosed system, the lookup and match of the leaf certificate and associated private key may be performed automatically by the KDS 305 or a collaborative service of the KDS 305, during device discovery and onboarding.

Referring to FIG. 3H, in one exemplary embodiment of the disclosed system and method, at step 375, a client application 101 loads a device specific configuration file comprising of configuration settings required to access the KDS 305 or KDS proxy 602. At step 376 the client application 101 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 393 the client application 101 retrieves and stores trusted certificates (i.e., intermediate and root CA certificates) in a local trust store by retrieving the trusted certificates at step 394 using the RetrieveTrustedCertificates API. At step 395, the client application 101 retrieves and stores the leaf certificate and associated private key in the local key store by retrieving the leaf certificate and associated private key at step 396*a* using the RetrieveCertificateWithKey API, encrypted using the device M-PSK for security. At step 397 the client application 101 uses the retrieved leaf certificates and private keys for client authentication, data signing with digital signatures, and key unwrapping. At step 396*b* the client application 101 verifies the status of the retrieved leaf certificate (e.g., active, revoked, or expired) using the VerifyCertificate API. At step 383, the client application 101 uses the CloseContextKDS API to free the KDS context and close the KDS session.

Referring to FIG. 3H, in one exemplary embodiment of the disclosed system and method, at step 316 administrator 318 uses the KDS portal 317 to import a leaf certificate file and the associated private key file. At step 398*a* administrator 318 uses the KDS portal 317 to create an asymmetric public and private key pair, and send a request to create or rekey a leaf certificate for the public key to the configured certificate authority (CA) 398. Further at step 398*a* administrator 318 uses the KDS portal 317 to send a renew or revoke leaf certificate request to the configured certificate authority (CA) 398. At step 398*b* the client KDS interface 303 interfaces with the KDS 305 to retrieve the trusted certificates, or the leaf certificates and associated private keys, based on API requests from the client application 101. Further at step 316 the administrator 318 uses the KDS portal 317 to (locally) import trusted (intermediate and root CA) certificates and store them locally for use by the KDS 305 to send to the devices based on API requests from the client application 101 through the client KDS interface 303.

Referring to FIG. 3H, in one exemplary embodiment of the disclosed system and method, the identical sequence of steps may be performed by a server application 151 using the server KDS interface 310 for use in server authentication, data signing with digital signatures, and key unwrapping.

Referring to FIG. 3H, in one exemplary embodiment of the disclosed system, at step 316 the administrator 318 on the KDS portal 317, or at step 398*a* the certificate authority 398, dynamically generate a asymmetric key pair (i.e., associated public and private keys) using a specified key algorithm and key size such as, for example, Rivest-Shamir-Adleman (RSA) with key size, for example, of 512, 1024, 2048, or 4096 bits, Digital Signature Algorithm (DSA) with key size, for example, of 1024 bits, Elliptic curve cryptography (ECC) based on NIST specifications with key size, for example, of 224, 256, 384, or 521 bits), ECC based on the X.92 specification with key size, for example, of 192 or 256 bits), ECC based on the Standards for Efficiency Cryptography (SEC) specification with key size, for example, of 224, 384, or 521 bits, ECC based on the Brainpool specification with key size, for example, of 160, 192, 224, 256, 3209, 384, or 512 bits, or the NIST approved quantum safe ciphers (e.g., CRYSTALS-Dilithium, FALCON, SPHINCS+) for encryption, digital signature, or key encipherment. The certificate authority 398 creates and issues a leaf certificate for the public key based on a request from the KDS portal 317.

Referring to FIG. 3H, in one exemplary embodiment of the disclosed system, at step 316 the administrator 318 on the KDS portal 317, requests the certificate authority 398 for generation of a plurality (i.e., a batch associated with a universally unique batch identifier) of asymmetric key pairs, and leaf certificates with associated generated public keys, and associated private keys wherein the certificates and keys are sent to the KDS portal 317 in Privacy Enhanced Mail (PEM) file format or in the PFX (or PKCS #12) combined file format that holds the leaf certificate and the associated private key. The generated batch associated with the universally unique batch identifier may be retrieved subsequently at step 398*a* by the administrator 318 on the KDS portal 317 by sending a request to the certificate authority (398) for retrieval of a plurality of leaf certificates and associated private keys in batch mode.

Referring to FIG. 3H, in one exemplary embodiment of the disclosed system, the batch of leaf certificates and associated private keys, may be generated autonomously and associated with a universally unique batch identifier by the certificate authority 398 for subsequent retrieval by the administrator 318 on the KDS portal 317 using the universally unique batch identifier.

Referring to FIG. 3H, FIG. 7A, and FIG. 2A in one exemplary embodiment of the disclosed system, at step 316 the administrator 318 on the KDS portal 317, initiates a lookup for a leaf certificate and the associated private key in the imported (at step 316) or retrieved (at step 398*a*) batch of leaf certificates and associated private keys, wherein the member UUID 731, or member identifier 703, or member DNS hostname 722 is matched with the subject name in the leaf certificate and the matched certificate and associated private key are assigned to the member device 701 for retrieval at step 396*a* by the first device 160 or second device 180 through the client KDS interface 303 or server KDS interface 310 respectively. In yet another exemplary embodiment of the disclosed system, the lookup and match of the leaf certificate and associated private key may be performed automatically by the KDS 305 or a collaborative service of the KDS 305, during device discovery and onboarding.

Referring to FIG. 4, at step 403, a client application 101 executing on device 100 establishes a connection session over a local or wide area network (LAN/WAN) 125 with a server application 151 executing on device 150. At step 402, the client application 101 uses a transport protocol stack 102, such as for example connection-oriented TCP or connection-less UDP, to establish a session with the server application 151. At step 108, the transport protocol stack 103 uses a network protocol stack 104, such as for example the IPv4 or IPv6 to establish a network connection 126 over a local or wide area network (LAN/WAN) 125. At step 405, the server application 151 uses a transport protocol stack 153, such as for example connection-oriented TCP or connection-less UDP, to establish a session with the client application 101. At step 157, the transport protocol stack 153 uses a network protocol stack 154, such as for example the IPV4 or IPv6 to establish a network connection 126 over a local or wide area network (LAN/WAN) 125.

Referring to FIG. 4, at step 403, the client application 101 executing on device 100 may send or receive plaintext or encoded (but not encrypted) data 404 over the established connection session over a local or wide area network (LAN/WAN) 125 to or from the server application 151 executing on device 150. The mode of data transmission herein is insecure without session key-based network traffic encryption.

Referring to FIG. 5A and FIG. 7A, in one exemplary embodiment of the disclosed system and method, at step 302 the client application 101 executing on device 100 uses the key distribution service (KDS) interface 303 to authenticate the member device 100 with the KDS 305 over the local or wide area network (LAN/WAN) 125. At step 304 the KDS interface uses APIs to communicate with the KDS 305 to retrieve, or to create and retrieve, a symmetric key instance 714, depicted as PSK 501, based at least the tenant identifier 735, member identifier 703, group identifier 705, and identity hint 711. In yet another exemplary embodiment of the disclosed method, the key record 709 is retrieved. The KDS 305 uses a configured local Domain Name Server (DNS) 321 to reverse lookup the requestor member device IP address (of device 100) and retrieve the registered member DNS hostname 722. The retrieved member DNS hostname 722 is then matched with the received member identifier 703 in the API request at step 304 to authenticate the member device 100. At steps 502 and 503, the client application 101 uses the retrieved PSK 501 and associated identity hint 711 for authenticating and/or encrypting messages 504 sent to the server application 151 executing on device 150, and for verifying and/or decrypting messages 504 received from the server application 151 executing on device 150.

Referring to FIG. 5A and FIG. 7A, at step 309 the server application 151 executing on device 100 uses the key distribution service (KDS) interface 310 to authenticate the member device 150 with the KDS 305 over the local or wide area network (LAN/WAN) 125. At step 311 the KDS interface uses APIs to communicate with the KDS 305 to retrieve, or to create and retrieve, a symmetric key instance 714, depicted as PSK 506, based at least the tenant identifier 735, member identifier 703, group identifier 705, and identity hint 711. In yet another exemplary embodiment of the disclosed method, the key record 709 is retrieved. The KDS 305 uses a configured local Domain Name Server (DNS) 321 to reverse lookup the requestor member device IP address (of device 150) and retrieve the registered member DNS hostname 722. The retrieved member DNS hostname 722 is then matched with the received member identifier 703 in the API request at step 311 to authenticate the member device 150. At steps 507 and 508, the server application 151 uses the retrieved PSK 506 and associated identity hint 711 for authenticating and/or encrypting messages 504 sent to the client application 101 executing on device 150, and for verifying and/or decrypting messages 504 received from the client application 101 executing on device 150.

Referring to FIG. 5A, in one exemplary embodiment of the disclosed system and method, at step 509, the shared symmetric keys depicted as 501 and 506, the client application 101 executing on device 100 and server application 151 executing on device 150 establish secure communications with network traffic protection for data exchange.

Referring to FIG. 5B and FIG. 5A, at step 505, the client application 101 loads distinct device and application specific configuration files comprising of configuration settings required to access the KDS 305 or KDS proxy 602. At step 376 the client application 101 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 510 the client application 101 uses the group identifier and S-PSK identity key loaded from the application specific configuration file. At step 377, the client application 101 uses the RetrieveKey API to retrieve the pre-shared key (S-PSK) associated with the group identifier and S-PSK identity hint. At step 511, the client application 101 uses the retrieved S-PSK to securely send/receive data to/from the server application 151. At step 379 the client application uses the VerifyKey API to verify the status of the S-PSK with the client KDS interface 303. The client KDS interface 303 examines the S-PSK expiration timestamp, and for non-expired keys verifies the activation status of the S-PSK with the KDS 305 or KDS proxy 602. At step 380, for a deactivated S-PSK, the client application 101 uses the RenewKey API to retrieve a renewed S-PSK. At step 512 the client application 101 uses the retrieved S-PSK to securely send/receive data to/from the server application 151. At step 383, the client application 101 uses the CloseContextKDS API to free the KDS context, thereby deleting the local S-PSK (i.e., the S-PSK is not persisted locally and re-acquired from the KDS 305 or KDS proxy 602 over client application restart).

Referring to FIG. 5C, FIG. 5A, and FIG. 5B, at step 505, the server application 151 loads distinct device and application specific configuration files comprising of configuration settings required to access the KDS 305 or KDS proxy 602. At step 376 the server application 151 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 513 the server application 151 uses the group identifier and S-PSK identity key loaded from the application specific configuration file. At step 377, the server application 151 uses the RetrieveKey API to retrieve the pre-shared key (S-PSK) associated with the group identifier and S-PSK identity hint. At step 514, the server application 151 uses the retrieved S-PSK to securely receive/send data from/to the client application 101. At step 379 the server application uses the VerifyKey API to verify the status of the S-PSK with the client KDS interface 303. The client KDS interface 303 examines the S-PSK expiration timestamp, and for non-expired keys verifies the activation status of the S-PSK with the KDS 305 or KDS proxy 602. At step 380, for a deactivated S-PSK, the server application 151 uses the RenewKey API to retrieve a renewed S-PSK. At step 515 the server application 151 uses the retrieved S-PSK to securely receive/send data from/to the client application 101. At step 383, the server application 151 uses the CloseContextKDS API to free the KDS context, thereby deleting the local S-PSK (i.e., the S-PSK is not persisted locally and re-acquired from the KDS 305 or KDS proxy 602 over server application restart).

Referring to FIG. 5C, the server application 151 may use the RetrieveKeys API to retrieve the pre-shared keys (S-PSKs) associated with the group identifier (i.e., pre-load S-PSKs required to accept connections from the client applications 101).

Referring to FIG. 5D, FIG. 5A, FIG. 5B, and FIG. 5C, at step 505, the server application 151 loads distinct device and application specific configuration files comprising of configuration settings required to access the KDS 305 or KDS proxy 602. At step 376 the server application 151 uses the OpenContextKDS API to initialize the client KDS interface 303 for transactions with the KDS 305 or KDS proxy 602, using the KDS URLs, connection type, M-PSK, M-PSK identity hint, tenant identifier, and member identifier loaded from the device specific configuration file. At step 516 the server application 151 uses the group identifier and S-PSK identity key loaded from the application specific configuration file. At step 381, the server application 151 uses the CreateKey API to create and retrieve pre-shared keys (S-PSKs) associated with the group identifier and associated S-PSK identity hint. At step 517, the server application 151 uses the retrieved S-PSKs to securely receive/send data from/to the client applications 101. At step 382 the server application uses the DeleteKey API to delete the S-PSKs on the KDS 305. At step 383, the server application 151 uses the CloseContextKDS API to free the KDS context, thereby deleting the local S-PSKs (i.e., the S-PSKs are not persisted locally).

In the disclosed system and method, an application executing on a device may be dynamically configured with a device unique pre-shared key for authenticated secure communications (S-PSK) over any transport protocol (e.g., UDP, TCP, TLS). During onboarding, the main application (on RTOS platforms) or client application (on GPOS platforms) may use the group key (S-PSK) identity hint embedded (on RTOS platforms) or loaded from a configuration file (on GPOS platforms) to retrieve the group key (S-PSK) from the KDS. Next, a unique device key (D-PSK) may be derived with a HMAC-SHA256 of the retrieved group key (S-PSK) and the device unique registration ID pre-shared with the server (e.g., Azure DPS/Hub). For peer-to-peer communication using a S-PSK, a device group may be defined on the KDS with the client and server device as members, or the client application may dynamically create a S-PSK and send the S-PSK identity hint to the server application to retrieve the S-PSK from the KDS.

Referring to FIG. 5E, at step 519 the client application 101 executing on a member device uses a configured group key (S-PSK) identity hint (that may be embedded within the application or discovered through network characteristics based on DHCP or DNS based custom attributes or loaded from a configuration file) required to retrieve the group key (S-PSK). At step 520 the client application 101 uses the client KDS interface 303 to retrieve the group key (S-PSK) using the S-PSK identity hint. At step 521 the client KDS interface 303 communicates with the KDS 305 to retrieve the requested group key (S-PSK). At step 522 the device group key (S-PSK) is retrieved by the client application 101. At step 523 the client application 101 derives a unique device key (D-PSK) using the group key (S-PSK) and the device unique registration ID (e.g., MAC address, serial number). The derivation function may be, for example, a HMAC-SHA256 algorithm. At step 524 the client application 101 connects using the device registration ID with the server application 151. At step 525 the server application 151 retrieves the group key (S-PSK) using the server KDS interface 310, which at step 526 communicates with the KDS 305 and at step 527 returns the requested group key (S-PSK) to the server application 151. At step 522 the device group key (S-PSK) is retrieved by the client application 101. At step 528, the server application 151 derives the unique device key (D-PSK) using the device registration ID. The client application 101 and server application 151 use the unique device key (D-PSK) for authenticated secure communications.

Referring to FIG. 6 and FIG. 7A, in one exemplary embodiment of the disclosed system and method, a KDS proxy 602 provides authentication and validation of the member device 703 in the DNS domain. The member devices on local area networks (LAN) 125 may connect to a KDS 305 over a wide area network (WAN) through the KDS proxy 602. Because network address translation (NAT) occurs at the LAN/WAN edge, the member device IP address on the LAN is not retrievable by the KDS 305 over the WAN 606. Therefore, a DNS reverse lookup by member device IP address for the member device DNS hostname is not feasible. At step 601 the KDS interfaces 303 and 309 connect the KDS proxy 602. At step 603 the KDS proxy uses the configured DNS servers 321 in the LAN 125 to perform the DNS reverse lookup by member device IP address for the member device DNS hostname 722 and matches the resolved DNS hostname with the member identifier 703 in the API request. At step 605 the KDS proxy 602 establishes a secure connection, for example over a web connection using certificate-based mutual authentication and Hypertext Transfer Protocol Secure (HTTPS), with the KDS 305 to perform the requested API operation on behalf of the member device on the LAN using, for example, Representational State Transfer (REST) APIs. The KDS proxy 602 and KDS 305 may be configured for security using API access tokens and API access secrets for authenticated API requests and permission-based access controls. The KDS proxy 602 may append, at least, the authenticated member identifier 703 and member DNS hostname 722 retrieved from the local DNS server in the proxied API requests to the externally hosted KDS 305.

Referring to FIG. 3B, FIG. 3C, and FIG. 6, in one exemplary embodiment of the disclosed system and method, the on-premises KDS proxy performs the first factor of device authentication for the local member devices. By default, prior to device onboarding, the devices are assigned to the group identifier "Factory Default" and configured with an associated shared or private M-PSK identity hint and M-PSK. After onboarding, the (RTOS) main or (GPOS) onboarding application on the device should create a device unique M-PSK identity hint and M-PSK under the "Registered Members" group for advanced security for subsequent first-factor device authentication (using the KDS interface CreateKey API). During the initial handshake with local member devices, the KDS proxy receives the "device hello" from the KDS interface on the member device with the M-PSK identity hint, and then retrieves the M-PSK with the tenant identifier of the proxy server (device), the group identifier set to "Registered Members" (group type="authenticator"), and the received M-PSK identity hint. If the M-PSK is not found under "Registered Members", the KDS proxy retrieves the M-PSK with the tenant-identifier of the proxy server (device), the group identifier set to "Factory Default" (group type="onboarding"), and the received M-PSK identity hint. The retrieved M-PSKs may be cached locally on the KDS proxy. Alternatively, M-PSKs may be retrieved in advance for the tenant identifier and "Registered Members" group identifier using the KDS interface RetrieveKeys API.

Referring to FIG. 7A, entities and relationships are described. At step 702 a member device 701 is associated with a member identifier 703. At step 721 a member identifier 703 is associated with a member DNS hostname 722 registered with a local DNS server. The member DNS hostname 722 may be mapped to an alias (ALIAS) or canonical name (CNAME) resource record on the DNS server and therefore be different from the member identifier 703. At step 704 one or more member devices 701 are associated as members of one or more group identifiers 705. At step 736 tenant identifiers 735 are associated with one or more group identifiers 705. At step 706 a group identifier 705 is associated with a group type 707 (e.g., shared, private, onboarding, authenticator, anonymous, community, any suitable group type). At step 708, a group identifier 705 is associated with one or more key records 709. At steps 710, 712, 714, 720, 723 and 725 identity hints 711, key templates 713, key instances 715, key creators 724, key statuses 726, and key expirations 721 are respectively associated with key records 709. At steps 716, 718, and 727 key algorithms 717, key sizes 719, and key usages 728 are respectively associated with key templates 713. The key status 726 is managed by the KDS and may be set to ACTIVE, SUSPENDED, EXPIRED, or DELETED on persisted key records 709. The key usage 728 may be set by the key creator 724 to, for example, client authentication, data authentication, data encryption, content (producer or broker) signing (e.g., code file, data file, image file, Java archive (JAR) file, compressed zip/tar format file), broadcast signing, broadcast encryption, multicast signing, multicast encryption, token signing, or token encryption. The key usage 728 may be defined as a bitmask or multi-value data type to grant multiple permissions (for example, to grant data authentication and data encryption permissions). At step 733 a key token 734 is associated with a key record 709, effectively associating the key instance 715 with the key token 734. At step 737 a hash algorithm 738 is associated with the key template 713 for digital signing (for example, with HMAC authentication). At step 739, one or more member domains 740 are associated with one or more group identifiers 705. In an exemplary embodiment of the proposed method, an authenticated member device's 701 request for a key instance 715 (or any key operation) based on the specified group identifier 705 and identity hint 711 may be processed by the KDS and permitted based on a match of the member domain 740 with the domain (i.e., domain name and top-level domain suffix parts) derived from the resource records retrieved by the DNS reverse lookup for the member device DNS hostname 722. For example, for a member device 701 with a member DNS hostname verified by the DNS server as "my-hostname.my-domain.com", a member domain of "my-domain.com" associated with the group identifier 705 qualifies the member device 701 for associated key records 709 based on the specified identity hint 711 for the specified group identifier 705. At step 741, one or more application identifiers 742, represented as a hyphenated alphanumeric character string or a universally unique identifier (UUID), may be associated with the group identifier 705. The UUID may be specified as the MAC address, serial number, or IMEI of the member device 701. At step 743 an image name 744 may be associated with the application identifier 742. At step 745 an image hash 746 (e.g., SHA-256) of the application image may be associated with the application identifier 742. In an exemplary embodiment of the proposed method, referring to FIG. 3A and FIG. 5A, an authenticated member device's 701 request for a key instance 715 (or any key operation) based on the specified group identifier 705 and identity hint 711 may be processed by the KDS and permitted based on the application identifier transmitted by the KDS interface (303, 310) in KDS requests (304, 311) matching with the application identifiers associated with the specified group identifier 705 and identity hint 711 on the KDS. This provides a method to deny key requests to unauthorized applications. At step 747, a key nonce 748 may be associated with the key template 713 as a nonce (i.e., a unique, random, or pseudo-random value) for use as, for example, an initialization vector (an input into a cryptographic primitive). The size of the key nonce 748 (e.g., 192, 128, 96, 56 bits) may depend on the cipher type (e.g., block size for a block cipher) or mode of operation of the cipher algorithm (e.g., may be zero or a fixed value for deterministic algorithms). At step 749, a key handle 750 may be associated with the key template 713. The key handle 750 may be used to configure a locality identifier on a local secure element (e.g., TPM handle, NVRAM index, HSM slot) for the application to optionally store the retrieved per-shared key securely on the device. At step 751, a message authentication code (MAC) hash algorithm 752 may be associated with the key template 713. At step 753, a MAC hash prime 754 may be associated with the key template 713. Additional entities, such as for example, the member device manufacturer (e.g., vendor class identifier configured on the DHCP service 172) and model may be associated with the member device, explicitly through the KDS portal or retrieved from external services (e.g., DHCP extended attributes associated with the device MAC address). At step 755, a community identifier 756 may be associated with one or more tenant identifiers 735.

Referring to FIG. 7A, group types 707 provide rules based access controls to regulate access to key records (associated with the group identifier) by KDS member devices. The "private" group type restricts access to the key creator only. The "shared" group type grants access to all members of the group. The "anonymous" group type also grants access to authenticated non-members of the group. The "community" group type grants retrieve access to members of co-tenants within a community (i.e., tenant identifiers associated with a community identifier). For example, the member of tenant A-Corporation may access key records 709 by identity hint 711 associated with a community group identifier 705 (with group type set to "community") of tenant B-Corporation provided tenants A-Corporation and B-Corporation are co-tenants of the referenced community (by community identifier 756) in the key retrieve operation initiated by the member of tenant A-Corporation. The use case of community based key access is of relevance for content signing and supply chain tamper resistance with signature manifests (FIG. 8C) and extended signature manifests (FIG. 8D) wherein the said signature manifests may include the tenant identifier and group identifier in the entry records for transactions between cross-tenant producer, broker, and consumer applications.

Referring to FIG. 7, as an illustrative example a device may be configured as follows:
member device="OT Device"
member identifier="A2Z029" as the local device identifier (LDevID).
member DNS hostname="A2Z029.dba.com". The DNS PTR-record (stored under the IP address reversed, with ".in-addr.arpa" appended at the end for IPV4 or converted into 4-bit sections with ".ip6.arpa" appended at the end for IPV6) pointed to A2Z029.dba.com for the A-record pointed to the assigned IP address. For example, stored as "45.34.23.12.in-addr.arpa" for IPV4 address "12.23.34.45", and as "f.e.d.c.b.a.0.9.8. 7.6.5.4.3.2.1. f.e.d.c.b.a.0.9.8.7.6.5.4.3.2. 1.ipv6. arpa" for IPV6 address "1234:5678:90ab:cdef: 1234:5678: 90ab:cdef". On DNS, CNAME records may be created to assign multiple identities (i.e., aliases) to a member device (e.g., a server grade device may function as a web server, a file server, and a mail server). The ALIAS-record may be created with a short (subset)

name (e.g., dba.com) and the CNAME-record may prefix the short name (e.g., A2Z029.dba.com).

member UUID="dbfdeb0c-19e8-4c26-b1c0-44d22275b591".

Referring to FIG. 7A, the digital signatures generated using the retrieved pre-shared keys for data authentication (for example, content signing, message signing) may use the hash algorithm 738 associated with the key template 713 for the key record 709 associated with the identity hint 711.

Referring to FIG. 7A, a message authentication code generated using the hash algorithm 738 (for example, HMAC-MD5-128 comprising of 16 bytes) may be mapped to a lesser number of bytes (for example, a 2-byte CRC equivalent) using the hash function specified by the MAC hash algorithm 752 and optionally the prime number specified by the MAC hash prime 754.

In yet another exemplary embodiment of the disclosed method, referring to FIG. 7A, on devices using protocols wherein the message frame is restricted in length, such as for example the standard or extended CAN Bus, a digital signature of the message may be generated using the hash algorithm 738 (for example, HMAC-MD5-128), and then the cyclic redundancy check (CRC) checksum field in the CAN message may be replaced with a hash of the generated digital signature of the message using the MAC hash algorithm 752 and MAC hash prime 754 specified in the key template 713. The specified MAC hash algorithm 752 may be implemented on the devices using, for example, the MAC hash prime 754, multiplication, bitwise exclusive OR (XOR), bitwise AND, and left/right bit shifting operators.

In yet another exemplary embodiment of the disclosed method, the KDS 305 uses a configured local Domain Name Server (DNS) 321 to reverse lookup the requestor member device IP address of the member device 701 and retrieve the registered member DNS hostname 722. The retrieved member DNS hostname 722 is then verified with the received member identifier 703 in the API request to authenticate the member device 701, wherein the verification uses a received DNS ALIAS or CNAME record configured on the DNS server to validate the received member identifier 703 (instead of an exact match).

Referring to FIG. 7A and FIG. 3A, in an exemplary embodiment of the disclosed system and method, the key instance 715 is equivalent to an API shared secret and the key token 734 is equivalent to an API shared token in a REST API request authentication mechanism. For application security by design, REST API requests are digitally signed by the client/client application for the server/server application to verify that the API requests were issued by authorized sources and were not tampered in-transit. The API shared secret and the API shared token are used to digitally sign and verify the request URL that comprises of the API method, the API request timestamp, and the API token (a universally unique identifier or UUID). The API service accounts are typically configured manually through a services portal, or automatically generated during service account creation by the service. The associated API shared credentials (i.e., the token and the secret) must be stored securely by the service and application administrators. If the API shared credentials are lost, a new set of credentials must be generated for the server/server applications and synchronized with the associated client applications. The KDS 305 provides an automated and scalable mechanism to distribute and synchronize API shared credentials between applications on authenticated and domain validated member devices.

Referring to FIG. 7A and FIG. 3A, in another exemplary embodiment of the disclosed system and method, the key instance 715 and key token 734 may be generated externally and imported into the KDS 305.

Referring to FIG. 3A, FIG. 5A and FIG. 7A, a scheduled task on the KDS 305 periodically and automatically renews key instances 715 within the time window configured on the KDS 305 before the respective key expirations 721 for PSKs created (and owned) by the KDS administrator as set in the key record 709 key creator 724 field. The key instances 715 for PSKs created (and owned) by applications executing on member devices 701 may be renewed programmatically and automatically through the client KDS interface 303 APIs.

Referring to FIG. 3A, FIG. 5A, and FIG. 6, in one exemplary embodiment of the disclosed system and method, applications 101 and 151 may establish connection-oriented or connection-less secure communications using any transport protocol stack 103 and network protocol stack 104 using the client KDS interface 303, KDS 305 and KDS proxy 602. Specific examples of such standards-based communications protocols may include the Controller Area Network Bus (CAN Bus), Modbus (over TCP/UDP), Highway Addressable Remote Transducer (HART), WirelessHART, and the RS232 serial communications protocol. The key size 719 may be selected to optimize the encrypted message length to reduce latency in real time applications. Based on the message types and maximum frame length permitted in the communications standards, the key size 719 for the optimal message signature length may be selected. The keyed-hash message authentication code (HMAC) may optionally be truncated before sending alongside the message to be authenticated due to message length constraints.

Referring to FIG. 3A, FIG. 5 and FIG. 7A, in one exemplary embodiment of the disclosed system and method, the member device 701 may be registered as a computer object on a directory service 730. At step 732, from the KDS portal 317, a member universally unique identifier (UUID) 731 (representing for example the device unique MAC address, serial number, or mobile device IMEI) may be configured for the member device 701. At step 729, from the KDS portal 317, the tenant identifier 735 may be configured with directory service 730, such as for example a Microsoft Active Directory. The member device 701 may be enrolled into the directory services 730 managed domain and assigned a universally unique identifier (UUID) by the directory service 730. The member UUID 731 may be configured accordingly from the KDS portal 317 to match with the retrieved UUID of the associated computer object on the directory service 730 for member device validation by the KDS 305. The group identifiers 706 for the member device 701 may be retrieved from groups and group memberships configured on the directory service 730 during KDS 305 configuration from the KDS portal 317.

Referring to FIG. 3A and FIG. 5A, the client KDS interface 303 provides a simplified set of APIs as a library for static or dynamic linking by polyglot applications (e.g., C, C++, C #/.Net, Java). The client KDS interface 303 includes built-in functions for KDS session management, KDS request and response handling, and an operating system (OS) abstraction layer (OSAL) for integration with the device platform. The OSAL provides OS agnostic interfaces to the client KDS interface 303 for multi-platform portability. The OS specific hooks for memory, filesystem, network, timer, mutex, and thread management may be implemented as underlying plugins (i.e., operators) to the OSAL based on the target OS platform (e.g., Windows, Linus, FreeRTOS, Azure RTOS, VxWorks, QNX, uCOS).

Referring to FIG. 3A, FIG. 5A, and FIG. 7A, in another exemplary embodiment of the disclosed system and method, a server application operating as a service to a plurality of client (or initiator) applications may use the KDS 305 to configure a key instance 715 with an identity hint 711 for content signing purposes. The server application may sign the content using a PSK and send the associated PSK identity hint and digital signature along with (and separately from) the digitally signed content using, for example, a key-hashed message authentication code (HMAC). The client (or initiator) application may retrieve the key instance 715 from the KDS 305 using the identity hint 711, regenerate the digital signature for the received content, and cross-verify the computed digital signature with the digital signature received along with the content. In yet another exemplary embodiment of the disclosed system and method, the content signing mechanism may be extended to include multiple signatories for supply chain tamper resistance using a chain of PSKs, wherein a configuration file comprising of a list of PSK identity hints and digital signatures may be sent, over a secure channel, along with (and separately from) the digitally signed content for regeneration and cross-verification. The client (or initiator) application may retrieve key instances 715 from the KDS 305 using the identity hints 711, regenerate the digital signatures for the received content, and cross-verify the computed digital signatures with the digital signatures received along with the content.

The ability of the KDS to manage and distribute purpose-built PSKs to authenticated member devices for content signing enables use of separate PSKs for client authentication, secure communications, and content signing. The applications executing on member devices can provide digital attestation of data (e.g., indicators of runtime operational integrity, loaded configuration, telemetry measurements) to track and trace data objects to the data source. The receivers can tag the cross-verified data object to the authenticated data source for data provenance.

The resource constraints on OT/IIoT/IoT device platforms (e.g., memory, storage, file system on flash) pose major challenges for use of cryptography and security protocol stacks. In addition, non-volatile electrically erasable programmable read-only memory (EEPROM) imposes limitations on the number of permitted (lifetime) write operations. Further, the flash-based file systems may be read-only (not writable, or writable overlays that are volatile over a power cycle) and therefore updating PKI based keys and certificates may not be possible. The common approach of storing long-lived (no expiry) private keys, seed phrases (nonces), and certificates in NVRAM poses security risks. In contrast, the PSKs in the disclosed system need not be persisted on the device and may be dynamically retrieved from the KDS by the applications executing on the device at runtime (e.g., at application launch) and erased from memory at application termination. In terms of memory usage, the length of X.509 certificates may vary based on the size of the parameters and keys and are typically in the order of kilobytes (e.g., 1 KB, 2 KB, 5 KB), whereas symmetric key sizes are typically in the order of bytes (e.g., 56, 80, 112, 128, 192, 256 bits).

Referring to FIG. 5A, in one exemplary embodiment of the disclosed system and method, the PSKs 501 and 506 for data authentication and data encryption may be used by a real time and mission critical client application 101 and server application 151 to secure selective sections of messages 504 in application (user) space. This provides application developers with a simplified method that is agnostic to the underlying transport and network protocol stacks in user or kernel space. For real-time and mission critical applications that require low latency, messaging integrity and confidentiality, partial payload protection is an effective solution. Some examples include operational technology (OT) applications in (a) industrial control systems that must comply with the Generic Object-Oriented Substation Event (GOOSE) and IEC-61850 (International Electrotechnical Commission) and NERC-CIP (North American Electric Reliability Corporation Critical Infrastructure Protection) standards; (b) applications in transportation systems (e.g., smart vehicles); (c) applications in aviation systems (e.g., commercial and military aircrafts, unmanned aerial vehicles or drones); (d) applications in space systems (e.g., satellites and spacecrafts); and (e) applications in healthcare systems (e.g., medical equipment, bedside equipment, surgical equipment, nurse station equipment, on-patient devices, and palliative or hospice care equipment). In integrated systems inter-system messaging between the components (e.g., electronic control units, telemetry control units, on-board diagnostics units, navigation systems, display units, multi-service IoT edge gateways, sensors, actuators, controllers) must adhere to low latency requirements, security, and safety standards.

Referring to FIG. 5A and FIG. 7A, in one exemplary embodiment of the disclosed system and method, the PSKs 501 and 506 may be used for data encryption wherein selective sections (or embedded component objects) within a document to redact/obfuscate content based on the member device identifier 703. This capability allows restricted documents retrieved by authenticated and authorized users based on roles, permissions, and privileges to be rendered by applications (e.g., word processing software, PDF readers, slideware software) with selective content redacted/obfuscated based on the member device identifier 703. The application generating the secure document uses a PSK to encrypt selective sections of the document and embeds the associated PSK identity hint 711 within the section as metadata. Different sections within the document may be encrypted with different PSKs using the respective PSK identity hints 711. The application rendering the secure document uses the embedded PSK identity hints to retrieve the associated PSKs and decrypt the respective sections. In yet another exemplary embodiment of the disclosed system and method, the rendering application may be a web browser, thereby enabling web applications and services to deliver dynamically generated secure web content (web pages) to authenticated and authorized users with redacted/obfuscated content based on the member device identifier 703.

Referring to FIG. 5A and FIG. 7A, in one exemplary embodiment of the disclosed system and method, blockchain applications may retrieve PSKs from the KDS 305 with device authentication and device domain validation for (a) secure communications without requiring PKI issued certificate-based device and/or client authentication, and (b) digital signing of transactions without requiring PKI issued certificates and asymmetric keys. The KDS provides scalability with simplified key lifecycle management to blockchain applications. Managing distributed private keys and associated certificates using a centralized PKI system (as the root of trust, or trust anchor) is against the decentralized first principle of blockchain philosophy. The limitations of compute power, memory, protected local storage for persisted keys, and security protocol stacks on resource constrained devices make the generation and use of asymmetric keys with high entropy, and certificate chain validation at runtime a difficult and challenging task. The use of symmetric PSKs with KDS 305 managed key rotation, and scalable and simplified distribution, based on member identifiers 703, tenant identifiers 735, and group identifiers 705 defines and formulates a software defined network (SDN) for blockchain nodes.

Referring to FIG. 8A and FIG. 5A, at step 302 the client application 101 uses client KDS interface 303 to retrieve a pre-shared key (S-PSK) 501 from the KDS 305. At step 503, the client application 101 uses the retrieved S-PSK 501 to selectively encrypt partial sections of messages 801 transmitted over the local or wide area network (LAN/WAN) 125. At step 309, the server application 151 uses the Server KDS interface 310 to retrieve the pre-shared key (S-PSK) 506 from the KDS 305. At step 508 the server application 151 uses the S-PSK 506 to selectively decrypt the selectively encrypted partial sections of messages 801 received over the local or wide area network (LAN/WAN) 125.

Referring to FIG. 8B and FIG. 5A, at step 804 the producer application 802 on device 899 uses client KDS interface 303 to create pre-shared keys (PSKs) 805 on the KDS 305. At step 806, the producer application 802 uses the created and retrieved PSKs 805 to selectively encrypt embedded objects and tag each encrypted embedded object with the respective pre-shared identity hint within the document 803. At step 808, the consumer application 807 on device 898 uses the server KDS interface 310 to retrieve the pre-shared keys (PSKs) 809 for the pre-shared key identity hints tagged with the respective encrypted embedded objects from the KDS 305, on member devices authenticated and validated by the KDS. At step 810 the server application 151 uses the retrieved PSKs 809 to selectively decrypt the encrypted embedded objects within the document. At block 892, the structure of the document is illustrated with examples of encrypted embedded objects and the associated PSK identity hint tagged to each of the respective encrypted object within the secured document.

Referring to FIG. 8C and FIG. 5A at step 812 the producer application 811 on device 897 receives content 813. At step 814 the producer application 811 uses client KDS interface 303 to create a pre-shared key (PSK) 815 on the KDS 305 for content signing. At step 816 the producer application 811 uses the retrieved PSK 815 to digitally sign the received content 813 and generate a digitally signed content 817. At step 818 the producer application 811 generates a signature manifest with the tenant identifier, group identifier, digital signature for the digitally signed content 817, the associated PSK identity hint for the PSK 815, and the named object 820 for the digitally signed content 817. At step 829 the consumer application 823 on device 896 receives the digitally signed content 817. At step 824 the consumer application 823 receives the associated signature manifest 819. At step 825 the consumer application 823 uses client KDS interface 303 to retrieve the pre-shared key (PSK) 826 from KDS 305 for the tenant identifier, group identifier, and PSK identity hint 822 in the received signature manifest 819. The consumer application 823 regenerates a digital signature for the received digitally signed content 817 using the retrieved PSK 826 and compares for match with the digital signature 821a in the received signature manifest 819.

Referring to FIG. 8D and FIG. 5A at step 812 the broker application 832 on device 895 receives content 813. At step 812 the broker application 832 uses client KDS interface 303 to create a pre-shared key (PSK) 836 on the KDS 305 for content signing. At step 816 the broker application 832 uses the retrieved PSK 836 to digitally sign the received digitally signed content 828 and generate an extended digitally signed content 830. At step 833 the broker application 832 receives a signature manifest 819, and at step 834 generates an extended signature manifest with the tenant identifier, group identifier, additional digital signature for the extended digitally signed content 830, the additional associated PSK identity hint for the PSK 836, and the named object 820 for the extended digitally signed content 830. At step 835 the consumer application 823 on device 896 receives the extended digitally signed content 830. At step 824 the consumer application 823 receives the associated extended signature manifest 819. At step 825 the consumer application 823 uses client KDS interface 303 to retrieve the pre-shared keys (PSKs) 837 from KDS 305 for the tenant identifiers, group identifiers, and PSK identity hints 822 in the received extended signature manifest 831. The consumer application 823 regenerates the digital signatures for the received extended digitally signed content 830 using the retrieved PSKs 837 and compares for match with the digital signatures 821b in the received extended signature manifest 831.

In one exemplary embodiment of the proposed system and method, content signing for supply chain tamper resistance may be implemented as a set of utilities (or tools) comprising of a signing utility (kdssign) and a verifier utility (kdsverify) on a GPOS platform (e.g., Windows, Linux, or Mac OS) that may be executed on registered KDS member devices.

1) kdssign-conf {KDS device configuration file}-tenant {tenant identifier}-group {group identifier}-hint {key identity hint} [-extend]-manifest {signature manifest file}-file {content file to be signed}
   (a) Retrieves the signing key using the signer specified tenant identifier, group identifier, and key identity hint from the KDS, (b) Generates a hash of the content to be signed, and a signature based on the hash algorithm specified in the retrieved key record, and (c) Creates a new signature manifest file (JSON) with the tenant identifier, group identifier, key identity hint, and content signature as an entry record.
   extend: Adds (appends) an entry record to the specified signature manifest file (JSON).
2) kdsverify-conf {KDS device configuration file}-community {community identifier}-manifest {signature manifest file}-file {content file to be verified]
   For each entry record in the signature manifest file, (a) Retrieves the signing key using verifier specified community identifier, and the manifest specified tenant identifier, group identifier, and key identity hint from the KDS, (b) Generates a hash of the content to be verified, and a signature based on the hash algorithm specified in the retrieved key record, and (c) Compares the generated signature with the signature in the signature manifest file for the key identity hint.

In yet another exemplary embodiment of the proposed method, referring to FIG. 8C and FIG. 8D, two-factor split channel verification of device updates (e.g., firmware, software, configuration files) may be performed, wherein the steps comprise of downloading, by a update program executing on the device, a device update (package or module) from a configured update server (e.g., a web service hosted on-premises or in the cloud), verifying by the update program the digital code signing of the downloaded device update by the content publisher using a configured asymmetric public key or signing certificate as the first factor of verification, and verifying a signature manifest (or extended signature manifest) file provided along with the device update using the extended KDS interface VerifySignature- Manifest API as the second factor of verification. The signature manifest or extended signature manifest file may be generated for the device update by the provider or broker applications respectively for content signing and supply chain tamper resistance using the extended KDS interface GenerateSignatureManifest API. The workflow for the signature manifest based second factor protection may operate independent of (or concurrently with) the continuous integration (CI) and content distribution (CD) workflow for the first factor of verification, with separation of duties based permissions to mitigate insider threats and advanced persistent supply chain exploits by sophisticated attackers. In one embodiment of the proposed method, the signature manifest or extended signature manifest file for the device update package may be generated by the providers or brokers using the kdssign signing utility, and the signature manifest or extended signature manifest file verification may be performed by the consumers using the kdsverify verifier utility.

In yet another exemplary embodiment of the proposed method, the KDS interface may retrieve (automatically discover) the primary and secondary KDS/KDS proxy URLs, the tenant identifier, the group identifier, and identity hints associated with a production wireless access point (WAP) for secure access based on network characteristics using custom attributes configured on a DHCP server, or a DNS server, associated with the member device LAN. An original equipment manufacturer (OEM) may pre-configure, embedded within the production application image on real-time operating system (RTOS) platforms or through a factory default configuration file on general purpose operating system (GPOS) platforms, the KDS member pre-shared key (M-PSK) and M-PSK identity hint required for device authentication on the KDS, and the guest WAP service set identifier (SSIDs) and associated guest (Wi-Fi Protected Access) WPA2 PSKs for the manufacturing and deployment network environments. The WAP in the production network environment may be configured for multi-SSID mode of operation, wherein a guest WAP SSID (GWAP-SSID) and a secure internal WAP SSID (IWAP-SSID) may be configured for multiple wireless networks with different security polices for controlled access. On the member device, a supplicant program (e.g., Wi-Fi supplicant, Wi-Fi supplicant function implemented within a production application or system firmware) may connect to the production network and authenticate initially using the GWAP-SSID and associated guest WAP pre-shared key (GWAP-PSK), then retrieve a production WAP specific secure internal WAP pre-shared key (IWAP-PSK) for the IWAP-SSID from the discovered KDS/KDS proxy URL, tenant identifier, WAP group identifier, and IWAP-PSK identity hint, and finally initiate (trigger) a switchover to secure WPA2-PSK or WPA2-EAP-PSK based authentication with the production WAP using the retrieved IWAP-PSK. On the KDS, a group may be configured that comprises of the production WAP device and member devices or member domain with the associated IWAP-PSK and IWAP-PSK identity hint.

Referring to FIG. 3A, the KDS administrator portal 317 may be configured for single-sign-on (SSO) and federated identity based authentication using authentication methods (e.g., OpenID Connect or OIDC, Security Assertion Markup Language or SAML, OAuth) with an identity provider (IdP) to authenticate portal users, and grant permissions based on group membership to create IWAP-PSKs for the member domains 740 associated with a group identifier 705. In distributed deployment models, wherein hundreds/thousands of devices are scattered across geo-graphically distributed locations on locally administered field networks with a local WAP, remote field operators require a simple and scalable method to configure IWAP-PSKs on the KDS.

Referring to FIG. 8E, at step 860 a supplicant program 850 executing on a device 893 uses factory configured attributes 857 that includes a guest WAP SSID (GWAP-SSID) 851 and a guest WAP pre-shared key (GWAP-PSK) 852 to authenticate with a WAP 894 in the production network to access the guest wireless network. At step 861, the supplicant program 850 uses the client KDS interface 303, with a tenant identifier, group identifier, and internal WAP pre-shared key (IWAP-PSK) identify hint, discovered at step 858 using network characteristics based on custom DHCP attributes 859 configured on a DHCP (or DNS) server, or retrieved from a configuration file on the device, and the member identifier to at step 304 authenticate with the KDS 305 and retrieve an internal WAP pre-shared key (IWAP-PSK) 862. At step 863 the supplicant program 850 uses the retrieved IWAP-PSK 862 and internal WAP SSID (IWAP SSID) pre-configured within the supplicant program image or retrieved from a configuration file on the device to authenticate with the WAP 894 in the production network to access the secure wireless network.

Referring to FIG. 9, steps 902, 904, 906, 908, 910, and 912 indicate the ordered sequence of actions performed at blocks 901, 903, 905, 907, 909, 911, and 913 respectively. At block 901 an algorithm is selected to build a machine learning model using a multi-dimensional feature matrix with device intelligence as training datasets. At block 903 a multi-dimensional feature matrix is built that includes device tenancy, group memberships, key type and usage profile, volume of key usage, rate of key rotation, and application identifiers (e.g., file name, file hash). At block 905 the feature matrix is extended with imported application-based indicators of compromise from external forensics-based threat intelligence that includes content integrity measurement and vulnerability assessments comprising of scores categorized by, for example, application reputation, static/dynamic analysis, runtime introspection analysis, domain generation algorithm (DGA) analysis, obfuscation level, unpacking level, IP address and domain reputation, geo-location, autonomous system numbers (ASNs), and IP address age. At block 907 the feature matrix is further extended by retrieving device properties (e.g., model, manufacturer, identifiers, attributes, update history) from device management systems, and network management services (e.g., Domain Name System (DNS), Dynamic Host Configuration Protocol (DHCP) servers). At block 909 the feature matrix is further extended by retrieving flow records for connection history of inter-device communications from network activity monitoring systems. At block 911 the device risk score may be predicted using the multi-dimensional feature matrix for linear regression. At block 913 a security event may be classified as a true positive, false positive, true negative, or false negative using an unsupervised model, multi-layer deep learning network networks, and the multi-dimensional feature matrix for logistic regression.

The tenant identifiers and group identifiers for pre-shared keys designated for specific purposes, such as for document security or content signing, may be defined for extended scope (e.g., any tenant, any group). The key records on the source KDS may be configured as exportable, and importable on a destination KDS using password-protected keys, encryption, and key encapsulation for secure exchange.

In yet another exemplary embodiment of the proposed method, the pre-shared key retrieved from the KDS may be used to generate a derived device key in association with a set of local device unique identifiers. One use case may be to register the device with a cloud based device provisioning service. Yet another use case may be to sign or encrypt messages and/or authentication tokens to cloud based hub services. The cloud based device management platforms and services require an on-device local secure element (e.g., TPM, HSM, SIM) to protect pre-shared group keys and derived device keys. However, a local secure element may not be available on legacy, brownfield, or greenfield devices. Therein the proposed innovation protects the pre-shared group keys and derived device keys by not requiring these keys to be stored locally and instead providing for dynamic on-demand retrieval of the pre-shared group key and just-in-time generation of the derived device key based on local device identifiers (e.g., a device registration identifier configured with the cloud service). Referring to FIG. 5A, the client application 101 and server application 151 may use a publish-subscribe messaging protocol (e.g., Message Queue Telemetry Protocol or MQTT, Advanced Message Queuing Protocol or AMQP) that may require use of such derived device keys from pre-shared group keys and unique device registration identifiers on devices wherein there is no local secure element. Representative cloud services, for example, may be Microsoft Azure Device Provisioning Service (DPS) and IoT Hub, Amazon Web Services, or Google Cloud device provisioning and hub services.

In yet another exemplary embodiment of the proposed method, the secure shell (SSH) protocol may be enhanced to use a pre-shared key (PSK) for client authentication. Today, a SSH client may use either a password, a keypair (e.g., RSA/DSA private-public keys), or a X.509 certificate for data encryption/authentication with a remote SSH server. Accordingly, the SSH servers may be configured with user accounts, authorized keys, or trusted (root, intermediate, issuer) certificates for all the remote users or device clients. Storing and managing authorized keys on distributed SSH servers is cumbersome and costly. In accordance with the proposed method, the SSH client may dynamically create a PSK on the KDS for client authentication and send the PSK identity hint to the SSH server to initiate a PSK based authentication. The SSH server may retrieve the PSK from the KDS using the received PSK identity hint. A plurality of PSKs for client authentication may be retrieved from the KDS just-in-time by the SSH server and not persisted/stored locally on the server. The SSH client may create a PSK for one-time use or renew the PSK (key rotation) based on the configured key duration for security purposes. Accordingly, a SSH server may be configured to store only the authorized PSK identity hints and retrieve associated PSKs from the KDS just-in-time during connection establishment and optionally cache the retrieved PSKs locally in memory until key expiration. This approach eliminates cumbersome and costly SSH server management, key pair generation on remote client devices, transfer of the public keys to the SSH servers, and automates key rotation with cryptographic agility orchestrated through the KDS. Today, the RSA private keys are typically stored unprotected on the SSH client devices in the absence of a local secure element. The SSH client may be configured to retrieve the PSK dynamically from the KDS and not store the PSK locally unprotected on a device in the absence of a local secure element.

The authorization codes issued to legitimate OAuth 2.0 requestors (i.e., client applications) are vulnerable to interception attacks by co-resident malicious applications. RFC 3676 describes a technique to mitigate against interception threats, based on an exploit of inter-application communication within the client's operating system, using a proof key for code exchange (PKCE). In yet another exemplary embodiment of the proposed method, a requestor may send a pre-shared key identity hint in the secure authorization request (e.g., over a TLS session) to the authorization server and receive an encrypted access token from the authorization server during a subsequent authorization grant request, wherein the authorization server retrieves the pre-shared key associated with the received pre-shared key identity hint to perform the said encryption. The received pre-shared identity hint may further be included in the access token by the authorization server, for access token signing by the requestor using the associated pre-shared key in requests to a service provider, wherein the service provider retrieves the pre-shared key associated with the pre-shared key identity hint in the received access token to perform token verification.

In yet another exemplary embodiment of the proposed method additional attributes may be discovered for an authenticated member device, wherein the system comprises of a mobile application (a purpose-built device label scanner) on a mobile device, a device discovery service (DDS), a DHCP service, an OEM service, a KDS, and a member device with a device unique label. A field operator may, pre or post onboarding of the member device onto the production (operations) network, use the mobile application on the mobile device to scan the device label comprising of, one or more of, a printed MAC address, a printed serial number (S/N), one or more printed bar codes, and a printed quick response (QR) code. The mobile application may send one or more of the scan codes to the DDS or DHCP service. The DDS or DHCP service may receive, from the OEM service, through an outbound query or an inbound notification, device information corresponding to the scan codes. The member device may send key requests to the KDS. The KDS may query the DDS for device information based on the member UUID (e.g., MAC address or serial number), or query the DHCP service for custom vendor specific options, and persist the retrieved device information for reference in subsequent key requests from the member device. The device information may include the device type, manufacturer identifier, country of manufacture, model, MAC address, serial number, supported network types, supported network protocols, and license owner identifier. The KDS may use the retrieved device information for policy based authorization of the key requests from the member device, by comparing and matching the associated member device tenant identifier with the license owner identifier retrieved from the DDS or DHCP service.

Alternatively, a technician at the factory may scan the device using the mobile application and send one or more of the scan codes to the DDS shared with the licensed device owner/operator prior to device shipment.

The DDS may be hosted on-premises or in the cloud (on the Internet). The DHCP server may be hosted in the same network or in a different subnet with relay agents for forwarding. The mobile application may connect to the DDS or DHCP service over a wired or wireless network. The DDS and DHCP service may connect to a plurality of OEM services.

In one exemplary embodiment, a method is executed for device label scan based zero-touch device onboarding at first-time power cycle including a device onboarder (DOB) mobile application executing on a mobile device, a field technician, field devices, a device directory service (DDS), a key distribution service (KDS), a KDS portal, a KDS application programming interface, a KDS administrator, a pre-configured member pre-shared key (M-PSK) and a M-PSK identity hint associated with the mobile device, a pre-configured API key and API token associated with the mobile device, a pre-configured factory default member pre-shared key (M-PSK) and a M-PSK identity hint associated with the field device, a bootstrap application on the field device, a tenant identifier associated with the mobile and field devices, a device type identifier associated with the field device, a printed device label with device unique immutable initial identifiers on the field device issued by the original equipment manufacturer (OEM), an asset metadata datastore associated with the DDS, a dynamic host configuration protocol (DHCP) server, a DHCP administrator, a domain name system (DNS) server, a DNS administrator, a initial device identifier issued by the OEM mapped in DNS to a initial device IP address, a local device identifier issued by the device end user mapped in DNS to a local device IP address, a vendor class identifier associated with a device type, and a tenant identifier associated with a tenant network domain, the method comprising:

- importing, by the KDS administrator, device label templates for the device types associated with the field devices; and
- synchronizing, by the field technician on the mobile device, the device label templates and device types for the tenant identifier; and
- scanning printed device labels on a field device, by the field technician using the mobile device, with a selected label template for the device type and generating a scan report; and
- inspecting the scan report, by the field technician on the mobile device, and updating the scan report with extended device information; and
- uploading the updated scan report, by the field technician, from the mobile device to the DDS; and
- storing the received scan report, by the DDS, in associated asset metadata datastore; and
- querying, by the DDS from the DHCP server, vendor specific device information for the vendor class identifier associated with the device type of the field device and storing in the asset metadata datastore; and
- configuring the field device, automatically by the DDS, as a member device on KDS with the associated device information in the asset metadata datastore; and
- creating, by the DHCP server, address (A) and pointer (PTR) records on the DNS server for the initial device identifier; and
- configuring, by the DNS administrator on the DNS server, address (A) and pointer (PTR) records for the local device identifier, and a canonical name (CNAME) record to map the local device identifier to the initial device identifier; and
- registering the field device with the KDS, on first-time power cycle of the field device, by the bootstrap application on the device, with field device two-factor authentication using the initial device identifier and factory default member pre-shared key, and registering the field device with a member unique pre-shared key using the KDS application programming interface for subsequent field device two-factor authentication.

The approach additionally includes methods wherein:

The device label template comprises of at least a location ordinal, a prefix, and a regular expression for each device identifier on the printed device label.

The scanning methods include optical character recognition (OCR) for text-based device identifiers, bar code scanning, and QR code scanning.

Inspecting the scan report includes manually configuring extended device information comprising of at least a device type, tenant identifier, and network domain for the field device.

The scan report includes at least the MAC address, serial number, model, manufacture location, device geolocation, and the scanned image of the printed device label on the field device.

The DHCP query based on the vendor class identifier for vendor specific information may include the manufacturer identification, country of manufacture, model, network types, network protocols, and license owner information associated with the field device type.

The creation of address (A) and pointer (PTR) records on the DNS server for the initial device identifier may be performed manually by the DHCP server administrator, or dynamically using the dynamic DNS (DDNS) protocol to interface with the DNS server.

The zero-touch device onboarding at first-time power cycle is achieved with field device two-factor authentication using the pre-configured factory default member pre-shared key (M-PSK), M-PSK identity hint, and the member initial identifier, where the member initial identifier matches with the pre-configured DNS hostname based on the A and CNAME records.

The device onboarding mobile application (DOB) performs two-factor user authentication of the field technician in the tenant domain.

The device onboarding mobile application (DOB) performs two-factor device authentication in the tenant domain.

The device onboarding mobile application (DOB) uses authenticated REST APIs with the API key and API token to communicate with the device directory service (DDS).

The API key and API token may be pre-configured for the device onboarding mobile application (DOB) on the mobile device.

The API key and API token may be dynamically retrieved by the device onboarding mobile application (DOB) from the KDS using the KDS application programming interface and device two-factor authentication.

The device onboarding mobile application (DOB) on the mobile device may generate device label templates for printed device labels based on the scanned label image and artificial intelligence (AI) based on inference algorithms for the ordinals, prefixes, and regular expressions.

The QR code may be a manufacturer configured URL for the device type that may be included as extended device information in the scan report for upstream processing at the DDS.

In the disclosed system and method, zero touch device onboarding is performed at first-time power cycle of a device in operational environments with device two-factor authentication to configure and manage the lifecycle of device and application-level quantum-safe keys for secure communications with client authentication, data authentication, and data encryption over secure and insecure transport protocols.

In one exemplary embodiment of the proposed method, a Device Onboarder (DOB), a mobile application, executing on a mobile device (such as, for example, an Android or iOS smartphone or tablet) uses label templates to scan and process text, bar codes, and QR codes to identify device unique immutable initial identifiers on printed device labels issued by the original equipment manufacturer (OEM), discover devices, harvest, and store device information as asset metadata in the DDS. The mobile device must be configured on the KDS as a member device by IMEI and ICCID required in the device hello for two-factor authentication by the KDS. The DOB signs-in with user two-factor authentication (for example, using the Azure AD B2C single sign on (SSO) user flow for tenant based on user policy and first-time enrollment ceremony). The DOB communicates securely with the DDS, executing on the KDS, over authenticated REST APIs using an API key (a.k.a. API secret) and API token to receive device types and send device scan information. The key record for each mobile device must be configured on KDS under a "Device Label Scanners" device group (private group type) with a member unique identity hint. The API key and API token may be manually configured on the DOB, for the mobile device under the "Device Label Scanners" device group. The DOB may authenticate with device two-factor authentication using KDSI APIs (with M-PSK and KDS authentication) and dynamically retrieve the API key and API token for the member unique identity hint manually configured on the DOB, for mobile device under the "Device Label Scanners" device group.

Label templates describe how specific identifiers appear on the printed device label. The template files (e.g., JSON) are uploaded on the KDS portal by the service administrator/operator. Example of label templates are:

[Identifier=MAC Address] MAC: [text | bar code | QR code]

[Identifier=Serial Number] S/N: [text | bar code | QR code]

[Identifier=Manufacture Location] Made in . . . : [text]

[Identifier=Model] Model: [text]

[Identifier=Part Number] P/N: [text | bar code | QR code]

The label template JSON sample is illustrated below.

```
"header": {
"Version"; "1.0",
"Name": "SDO Label Template"
}.
    "template": {
        "name": "sdo-template-001",
        "label": [
            {"identifier": Model". "type": "text", "ordinal": "1", "prefix": "Model:", "expression": "alpha-numeric-string"},
            {"identifier": "Manufacture Location", "type": "text", "ordinal": "2", "prefix": "Made in", "expression": "alphanumeric-string"},
            {"identifier": "Part Number", "type": "text", "ordinal": "4", "prefix": "P/N:", "expression": "alphanumeric-string"},
            {"identifier": "Part Number", "type": "barcode", "ordinal": "3", "prefix": "P/N:"}
            {"identifier": "Serial Number","type": "text", "ordinal": "4", "prefix": "S/N:", "expression": "alphanumeric-string"},
            {"identifier": "Serial Number", "type": "qrcode", "ordinal": "4"},
            {"identifier": "MAC Address", "type": "text", "ordinal": "5", "prefix": "MAC:", "expression": "XX:XX:XX:XX:XX:XX"},
            {"identifier": "MAC Address", "type": "text", "ordinal": "5", "prefix": "MAC:", "expression": "XX XX XX XX XX XX"}
        ]
    }
}
```

The scan report JSON sample is illustrated below.

```
}
        "header": {
                "Version": "1.0",
                "Name": "SDO Label Scan Report"
        },
        "report": {
                "template": "sdo-template-001",
                "technician": [
                        {deviceType": "WiFi Access Point"},
                        {localIdentifier": "wap-001"},
                        {tenantIdentifier": "acme-apac"},
                        {"networkDomain": "acme.com"}
                ],
                "scanAnalysis": [
                        {"identifier": "Model", "ordinal": "1", "type": "text", "value": "DT2023"},
                        {"identifier": "Manufacture Location", "ordinal": "2", "type"; "text", "value": "Taiwan"},
                        {"identifier": "Part Number", "ordinal": "3", "type": "barcode", "value": "MXC136501ET-TDGA"},
                        {"identifier": "Serial Number", "ordinal": "4", "type": "qrcode", "value": "TM1769T07437"},
                        {"identifier": "MAC Address", "ordinal": "5" "type": "text", "value": "549CC9271C06"},
                        {"image": "sdo-549CC9271C06-20230527.png"}
                ],
                "scantranscript": {
                        "ocr Values": {
                                "numBlocks": "1",
                                "blocks": [
                                        {
                                                "numLines": "7",
                                                "lines": [
                                                        "Model" DT2023",
                                                        "Manufacture Location: Taiwan",
                                                        "Part Number: MXC135601ET-TDGA",
                                                        "Serial Number: TM1769T07437",
                                                        "MAC Address: 549CC9271C06",
                                                        "Product Name: MX Themostat"
                                                ]
                                        }
                                ]
                        },
```

```
            "qrValues": {
                    "numCodes": "1",
                    "qrcodes": [
                            "Serial Number: TM1769T07437"
                    ]
            },
            "bc Values": {
                    "numCodes": "0",
                    "barcodes": [ ]
            }
        }
    }
}
```

Referring to FIG. 3G, at step 363C, the KDS interface 303 sends a device hello to the KDS 305, wherein the message comprises of at least the configured tenant identifier 735 and the device IMEI as the member identifier 703, all encrypted with the configured M-PSK and the configured M-PSK identity hint 711. At step 365 sends a server challenge to the KDS interface 303 comprising of at least a unique and random nonce value and a hash function specification, wherein the service challenge is encrypted with the M-PSK associated with the received M-PSK identity hint 711. At step 366C the KDS interface 303 generates and sends a device response to the KDS 305 comprising of a hash output corresponding to the nonce and hash function specified in the service challenge 352 and the member device ICCID, wherein the device response is encrypted with the M-PSK. At step 367C the KDS 305 compares and matches the hash received from the KDS interface 303 with the hash computed locally for the nonce and hash function specified in the service challenge 352 and the ICCID (manually pre-configured through the KDS portal for the member device) corresponding to the IMEI in the device hello 363C, to validate the mobile member device.

Figure 1B:
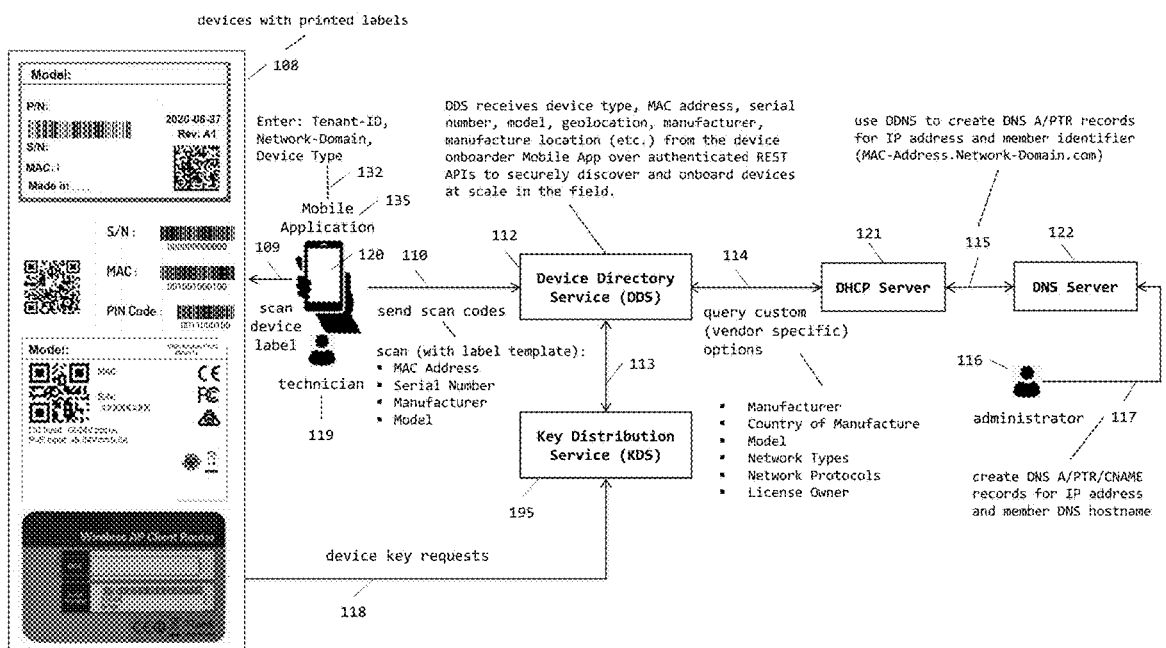
FIG. 1B is a schematic diagram illustrating an example device label scan based device discovery and provisioning system in accordance with various exemplary embodiments of the disclosed system.

Referring to FIG. 1B, FIG. 1A, and FIG. 3A, at step 109 a technician 119 scans a printed device label 108 on a device 108 using a mobile device 120 (e.g., an Android or iOS phone or tablet). Using the mobile application (i.e., DOB) 135, at step 132 the technician 119 manually specifies the tenant identifier, network domain, and device type information for the device under scan 108. At step 110, the device label is scanned and processed using a device label template (for the device 108) selected by the technician 119 in the DOB 135. The scan report, comprising of at least the scanned and processed codes (text, bar codes, QR codes), the geolocation, and the manually configured device information at step 132, is sent to the device directory service (DDS) configured in the DOB 135 settings. The scanning method uses optical character recognition (OCR), bar code analysis, and QR code analysis algorithms. The label template for devices 108 comprise of at least the ordinal (for location), prefix, and regular expression required for each device identifier type (e.g., MAC address, serial number, manufacturer, manufactory location, model, etc.). The technician may inspect the processed scan codes and edit the report to overcome any errors due to damaged or obscured printed device labels or provide missing identifiers on the printed labels. At step 110, the DDS receives device type, MAC address, serial number, model, geolocation, manufacturer, manufacture location (etc.) from the DOB 135 over authenticated REST APIs to securely discover and onboard devices at scale in the field. The DDS 112 interfaces with the KDS 195 using local or remote procedure calls (LPC/RPC) or via REST APIs to access the KDS database to retrieve, for example, the configuration settings and label templates, and store the label scan reports and device (asset) metadata. At step 114, the DDS 121 may query the DHCP server 121 for vendor specific custom options that may be configured on the DHCP server by the tenant, wherein the information may comprise of manufacturer, country of manufacture, model, network types, network protocols, and license ownership information for the device. At step 115, the DHCP server 121 may use dynamic DNS (DDNS) to create DNS A/PTR records for the device IP address and initial member identifier (e.g., in MAC-Address.Network-Domain.com format). At step 117, the administrator 116 of the DNS server 122 creates DNS A/PTR/CNAME records for the device IP address and local member DNS hostname configuration on the DNS, wherein the CNAME points a device local identifier to a device initial identifier. At step 118, applications (e.g., a bootstrap client or a line of business embedded main application) executing on the device 108 may issue key requests to the KDS 195 during device onboarding for device registration and during operations for operational keys.

The initial device identifier issued by the OEM may be mapped in DNS to an initial device IP address (e.g., in a guest wireless network), and the local device identifier issued by the device end user mapped in DNS to a local device IP address (e.g., in a secure wireless or wired network). Further, a device assigned multiple IP addresses is configured accordingly in DNS with multiple A and PTR records. For dynamically assigned IP addresses, the DHCP server uses DDNS to update the DNS A/PTR records for the initial device identifier.

Figure 1C:
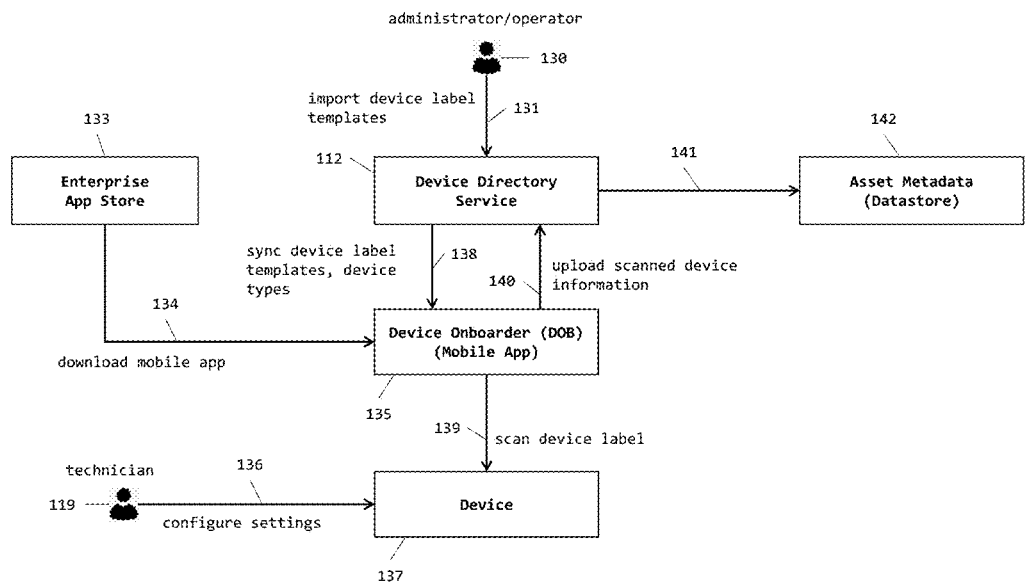
FIG. 1C is a schematic diagram illustrating an example device label scan based device onboarding workflow in accordance with various exemplary embodiments of the disclosed system.

Referring to FIG. 1C, FIG. 1A, and FIG. 3A, at step 131 the tenant administrator or operator 130 imports device label templates (e.g., JSON files) and configures device label templates on the KDS Portal 317 for the device type. At step 134 a technician 119 downloads and installs the mobile application (i.e., DOB) 135 from the designated Enterprise App Store (133). At step 136, the technician 119 configures settings for the DOB 135, wherein the settings may comprise of at least the KDS 195 server addresses, an API key and API token or a key identity hint assigned exclusively to the DOB instance 135 on the mobile device 120 for authenticated REST APIs, and the mobile device 120 IMEI and ICCID. The DDS 112 may execute alongside the KDS 195 on a single server. At step 138, the DOB 135 synchronizes the device label templates and device types by retrieving the tenant metadata configured on the KDS 195 from the DDS 112. At step 139, the technician 119 scans the printed device label on the device 108 applying the appropriate retrieved device label template for the device type. At step 140, the scan report is securely uploaded to the DDS 112 over authenticated REST APIs. At step 141, the device information from the scan report is stored in the asset metadata datastore 142 on the KDS server.

In one exemplary embodiment, a method is executed for symmetric key-based digital signing for content creation, content verification, content inspection, content approval, and gated workflow sequence for supply chain tamper resistance, from a device original equipment manufacturer (OEM) to a device owner (end-user facility), including a content creator at the OEM, a content loader at the end-user facility, a plurality of content approvers at the end-user facility, a policy manager at the end-user facility, a field manager at the end-user facility, a key distribution service (KDS), a KDS portal for users, a KDS application programming interface for applications executing on the user or field devices, a first secure channel for two-factor user and device authentication-based creation and retrieval of a plurality of digital signing symmetric keys, a second secure channel for content distribution, a dynamic host configuration protocol (DHCP) server, a domain name system (DNS) server, a content identifier, a content file associated with the content identifier, a signature manifest file associated with the content file, API key, and API token associated with the content file, a content consumer field device, and a OEM application on the content consumer field device, the method comprising:

creating, by the content creator, a digital signing key to generate a signature for the content file; and generating, by the content creator, the signature manifest file containing a digital signing for the content file; and sending, by the content creator to device owners; the content file and the generated signature manifest file; and verifying, by the content loader at end-user facility (device owner), the signature for the received content file, creating a digital signing key to generate a second signature for the content file, and extending the received signature manifest file with the second signature; and sending, by the content loader, a notification to a first content approver at the end-user facility (device owner); and inspecting, by the notified content approver at the end-user facility (device owner), the content file using a plurality of external third-party content inspection methods, creating a digital signing key to generate a third signature for the content file, and extending the received signature manifest file with the third signature; and sending, by the first content approver, a notification to a next content approver at the end-user facility (device owner), for further inspecting; and sending, by the final content approver, a notification to a policy manager at the end-user facility (device owner), to associate the content file with update policies, device types, and device groups; and sending, by the policy manager, a notification to a field manager at the end-user facility (device owner), to publish the inspected and approved content file and extended signature manifest file and complete the managed content distribution workflow; and querying, by the OEM application on the consumer field device, the KDS to check for content update and retrieving the download URL/URIs for a content file and extended signature file associated with the content identifier; and downloading, by the OEM application on the consumer field device, from the DDS the content file and extended signature manifest file from the retrieved URL/URIs; and verifying, by the OEM application on the consumer field device, the content file by retrieving the digital signing key records from the KDS for the tenant identifiers, group identifiers, and key identity hints in the extended signature manifest file, computing hashes and generating signatures for the content file based on the retrieved key record specifications, and matching the computed signatures with the corresponding signatures in the extended signature manifest file; and installing, by the OEM application on the consumer field device, the content file using OEM specific update methods; and notifying, by the OEM application on the consumer field device, the KDS of the update status on the device for state synchronization with the DDS associated with the KDS.

The approach additionally includes methods wherein:

The content file may be, but is not limited to, a software update, configuration update, or an operating system (OS) update.

The signing key for the digital signing is a symmetric key created and/or retrieved by a KDS portal user with two-factor authentication, further wherein the key operation using a tenant identifier, a group identifier and a key identity hint is performed using a KDS local procedure call (LPC), a remote procedure call (RPC), or an authenticated REST API.

The signing key for the digital signing is a symmetric key created and/or retrieved by an application on a registered member device of the KDS with two-factor device authentication, and further wherein the key operation using a tenant identifier, a group identifier and a key identity hint is performed using the KDS application programming interface.

The digital signing keys are created and/or retrieved by the KDS portal users and applications on member devices over the first secure channel (e.g., a HTTPS, or TLS session).

The content file is downloaded from the retrieved URL or URI by the OEM application on the consumer field device over the second secure channel (e.g., a HTTPS, or TLS session).

The content file is inspected using external third-party content inspection methods that include, but are not limited to, static analysis, dynamic analysis, sandboxing, anomaly detection, and reputation lists based on the content approver's security profile and threat model assessments.

The content loader configures on the KDS portal the received content and signature manifest files along with at least a content identifier (universally unique identifier), content timestamp, content version, content type, and content description.

The update policy configured by the policy manager may include at least a publish-on (not before) date and time, days of the week, and from/to time of day to schedule content download.

The OEM application on the field device uses the KDS application programming interface (APIs) to query for updates, retrieve download URL/URIs, verify the retrieved signature manifest file, and notify update status to the KDS for state synchronization.

The OEM application on the device installs the retrieved content file using OEM specific update methods that include, but are not limited to, streaming the HTTPS download to a flash memory partition on the device without buffering, or storing on a file system on a flash data partition.

Verifying the content file, by the content loaders, content approvers, and OEM applications on the content consumer field devices comprises of retrieving the digital signing key records from the KDS for the tenant identifiers, group identifiers, and key identity hints in the associated extended signature manifest file, computing the hash and signature for the content file based on the key record specification for each of the digital signing keys, and comparing the computed signatures for the content file with the corresponding signatures in the extended signature manifest file.

Each digital signer, at the OEM and end-user facility, of the content file may use a different key algorithm and key size for the digital signing key to extend the signature manifest file.

Retrieval of the content file, using the retrieved URL/ URIs, by the OEM application on the consumer field device over the second secure channel, requires use of the API key and API token uniquely associated with the content file retrieved over the first secure channel.

In the disclosed system and method, the technique uses a symmetric key based multi-party content signing by the producer and one or more brokers and multi-person digital signing. The digital signing (symmetric) keys are retrieved out-of-band over a secure channel (in split mode, wherein the keys are not transmitted along-side signed content). The technique uses a split mode that comprises of a first secure channel for authentication-based creation and retrieval of a plurality of digital signing (symmetric) keys, and a second secure channel for content distribution (e.g., content file, signature manifest file). The technique further uses device two-factor authentication for content retrieval (without requiring PKI or device certificates) and gated workflow sequence based multi-part content inspection, notification-based approval, and notification-based publishing with role-based separation of duties and multi-person signing rule (with at least 4-person digital signing recommended). The content approval is content inspection-based (and not merely based on the user's role and privileges). The external third-party content inspection method (e.g., static analysis, dynamic analysis, sandboxing, anomaly detection, reputation lists) is based on the approver's security profile and threat model assessments. The authorized download URL/ URIs are retrieved by the OEM application with device two-factor authentication from the KDS (i.e., not embedded at factory in the OEM's application) and may be hosted in the controlled environment of the device owner/operator.

In one exemplary embodiment of the proposed method, a content distribution service (CDS) executes on the KDS server, as a companion service alongside the KDS. On receiving a Query Update device request, the CDS returns UPDATE-PENDING when the latest associated content timestamp/version is higher than the current content timestamp/version for member device. On receiving a Retrieve-Update device request, the CDS sends the download URL/ URIs for the published content (with API secret and API token) for the updater application on the device to initiate an authenticated REST API based download over HTTPS to retrieve the content file and extended signature manifest, verify the signatures, and apply OEM specific update methods. The CDS sets the update status for the member device to "−1: Retrieved" in the KDS database. On receiving a NotifyUpdateStatus device request, the CDS sets the update status for the member device (0: Complete, non-zero-integer: Error (Code)) in the KDS database.

The operations (e.g., create, retrieve) on pre-shared keys (i.e., key instances 715) may be performed by authorized applications or utilities executing on authenticated member devices or by authenticated KDS portal (317) users (318), with two-factor device or user authentication in the tenant domain respectively. For authorized applications (e.g., line of business applications or utilities) executing on authenticated member devices, the devices must be direct members of the device group associated with the key record (709) or be members of trusted groups configured through the KDS portal (317) for the device group associated with the respective key record (709), or must qualify based on the configured inter-tenant community trust policies. For authenticated users to perform key operations directly from the KDS portal (317) the users must be members of the designated role-based user group (for example, in the identity provider's authentication directory service). Further, named groups such as for example "Content Creators", "Content Loaders", and "Content Approvers" may be configured by the tenant administrator or operator (318), with the group type specified as "any". The group type "any" provides a policy and role-based mechanism for authenticated devices and users to use pre-shared keys for intra-tenant and inter-tenant (community based) content signing and verification of signatures in the manifest or extended manifest files associated with the content file. The authenticated users (318) of a tenancy may access keys for content signing and verification purposes through the KDS portal (317) to execute the content creating, loading, inspecting, and approving tasks in the proposed content distribution system workflow.

Figure 1D:
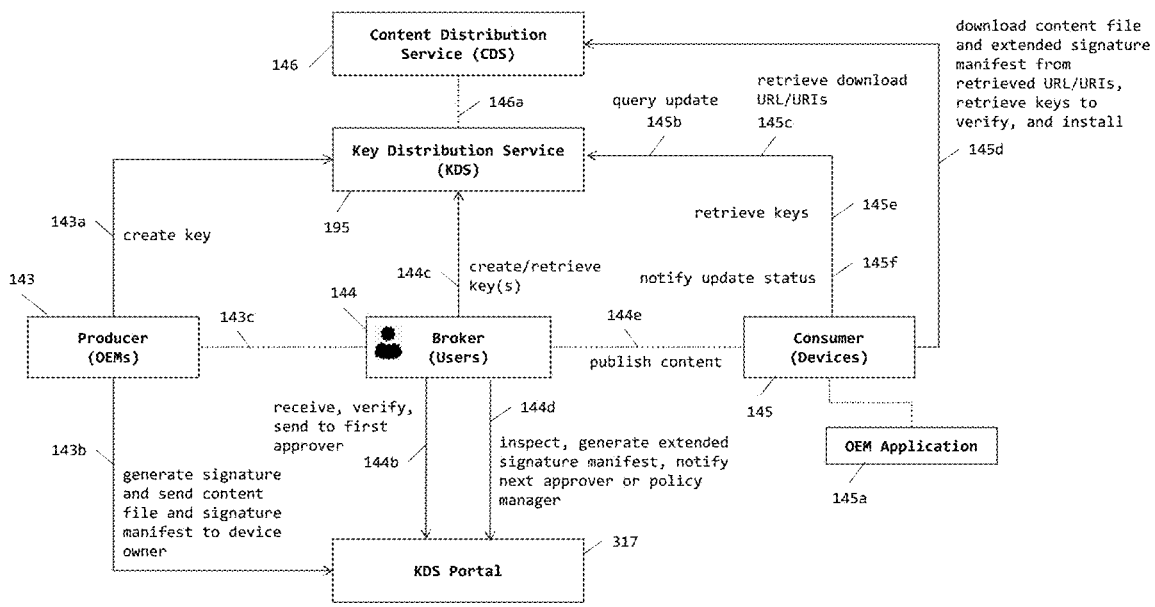
FIG. 1D is a schematic diagram illustrating an example supply chain tamper resistant content distribution service in accordance with various exemplary embodiments of the disclosed system.

Referring to FIG. 1D, FIG. 1A, and FIG. 3A, at step 143*a* a producer 143 creates a signing key, and at step 143*b* generates and sends a content file and signature manifest to a device owner (broker) 144. The key creation at step 143*a* for content file signing and generation of the signature manifest file may be accomplished with utilities, executing on an authenticated device, that use the KDS interface (167) APIs or through the KDS Portal (317) by authenticated users. The producers (OEMs) 143 serve as content creators (role). At step 143*c* the content file and signature manifest are shipped together (i.e., made available for import) to the device owner (broker) 144. At step 144*b* the broker 144 receives and verifies the content file using the signature manifest file, and at step 144*c* retrieves the key from the KDS 195 using the key identity hint in the signature manifest for the associated content file. After verification, the broker 144 at step 144*c* creates a signing key for co-signing and extends the signature manifest. At step 144*b*, the content loader assigns a content identifier (UUID), content timestamp, content version, content type, and content description from the KDS portal (317). The key creation at step 144*c* for content file signing and generation of the extended signature manifest file may be accomplished with utilities, executing on an authenticated device, that use the KDS interface (167) APIs or through the KDS Portal (317) by authenticated users. The brokers 144 serves as content loaders (role). At step 144*b*, the broker 144 finally notifies a first approver. The first approver inspects the content file using one or more external third-party content inspection methods, such as, for example, static analysis, dynamic analysis, sandboxing, anomaly detection, reputation lists) based on the approver's security profile and threat model assessments. The approver may further extend the extended signature manifest using the KDS 195 to create a signing key. The approver notifies the next approver where additional content inspection methods may be warranted by another approver. Finally, the last approver in the chain notifies the policy manager to configure an update policy to associate the content file to qualified consumers (devices) 145 managed by field managers). At step 144*e*, the policy manager notifies the field manager to publish the content to the devices 145. At step 145b the OEM application 145a executing on the consumer (device) 145 queries the KDS 195 to check for content updates, and at step 145c retrieves the download URL and URIs (for the content file and extended manifest file items) from the KDS 195 using KDS interface (167) APIs for any pending content updates. At step 145d, the OEM application 145a downloads the content file and extended signature manifest from the retrieved URL/URIs, verifies the signatures by retrieving the keys from the KDS 195 at step 145e with the key identity hints in the extended signature manifest file 831, and installs the verified content file using OEM specific update methods (e.g., streaming the HTTPS download to a flash memory partition on the device without buffering, storing on a file system on a flash data partition), executing proprietary shell scripts, helper applications, or OS loaders). At step 145f, the OEM application 145a notifies update status (for the content identifier associated with the content update) to the KDS 195 for state synchronization. The user notifications at the broker 144 are generated and sent from the KDS Portal 317 (e.g., as email or SMS to the recipients). The users at the broker 144 are content loaders, content approvers, policy managers, and field managers. At step 146a the DDS 146 interfaces with the KDS 195 using local or remote procedure calls (LPC/RPC) or via REST APIs for workflow coordination and content (content file and manifests) management.

Figure 1E:
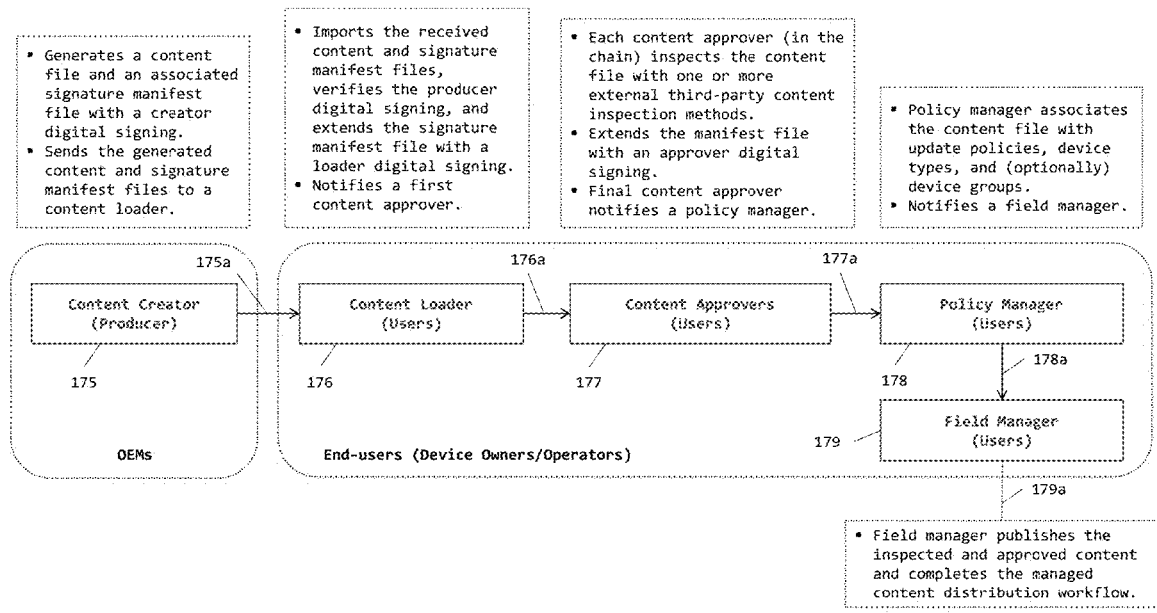
FIG. 1E is a schematic diagram illustrating an example multi-party, multi-person, and multi-part content inspection and approval workflow in accordance with various exemplary embodiments of the disclosed system.

Referring to FIG. 1E, FIG. 1A, and FIG. 3A, at step 175a a content creator (i.e., a producer, such as an OEM) 175 generates a content file (e.g., a software update, configuration update, or OS update to be installed on a field device) and an associated signature manifest file with a creator digital signing, and sends the generated content and signature manifest files to a content loader 176 (i.e., a broker, such as an end-user of the device). At step 176a, the content loader 176 imports the received content and signature manifest files, verifies the producer digital signing, extends the manifest file with a content loader co-signature, and notifies a first content approver 177. At step 177a, the first content approver (in the chain of one or more content approvers) inspects the content file with one or more external third-party content inspection methods and extends the manifest file with an approver digital signing. The final content approver notifies a policy manager 178. At step 178a, the policy manager 178 associates the content file with update policies, device types, and (optionally) device groups, and notifies a field manager 179. At step 179a, the field manager 179 publishes the inspected and approved content and completes the managed content distribution workflow.

Referring to FIG. 7B, FIG. 1D, FIG. 1E, FIG. 3A, FIG. 8C, and FIG. 8D, at step 765 a member device 701 is associated with a device type 760. At step 766, a content file 762 and signature manifest file 819 (also the extended signature manifest file 831) received from a content creator 175 is imported by a content loader 176 on the KDS portal 317. Further at step 767, the content loader 176 generates and associates a content identifier 761 with the content file 762, the extended signature manifest file 831, a generated API key 763, and a generated API token 764. The generated API key 763 and API token 764 are unique per content identifier and sent to the content consumer field device 145 during RetrieveUpdate device request processing by the CDS 146. At step 767a, a content timestamp, content version, content type, and content description are transitively assigned to the content identifier 761 (associated with the content file 762). At step 765 a download URL 771 is associated with the content identifier 761. At step 767b a content URI 772 is associated with the content file 762. At step 767c a manifest URI 773 is associated with the extended signature manifest file 831. At step 768, a content identifier, a content timestamp, a content version, a retrieved-on date/time, an update status, and an update history (list of content identifiers) is associated with the member device 701 by the CDS 146. At block 769, a list sequence of content identifiers (e.g., UUIDs) is associated with the device type 760 based on the update policy configured (at step 178a) by the policy manager 178. At step 770, on receiving a QueryUpdate device request, the next content identifier (UUID) is returned by the CDS 146 based on the pending updates for the member device 701. The update history for the member device 701 is updated by the CDS 146 on receiving a NotifyUpdateStatus device request (which includes the content identifier) from the member device 701.

In the emerging automotive market segment, national standards (acts enacted or under legislative review) related to motor vehicle owner's right to repair, and the right to equitable and professional auto industry repair, proposes the issuance and use of vehicle, owner, and device certificates by a certificate authority. However, there are major implementation challenges with such an approach, such as: (a) Requires private key infrastructure (PKI) buildout by automobile manufacturers with HSMs as secure elements; (b) Requires PKI certificate policies and certificate practice statements to comply as a root certificate authority for public/private trust; (c) Requires vehicle secure gateway and independent aftermarket service applications to be reengineered for secure transport protocols and inactivity timeouts; (d) Requires private key protection with a local secure element; (e) Requires certificate authorities to issue short-lived user certificates for technicians; (f) Requires interoperability with hybrid PKI systems; and (g) Post quantum ciphers require PKI enhancements to support multiple cryptographic algorithms with large certificate sizes.

In yet another exemplary embodiment of the proposed method, applicable to multiple industry segments and systems (including automotive, aviation, transportation, manufacturing, healthcare, telecommunications, retail, and space), secure connectivity and data communications may be implemented for a zero-trust networking architecture using the KDS. A third-party aftermarket service application executing on a technician device (e.g., a desktop/laptop computer or mobile device) uses the KDS interface API and retrieves (or creates) a pre-shared key (PSK) with a statically or dynamically generated PSK identity hint from the KDS. The service application then sends the PSK identity hint to the secure gateway (SGW) service on the service device (e.g., a vehicle, controller, actuator, sensor). The SGW service uses the KDS interface API and retrieves the corresponding PSK from the KDS using the received PSK identity hint. The SGW service sends a challenge nonce to the service application. The service application replies with the received nonce signed using the PSK for authentication. The SGW service then verifies the received signed nonce and on match grants access to the service application. The SGW service and service application may then communicate (e.g., for telematics, maintenance, diagnostics) with data authentication and encryption over any security (e.g., DTLS, TLS), transport (UDP, TCP), or network protocol (e.g., Ethernet, Wi-Fi, Bluetooth) using the pre-shared keys. The PSK is automatically rotated by the KDS based on the configured expiration timestamp.

In one exemplary embodiment of the proposed system and method, the KDS may be implemented as a microservices based highly available, vertically and horizontally scalable, architecture with local caching of the retrieved key and DNS records for low latency key operations, key distribution, and two-factor device authentication.

Although exemplary embodiments have been described in terms of a computing device or instrumented platform, it is contemplated that it may be implemented in software on microprocessors/general purpose computers, such as the computer system 1000 illustrated in FIG. 10. In various embodiments, one or more of the functions of the various components may be implemented in software that controls a computing device, such as computer system 800, which is described below with reference to FIG. 10.

Aspects of the present disclosure shown in FIGS. 1-9, or any part(s) or function(s) thereof, may be implemented using hardware, software modules, firmware, non-transitory computer readable media having instructions stored thereon, or a combination thereof, and may be implemented in one or more computer systems or other processing systems.

FIG. 10 illustrates an example computer system 1000 in which embodiments of the present disclosure, or portions thereof, may be implemented as computer-readable code. For example, the network systems and architectures disclosed here can be implemented in computer system 800 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores".

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1002 may be a special purpose or a general-purpose processor device. As will be appreciated by persons skilled in the relevant art, processor device 1002 may also be a single processor in a multi-core/multiprocessor system, such system operating alone, or in a cluster of computing devices operating in a cluster or server farm. Processor device 1002 is connected to a communication infrastructure 1026, for example, a bus, message queue, network, or multi-core message-passing scheme.

The computer system 1000 also includes a main memory 1004, for example, random access memory (RAM), and may also include a secondary memory 1006. Secondary memory 1006 may include, for example, a hard disk drive 1008, removable storage drive 1010. Removable storage drive 1010 may comprise a floppy disk drive, a magnetic tape drive, an optical disk drive, a flash memory, or the like.

The removable storage drive 1010 reads from and/or writes to a removable storage unit 1012 in a well-known manner. Removable storage unit 1012 may comprise a floppy disk, magnetic tape, optical disk, etc. which is read by and written to by removable storage drive 1010. As will be appreciated by persons skilled in the relevant art, removable storage unit 1012 includes a non-transitory computer usable storage medium having stored therein computer software and/or data.

In alternative implementations, secondary memory 1006 may include other similar means for allowing computer programs or other instructions to be loaded into computer system 1000. Such means may include, for example, a removable storage unit 1016 and an interface 1014. Examples of such means may include a program cartridge and cartridge interface (such as that found in video game devices), a removable memory chip (such as an EPROM, or PROM) and associated socket, and other removable storage units 1016 and interfaces 1014 which allow software and data to be transferred from the removable storage unit 1012 to computer system 1000.

The computer system 1000 may also include a communications interface 1018. Communications interface 1018 allows software and data to be transferred between computer system 1000 and external devices. Communications interface 1018 may include a modem, a network interface (such as an Ethernet card), a communications port, a PCMCIA slot and card, or the like. Software and data transferred via communications interface 1018 may be in the form of signals, which may be electronic, electromagnetic, optical, or other signals capable of being received by communications interface 1018. These signals may be provided to communications interface 1018 via a communications path 1020. Communications path 1020 carries signals and may be implemented using wire or cable, fiber optics, a phone line, a cellular phone link, an RF link or other communications channels.

The computer system 1000 may also include a computer display 1024 and a display interface 1022. According to embodiments, the display used to display the GUIs and dashboards for entities and relationships shown in FIG. 7A described above may be the computer display 1024, and the console interface may be display interface 1022.

In this document, the terms "computer program medium," "non-transitory computer readable medium," and "computer usable medium" are used to generally refer to media such as removable storage unit 1012, removable storage unit 1016, and a hard disk installed in hard disk drive 1008. Signals carried over communications path 1020 can also embody the logic described herein. Computer program medium and computer usable medium can also refer to memories, such as main memory 1004 and secondary memory 1006, which can be memory semiconductors (e.g., DRAMs, etc.). These computer program products are means for providing software to computer system 1000.

Computer programs (also called computer control logic) are stored in main memory 1004 and/or secondary memory 1006. Computer programs may also be received via communications interface 1018. Such computer programs, when executed, enable computer system 1000 to implement the present invention as discussed herein. In particular, the computer programs, when executed, enable processor device 1002 to implement the processes of the present invention, such as the stages in the methods illustrated by the flowcharts in FIGS. 3A-3E, 5A-5D, 6, 7, 8A-8D, and 9 discussed above. Accordingly, such computer programs represent controllers of the computer system 1000. Where the invention is implemented using software, the software may be stored in a computer program product and loaded into computer system 1000 using removable storage drive 1010, interface 1014, and hard disk drive 1008, or communications interface 1018.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

In certain exemplary embodiments of the disclosed system, a group account number may be assigned to a business unit of an enterprise for role-based controls for members of the group.

In an alternate embodiment of the disclosed system, the service sign-in ceremony may be accomplished without requiring a service agent (by the service provider), through a plugin loaded by the client application (e.g., web browser) wherein the accessed service is qualified based on a server certificate and the encrypted password retrieved from the user token is used by the client application plugin to complete the authentication ceremony. Accordingly, the digitally signed service identifier in the user token request is optional.

In an alternate embodiment of the disclosed system, a method is executed for configuring, generating, issuing, sending, and verifying a client certificate to a first device 100, used in client authentication between applications executing on distributed devices, including a client application 101 executing on the first device 100, a server application 151 executing on a second device 150, a client certificate issued by a certificate authority (CA) 398, a key distribution service (KDS) 305, a KDS portal 317, a KDS administrator 318, a KDS proxy 602, a client KDS interface 303, a member identifier 703, a member universally unique identifier (UUID) 731, a member domain name system (DNS) hostname 722, a symmetric KDS member (M-PSK) 715, a M-PSK identity hint 711, a tenant identifier 735, an application identifier 742, a dynamic host configuration protocol (DHCP) service 172, and a domain name system (DNS) service 321, the method comprising:

configuring, on the DHCP service 172, a vendor class identifier, scope, and address pool as an IP address range or subnet; and configuring, at the KDS portal 317, a certificate template, a certificate authority (CA) 398 identifier, a first device 100, device group 705, and a device type; and configuring, at the KDS portal 317, the first device 101 with the device type; and configuring, at the KDS portal 317, the first device as a member of the device group 705; and receiving, by the key distribution service 305, a request for a client certificate from the first device at an IP address for a subject name (SN) set as the first device local identifier; and generating, by the key distribution service 305, a certificate signing request (CSR) with the received subject name (SN) and automatically add X.509 extended attributes in the subject alternate name (SAN), wherein the extended attributes include the first device IP address, the network address and network mask in the certificate template associated with the device group or device type of the first device, and the first device initial identifier associated with the first device local identifier set in the received SN; and issuing, by the key distribution service 305, a client certificate and sending to the first device; and authenticating with the key distribution service 305, by the client application 101 executing on the first device 100, using the tenant identifier 735, the symmetric KDS member (M-PSK) 715, and the M-PSK identity hint 711, wherein the first device 100 is registered by a first DNS hostname 722 on the DNS service 321 configured with the KDS 305 or the KDS proxy 602, and wherein the first device 100 is registered as a member device on the KDS 305; and acquiring, by the client application 101 on the first device 100, the trusted certificates, the client certificate, and the associated private key from the KDS 305 using at least the tenant identifier 735 for trusted certificates and a subject name for client certificates, wherein the acquired client certificate and associated private key is used in certificate-based client authentication, for mutual authentication, over a secure transport protocol during communication with the server application 151 executing on the second device 150, or in data signing with digital signatures, or in key unwrapping; and initiating, by the client application 101 on the first device 100, a secure session using a security protocol, wherein the session is initiated using the acquired client certificate and associated private key for certificate-based client authentication, to establish secure communications with the server application 151 executing on the second device 150; and sending, by a client application 101 on the first device 100, the client certificate during a protocol handshake for client authentication to the server application 151 on the second device 150; and verifying, by the server application 151 on the second device 150, the first device 100 IP address or subnet to validate the client certificate based on the X.509 extended attributes in the subject alternate name (SAN) field of the received client certificate; and authorizing, of the client certificate by the server application 151 on the second device 150, on a match of the host address or the network subnet in the received client certificate with the first device 100 IP address or subnet respectively, to continue with the protocol specific authentication handshake for client authentication.

The approach additionally includes methods wherein:

The device member authentication handshake is performed by the client KDS interface 303 on the first device 100 using the tenant identifier 735, the device member PSK (M-PSK) 715, and the M-PSK identity hint 711 as a first factor of a device authentication, and further wherein a session key is generated using a key exchange handshake between the client KDS interface 303 and the KDS 305 or the KDS proxy 602, and further wherein a device member validation is performed as a second factor of the device authentication, by:

performing, by the KDS 305 or the KDS proxy 602, a DNS reverse lookup of a device member IP address to query for the first DNS hostname; and retrieving, by the KDS 305 or the KDS proxy 602, the first DNS hostname from a resource record in a DNS response; and comparing and matching, by the KDS 305 or the KDS proxy 602, the retrieved first DNS hostname with a device member identifier in a plurality of KDS requests.

The device authentication and a plurality of certificate and key exchange handshakes are performed over a connectionless UDP or connection-oriented TCP transport protocol, without requiring a security transport protocol.

The verification by the server application 151 on the second device 150, may be performed by the presence of a single X.509 extended attribute (e.g., IP.1=192.168.10.19) in the received client certificate as the host address to match with the IP address of the first device 100 in the protocol authentication handshake.

The validation of the first device 100 IP address is performed by the KDS proxy 602 based on the scope and address pool for the vendor class identifier configured on the DHCP service 172.

The verification by the server application 151 on the second device 150, may be performed by the presence of two X.509 extended attributes (e.g., IP.1=192, 168.10.0, IP.2=255.255.255.0) in the received client certificate as the network address and network mask respectively to match with the subnet address of the first device 100 in the protocol authentication handshake.

The validation of the first device 100 subnet address is performed based on the scope and address pool for the vendor class identifier configured on the DHCP service 172.

The verification by the server application 151 on the second device 150, may be performed by the presence of three X.509 extended attributes (e.g., IP.1=192.168.10.19, IP.2=192, 168.10.0, IP.3=255.255.255.0) as the host address, network address and network mask respectively to match with the host address and subnet address of the first device 100 in the protocol authentication handshake.

The client certificate may be a self-signed certificate, or a certificate issued by a trusted public or private certificate authority.

Prior to sending the client certificate to the first device 100, the received application identifier 742, in the request by the client application 101 to the KDS 305 to retrieve the client certificate, is verified by the KDS 305 to validate that the client application 101 on the first device 100 is configured as a trusted application on the KDS portal 317.

The verification by the server application on the second device, may be performed by the presence of multiple pairs of X.509 extended attributes, wherein each pair specifies a network address and network mask, to match with the host address and subnet address of the first device 100 in the protocol authentication handshake.

The match by subnet address of the first device 100 in the protocol authentication handshake is performed using a logical AND operation between the host (IP) address of the first device 100 and the network mask in the received client certificate and then comparing the computed value of the logical AND operation with the network address in the received client certificate.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A method of configuring, generating, issuing, sending, and
verifying a client certificate to a first device, used in client authentication between applications executing on distributed devices in an Internet of Things (IoT), Industrial IoT (IIoT), or Operational Technology (OT) environment, the method comprising a client application executing on the first device, a server application executing on a second device, a client certificate issued by a certificate authority (CA), a key distribution service (KDS), a KDS portal, a KDS administrator, a KDS proxy, a client KDS interface, a member identifier, a member universally unique identifier (UUID), a member domain name system (DNS) hostname, a symmetric KDS member (M-PSK), a M-PSK identity hint, a tenant identifier, an application identifier, a dynamic host configuration protocol (DHCP) service, and a domain name system (DNS) service:
configuring, on the DHCP service, a vendor class identifier, a scope, and an address pool as an IP address range or a subnet;
configuring, at the KDS portal, a certificate template, a certificate authority (CA) identifier, the first device, a device group, and a device type;
configuring, at the KDS portal, the first device with the device type;

configuring, at the KDS portal, the first device as a member of the device group; and receiving, by the KDS, a request for a client certificate from the first device at an IP address for a subject name (SN) set as a local identifier of the first device;

generating, by the KDS, a certificate signing request (CSR) with the received subject name (SN) and automatically add X.509 extended attributes in a subject alternate name (SAN), wherein the X.509 extended attributes include an IP address of the first device, a network address and a network mask in the certificate template associated with at least one of the device group or device type of the first device, and an initial identifier of the first device associated with the local identifier of the first device set in the received subject name (SN);

issuing, by the KDS, a client certificate and sending the client certificate to the first device;

authenticating with the KDS, by the client application executing on the first device, using the tenant identifier, the symmetric KDS member (M-PSK), the M-PSK identity hint, and a first DNS hostname, wherein the first device is registered by the first DNS hostname on the DNS service configured with the KDS or the KDS proxy, and wherein the first device is registered as a member device on the KDS;

acquiring, by the client application executing on the first device, a plurality of trusted certificates, the client certificate, and an associated private key from the KDS, using at least the tenant identifier for the plurality of trusted certificates and a subject name for client certificates, wherein the acquired client certificate and the associated private key is are used in a certificate-based client authentication, wherein the certificate-based client authentication is executed over a secure transport protocol during communication with the server application executing on the second device, in data signing with digital signatures, or in key unwrapping, and wherein the certificate-based client authentication provides mutual authentication;

initiating, by the client application executing on the first device, a secure session using a security protocol, wherein the session is initiated using the acquired client certificate and the associated private key providing certificate-based client authentication, establishing secure communications with the server application executing on the second device;

sending, by the client application executing on the first device, the client certificate to the server application executing on the second device, wherein the client certificate is sent during a protocol specific handshake for client authentication;

verifying, by the server application executing on the second device, the IP address of the first device or the subnet, wherein the verifying validates the client certificate based on the X.509 extended attributes in the subject alternate name (SAN) field of the client certificate; and authorizing the client certificate, by the server application executing on the second device, upon a match of a host address or a network subnet in the client certificate with the IP address of the first device or the subnet, respectively, and continuing with the protocol specific handshake for client authentication.

2. The method of claim 1, wherein a device member authentication handshake is performed by the client KDS interface on the first device using the tenant identifier, the symmetric KDS member PSK (M-PSK), and the M-PSK identity hint as a first factor of a device authentication, and further wherein a session key is generated using a key exchange handshake between the client KDS interface and the KDS or the KDS proxy, and further wherein a device member validation is performed as a second factor of the device authentication, by:

performing, by the KDS or the KDS proxy, a DNS reverse lookup of a device member IP address to query for the first DNS hostname;

retrieving, by the KDS or the KDS proxy, the first DNS hostname from a resource record in a DNS response; and comparing and matching, by the KDS or the KDS proxy, the retrieved first DNS hostname with the member identifier in a plurality of KDS requests.

3. The method of claim 2, wherein the device authentication and a plurality of certificate and key exchange handshakes are performed over a connection-less UDP or a connection-oriented TCP transport protocol, without requiring a security transport protocol.

4. The method of claim 1, wherein the verifying, by the server application executing on the second device, is performed by the presence of a single X.509 extended attribute in the client certificate as the host address, wherein the single X.509 attributed in the client certificate is used to match with the IP address of the first device in the protocol specific handshake.

5. The method of claim 4, wherein a validation of the IP address of the first device is performed by the KDS proxy based on the scope and the address pool for the vendor class identifier configured on the DHCP service.

6. The method of claim 1, wherein the verifying by the server application executing on the second device is performed based on two X.509 extended attributes in the client certificate, wherein the two X.509 extended attributes comprise the network address and the network mask, wherein the network address and the network mask are used to match with a subnet address of the first device in the protocol specific handshake.

7. The method of claim 6, wherein a validation of the subnet address of the first device is performed based on the scope and the address pool for the vendor class identifier configured on the DHCP service.

8. The method of claim 1, wherein the verifying by the server application executing on the second device is performed based on three X.509 extended attributes, wherein the host address, network address and network mask respectively match with the host address and the subnet address of the first device in the protocol specific handshake.

9. The method of claim 1, wherein the client certificate is a self-signed certificate, or wherein the client certificate is a certificate issued by a trusted public or a private certificate authority.

10. The method of claim 1, wherein prior to sending the client certificate to the first device, the application identifier, in the request by the client application to the KDS to retrieve the client certificate, is verified by the KDS and validates that the client application executing on the first device is configured as a trusted application on the KDS portal.

11. The method of claim 1, wherein the verifying by the server application executing on the second device is performed based on multiple pairs of X.509 extended attributes, wherein each pair of the multiple pairs of X.509 extended attributes specifies a respective network address and a respective network mask, wherein the respective network address and the respective network mask are used to match with the host address and the subnet address of the first device in the protocol specific handshake.

* * * * *